US012753754B2

(12) United States Patent
Thomas et al.

(10) Patent No.: US 12,753,754 B2
(45) Date of Patent: Oct. 6, 2026

(54) LIQUID COOLED PLUNGER SYSTEM

(71) Applicant: Kerr Machine Co., Sulphur, OK (US)

(72) Inventors: Micheal Cole Thomas, Azle, TX (US); Christopher Todd Barnett, Ada, OK (US); Kelcy Jake Foster, Sulphur, OK (US); Nicholas Son, Roff, OK (US); John Keith, Duncan, OK (US); Guy J. Lapointe, Sulphur, OK (US); Brandon Scott Ayres, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 19/377,643

(22) Filed: Nov. 3, 2025

(65) Prior Publication Data

US 2026/0063121 A1 Mar. 5, 2026

Related U.S. Application Data

(63) Continuation of application No. 19/220,881, filed on May 28, 2025, now Pat. No. 12,486,840, which is a
(Continued)

(51) Int. Cl.
*F04B 53/08* (2006.01)
*E21B 43/26* (2006.01)
(Continued)

(52) U.S. Cl.
CPC .............. *F04B 53/08* (2013.01); *F04B 53/14* (2013.01); *E21B 43/2607* (2020.05);
(Continued)

(58) Field of Classification Search
CPC ...... F04B 19/22; F04B 53/20; F04B 39/0005; F04B 53/14; F15B 15/1466; F16J 1/08
See application file for complete search history.

(56) References Cited

U.S. PATENT DOCUMENTS

| | | | |
|---|---|---|---|
| 1,662,725 | A | 3/1928 | Toney |
| 1,836,498 | A | 12/1931 | Gustav |

(Continued)

FOREIGN PATENT DOCUMENTS

| | | | |
|---|---|---|---|
| CN | 104179676 | A | 12/2014 |
| CN | 108590999 | A | 9/2018 |

(Continued)

OTHER PUBLICATIONS wikipedia.com; List of thermal conductivities—Wikipedia from en.wikipedia.org/wiki/List_of_thermal_conductivities (Year: 2025).

(Continued)

*Primary Examiner* — David N Brandt
(74) *Attorney, Agent, or Firm* — Tomlinson McKinstry, P.C.

(57) ABSTRACT

A system for cooling plungers which operate in high pressure pumps. The system uses a plunger having a blind bore formed therein. The blind bore may receive a number of different objects, some of which are fixed to the plunger. A heat exchanger may be installed within the blind bore. The heat exchanger may have internal passages or openings which allow for the circulation of fluid within the blind bore, thus cooling the plunger. The heat exchanger may be formed of a material having a higher thermal conductivity than the material used to form the plunger. This allows the heat exchanger to cool the plunger more effectively than if the plunger were solid or filled with an empty air space. The heat exchanger may be sealed within the bore of the plunger, or exposed.

13 Claims, 72 Drawing Sheets

Related U.S. Application Data continuation of application No. 18/905,240, filed on Oct. 3, 2024, now Pat. No. 12,338,813.

(60) Provisional application No. 63/695,399, filed on Sep. 17, 2024, provisional application No. 63/553,805, filed on Feb. 15, 2024, provisional application No. 63/587,596, filed on Oct. 3, 2023.

(51) Int. Cl.
*F04B 19/22* (2006.01)
*F04B 39/00* (2006.01)
*F04B 53/14* (2006.01)
*F15B 15/14* (2006.01)

(52) U.S. Cl.
CPC ........... *F04B 19/22* (2013.01); *F04B 39/0005* (2013.01); *F15B 15/1466* (2013.01)

(56) References Cited

U.S. PATENT DOCUMENTS

| | | | |
|---|---|---|---|
| 2,545,506 | A | 3/1951 | Walsh |
| 2,567,496 | A | 9/1951 | Pittenger |
| 2,898,858 | A | 8/1959 | Fisher |
| 2,957,422 | A | 10/1960 | Loeber |
| 3,005,412 | A | 10/1961 | Camp |
| 3,301,197 | A | 1/1967 | Dodson et al. |
| 3,887,305 | A | 6/1975 | Ito |
| 4,174,194 | A | 11/1979 | Hammelmann |
| 5,061,159 | A | 10/1991 | Pryor |
| 5,073,096 | A | 12/1991 | King et al. |
| 5,265,331 | A | 11/1993 | Engel et al. |
| 9,371,919 | B2 | 6/2016 | Forrest |
| 10,670,013 | B2 | 6/2020 | Foster et al. |
| 11,002,120 | B1 * | 5/2021 | Surjaatmadja ........... F16J 15/24 |
| 11,105,327 | B2 | 8/2021 | Hurst et al. |
| 11,162,479 | B2 | 11/2021 | Thomas et al. |
| 11,536,378 | B2 | 12/2022 | Nowell et al. |
| 11,578,710 | B2 | 2/2023 | Nowell et al. |
| 2006/0045782 | A1 | 3/2006 | Kretzinger et al. |
| 2013/0045123 | A1 | 2/2013 | Roman et al. |
| 2014/0127062 | A1 | 5/2014 | Buckley et al. |
| 2015/0132157 | A1 | 5/2015 | Whaley et al. |
| 2015/0219096 | A1 | 8/2015 | Jain et al. |
| 2016/0090980 | A1 | 3/2016 | Howard et al. |
| 2016/0273653 | A1 * | 9/2016 | Tamashima ............. F04B 53/08 |
| 2016/0281699 | A1 | 9/2016 | Gnessin |
| 2018/0163719 | A1 | 6/2018 | Tojo |
| 2019/0145391 | A1 | 5/2019 | Davids |
| 2020/0232455 | A1 | 7/2020 | Blume |
| 2022/0099073 | A1 * | 3/2022 | Thomas .............. F04B 53/1022 |
| 2022/0243724 | A1 | 8/2022 | Li et al. |
| 2024/0240626 | A1 * | 7/2024 | Avey ....................... F04B 53/20 |

FOREIGN PATENT DOCUMENTS

| | | | |
|---|---|---|---|
| CN | 207974953 | U | 10/2018 |
| GB | 190629137 | | 12/1907 |
| GB | 408778 | A | 4/1934 |
| JP | 06167277 | A | 7/1993 |

OTHER PUBLICATIONS

CN-108590999-A translation (Year: 2025).

* cited by examiner

LIQUID COOLED PLUNGER SYSTEM

SUMMARY

The present disclosure is directed to a system comprising a fluid end and a plunger configured to reciprocate within the fluid end. The fluid end has an internal cavity formed therein. The plunger comprises a first surface exposed to the cavity. A blind bore is formed in the first surface, and the blind bore may extend at least one-half the length of the plunger.

In another aspect, the present disclosure is directed to a system comprising a plunger configured to reciprocate within a fluid end. The plunger comprises a first surface resident within the fluid end and a blind bore formed in the first surface of the plunger. The system further comprises a heat exchanger situated within the blind bore. The heat exchanger is made of a material having a higher thermal conductivity than the plunger.

In another aspect, the present disclosure is directed to a system comprising a fluid end and an elongate plunger reciprocable (configured to reciprocate) within the fluid end. The fluid end has an internal cavity within which a working fluid is flowable. The plunger has a first end exposed to the cavity and an opposed second end not exposed to the cavity. The plunger comprises a blind bore formed in the first end. The bore may extend at least one-half the length of the plunger.

DETAILED DESCRIPTION

Figure 1:
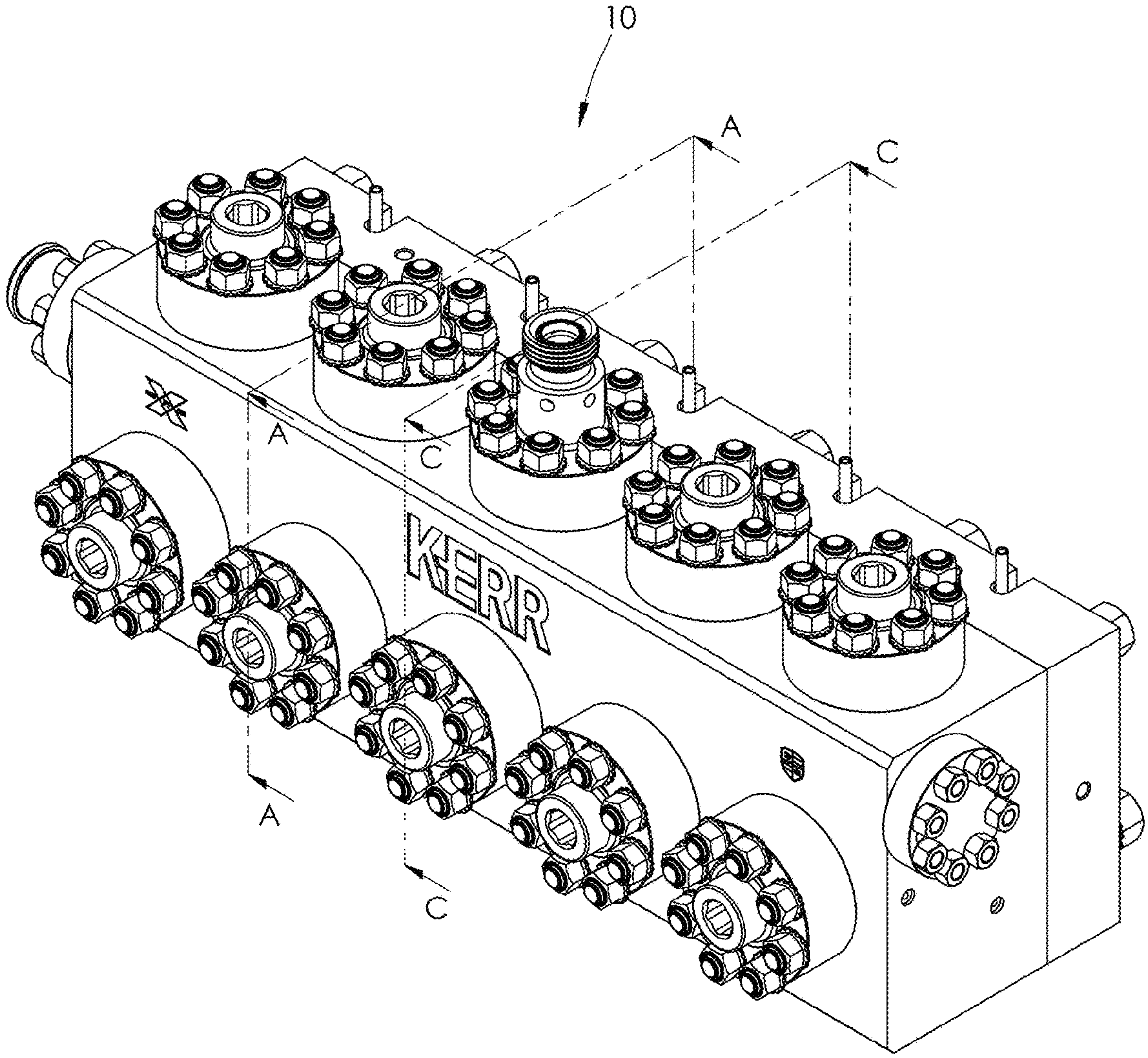
FIG. 1 is an isometric view of one embodiment of a fluid end.

High pressure reciprocating pumps typically comprise a power end assembly attached to a fluid end assembly. Fluid end assemblies are typically used in oil and gas operations to deliver highly pressurized corrosive and/or abrasive fluids to piping leading to the wellbore. The assemblies are typically attached to power ends run by engines. The engine crankshaft is attached to a transmission input shaft, the transmission output shaft is connected to a gearbox input shaft, and the gearbox output shaft is attached to the power end crankshaft. The power end crankshaft reciprocates plungers within the fluid end assembly to pump fluid through the fluid end.

Fluid may be pumped through the fluid end at pressures that range from 5,000-15,000 pounds per square inch (psi). However, the pressure may reach up to 22,500 psi. Power ends typically have a power output of at least 2,250 horsepower during hydraulic fracturing operations. A single fluid end typically delivers a fluid volume of about 185-690 gallons per minute or 4-16 barrels per minute during a fracking operation. When a plurality of fluid ends are used together, the fluid ends may collectively deliver about 4,200 gallons per minute or 100 barrels per minute to the wellbore.

Because high pressure reciprocating pumps operate at such high pressures and volumes, one common issue is the overheating of parts. Specifically, fluid end assemblies experience overheating in areas where components wear against each other, or where components expand and retract relative to each other. Areas of particular concern are the components that wear against the reciprocating plunger, such as the plunger packing. High rates of reciprocation, along with tight tolerances between components, leads to an increase in temperatures that causes parts to expand. Such expansion, in addition to high temperatures in general, causes parts to experience significant wear. When components or parts wear beyond a certain critical point, they need to be replaced. This costs valuable time and money. There is therefore an existing need to reduce temperatures of internal components within fluid ends which in turn would reduce friction and increase component life.

The present disclosure describes a liquid cooled plunger system designed to reduce temperatures of a plunger which reciprocates within a fluid end. This leads to longer lifespans of the plunger packing and other related components. In this system, a blind bore may be formed in the front surface of the plunger, which is configured to be exposed to the internal chamber or cavity formed within the fluid end. Such bore may extend a depth of at least half of the length of the plunger.

In a preferred embodiment, the bore will extend far enough into the plunger so that the bore is constantly surrounded by the plunger packing when the plunger is in operation. This means that when the plunger is situated in a maximally inserted, or fully extended, position, the plunger packing surrounds the plunger in such a way that the packing also surrounds at least a portion of the bore. Likewise, when the plunger is situated in a minimally inserted, or fully retracted, position, the plunger packing surrounds the plunger in such a way that the packing surrounds at least a portion of the bore. When the plunger is in any position between the maximally and minimally inserted positions, the plunger packing surrounds the plunger so that the packing surrounds at least a portion of the bore.

As discussed herein, the bore within the plunger is configured to reduce the temperature of the plunger. This leads to an extended life of the plunger packing, as well as other parts.

In some embodiments, the plunger's blind bore is filled with a heat exchanger. The heat exchanger may be formed of a different material than the plunger. The heat exchanger may be solid, or may have bores or passages formed therein. The heat exchanger may be made of a material having a higher thermal conductivity than the material used to form the plunger. This allows the heat exchanger to transfer more heat to the surrounding working fluid within the fluid end, and therefore cool the plunger more effectively than if the heat exchanger were made from the same material as the plunger. The heat exchanger may have a plurality of passages surrounding a central passage. Fluid may flow into and out of the end of the blind bore or the plurality of passages.

A retaining element may be used to hold the heat exchanger within the bore. This retaining element may be a variety of things, such as a snap ring or plug. If the retaining element is a plug, the plug may be secured within the bore by press fit, or other securing methods. The plug may also be positioned at least partially inside of a heat exchanger. The plug may have an internal cavity, which is in fluid communication with the cavity formed inside of the fluid end.

In some embodiments, the bore within the plunger may receive an element which is not mechanically coupled to the plunger. Such element may be fixed to another component within the fluid end, such as a plug or a valve. The plunger may reciprocate over this element to facilitate circulation of fluid within the bore. This circulation of fluid leads to cooler temperatures within the plunger. The element may also be configured such that a heat exchanger situated within the blind bore may reciprocate over the element. The element may be stationary relative to the plunger. In other embodiments, the element may move relative to the plunger.

In some embodiments, an object may be at least partially resident within the bore of the plunger. Such object may be in a mechanically uncoupled relationship with the plunger. One example of such object is a ball, such as a ball used in ball valves. The ball may have a slightly smaller outer diameter than the diameter of the blind bore, so that the ball can freely roll inside of the bore. The ball may also be positioned within a heat exchanger and operate similarly to what is discussed above. The ball may be restricted from exiting the bore or heat exchanger by a valve seat, or a smaller diameter of the bore or valve seat, as discussed herein.

The liquid cooled plunger systems and components disclosed herein may be used in various types of fluid ends, fluid end sections, fluid end assemblies, and other types of pumps configured to use plungers.

Turning to FIG. 1, one embodiment of a fluid end 10 is shown. The various features of the fluid end 10 not specifically described herein are described in more detail in U.S. Pat. No. 10,941,765, issued to Nowell et al., the entire contents of which are incorporated herein by reference.

Figure 2:
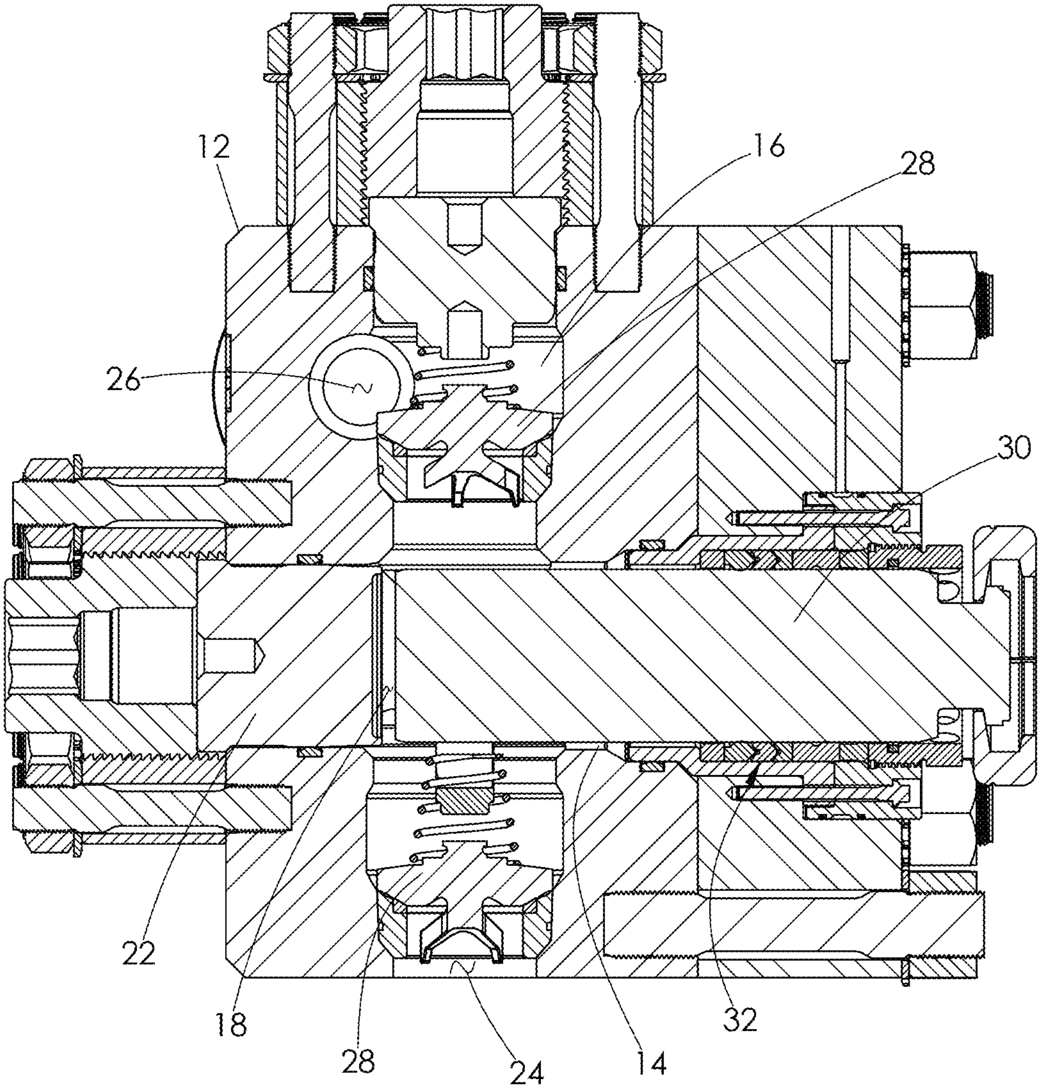
PRIOR ART FIG. 2
FIG. 2 is a cross-sectional view of the fluid end shown in FIG. 1, taken along line A-A. A plunger known in the art is installed within the fluid end.

Turning to FIG. 2, a plunger 30 known in the art is shown. The other components shown in FIG. 2 have the same general function as components shown in other illustrations of the fluid end 10 throughout this document, and are given the same reference numbers for ease of reference. The plunger 30 shown in FIG. 2 is solid. In some cases, a blind bore may be formed within the plunger 30. Such bore may be used to assist with installation. During operation, the plunger 30 is known to become very hot. Even if a bore is formed within the plunger 30, fluid entering the bore is known to not circulate within the plunger 30, causing the fluid and plunger 30 to experience high temperatures. Excessive heat within the housing 12 can cause the fluid end and its various components to fail faster than normal. For example, excessive heat can cause lubricating oil to break down faster, thereby increasing the friction between parts within the housing 12. Excessive heat can also cause the plunger packing 32 around the plunger 30 to degrade faster, cause thermal expansion of parts, create pressure issues within the housing 12, or cause overheating of the entire pump in general. There is a need in the art for a way to continually cool the plunger 30 during operation.

Figure 3:
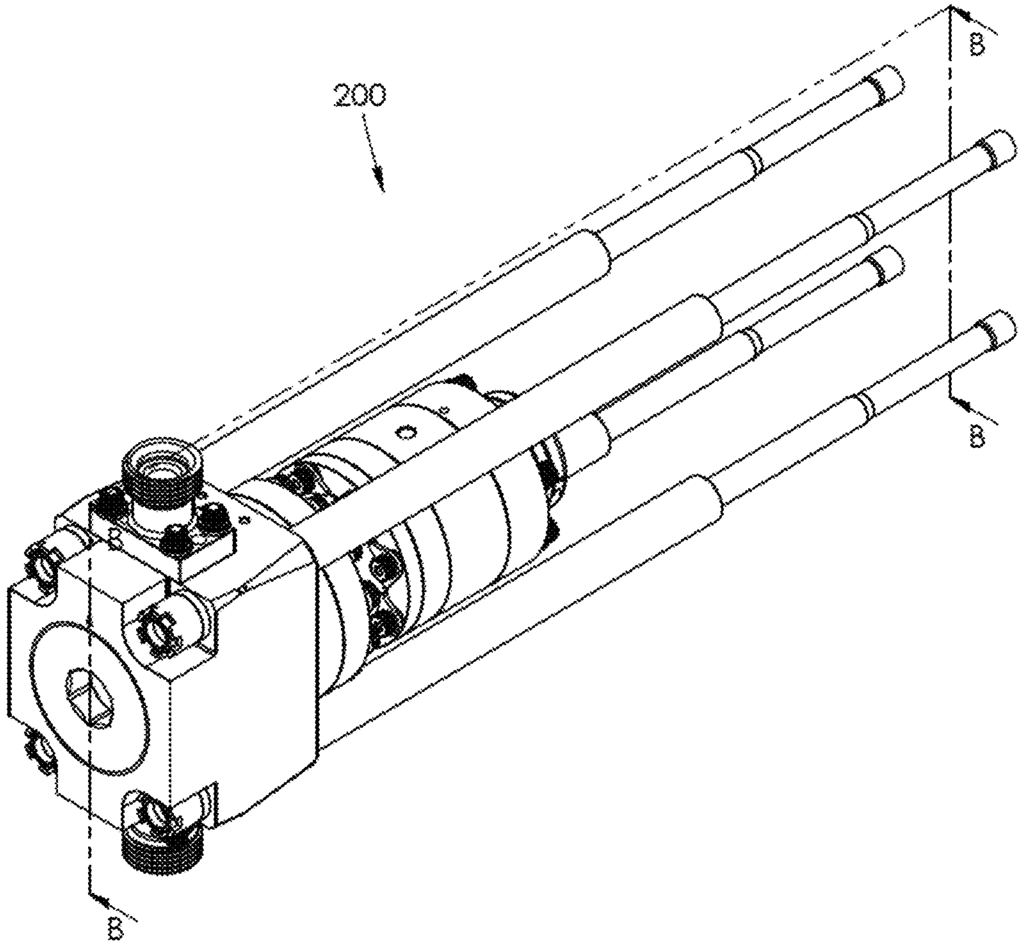
FIG. 3 is an isometric view of a fluid end section for use with a fluid end.

Turning to FIG. 3, one embodiment of a fluid end section 200 for use within another embodiment of a fluid end is shown. The various features of the fluid end section 200 not specifically described herein are described in more detail in U.S. Pat. No. 12,000,257, issued to Foster et al., the entire contents of which are incorporated herein by reference.

Figure 4:
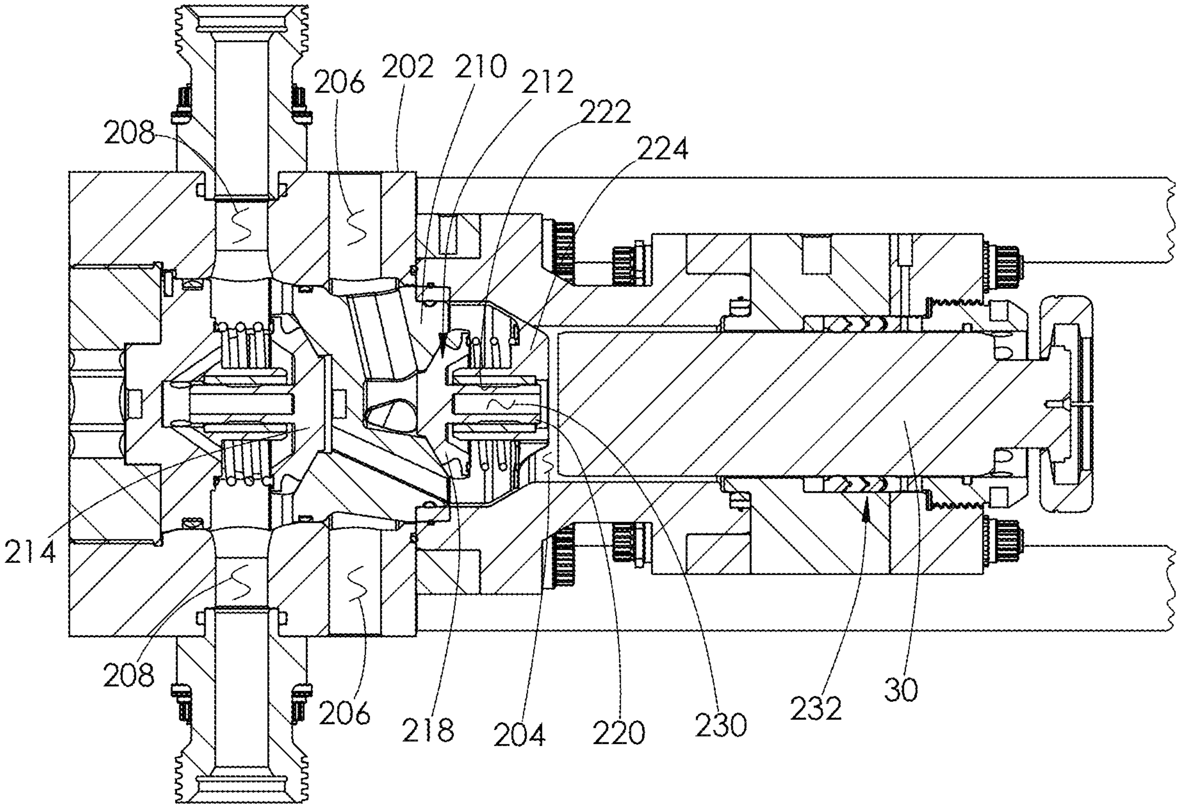
PRIOR ART FIG. 4
FIG. 4 is a cross-sectional view of the fluid end section shown in FIG. 3, taken along line B-B. A plunger known in the art is installed within the fluid end section.

Turning to FIG. 4, a plunger 30 known in the art is shown. The other components shown in FIG. 4 have the same general function as components depicted in other illustrations of the fluid end section 200 disclosed herein, and are given the same reference number for ease of reference. Plunger packing 232 prevents high pressure fluid from leaking between the plunger 30 and the housing 202. As discussed above, the plunger 30 is solid, and is known to experience elevated temperatures. This causes premature failure of components, or overheating of the pump system in general. There is a need in the art for a way to continually cool the plunger 30 during operation.

The fluid end section 200 also comprises a housing 202 having a horizontal bore 204 formed therein. Fluid enters the housing 202 through one or more suction bores 206 and exits the housing 202 through one or more discharge bores 208. Fluid is routed throughout the housing 202 by a fluid routing plug 210. Movement of fluid throughout the fluid routing plug 210 is controlled by a suction valve 212 and a discharge valve 214. The valves 212 and 214 are configured to seat against opposite surfaces of the fluid routing plug 210.

As described herein, multiple embodiments of the liquid cooled plunger system may be used within either the fluid end 10, or the fluid end section 200. Additionally, multiple embodiments of the liquid cooled plunger system may be used within other fluid ends, fluid end sections, or high pressure reciprocating pumps known in the art. In short, the liquid cooled plunger system may be used in many types of pumps.

Figure 5:
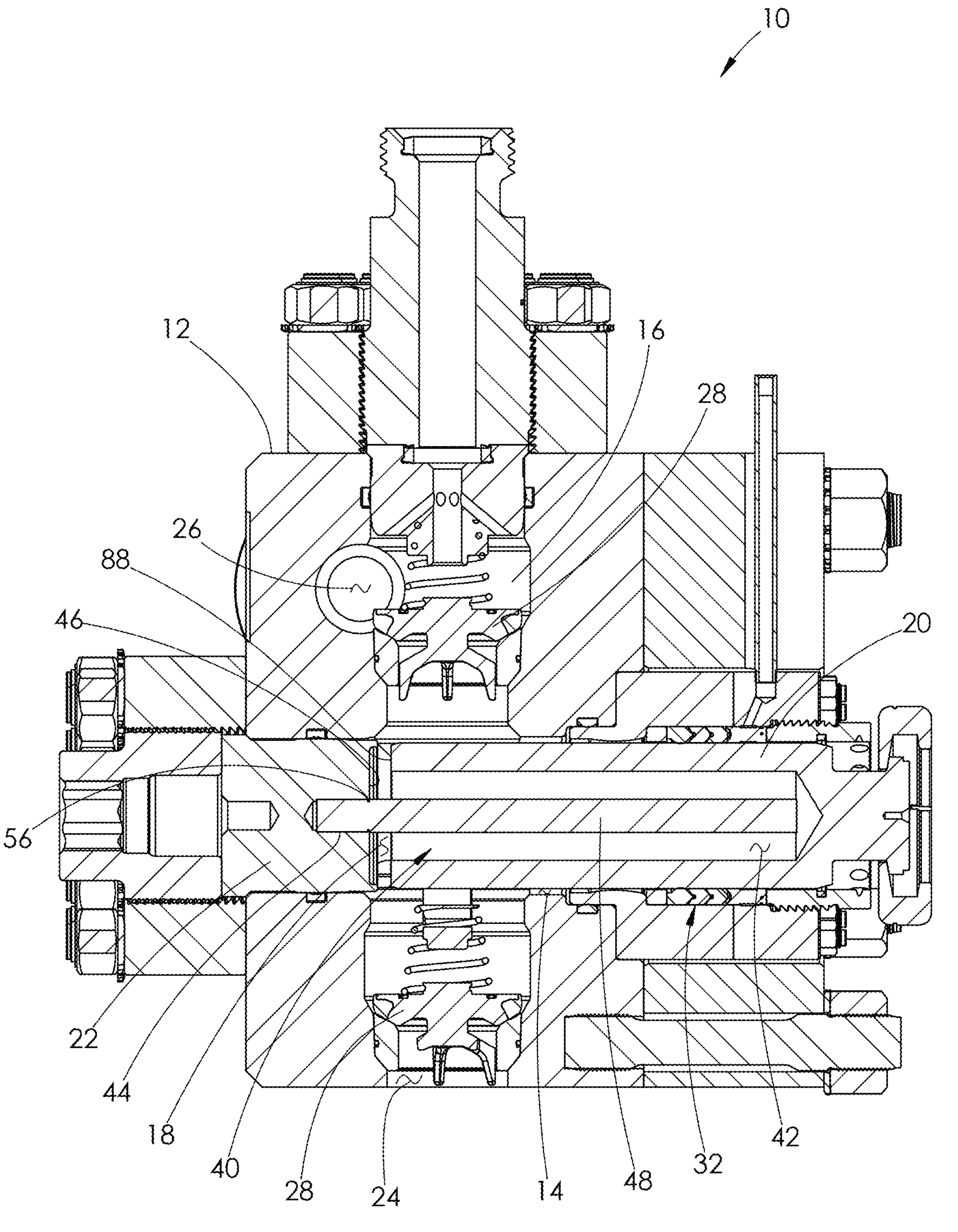
FIG. 5 is a cross-sectional view of the fluid end shown in FIG. 1, taken along line C-C. One embodiment of a liquid cooled plunger system disclosed herein is shown installed within the fluid end. The plunger of the liquid cooled plunger system is in the fully extended or maximally inserted position.
Figure 6:
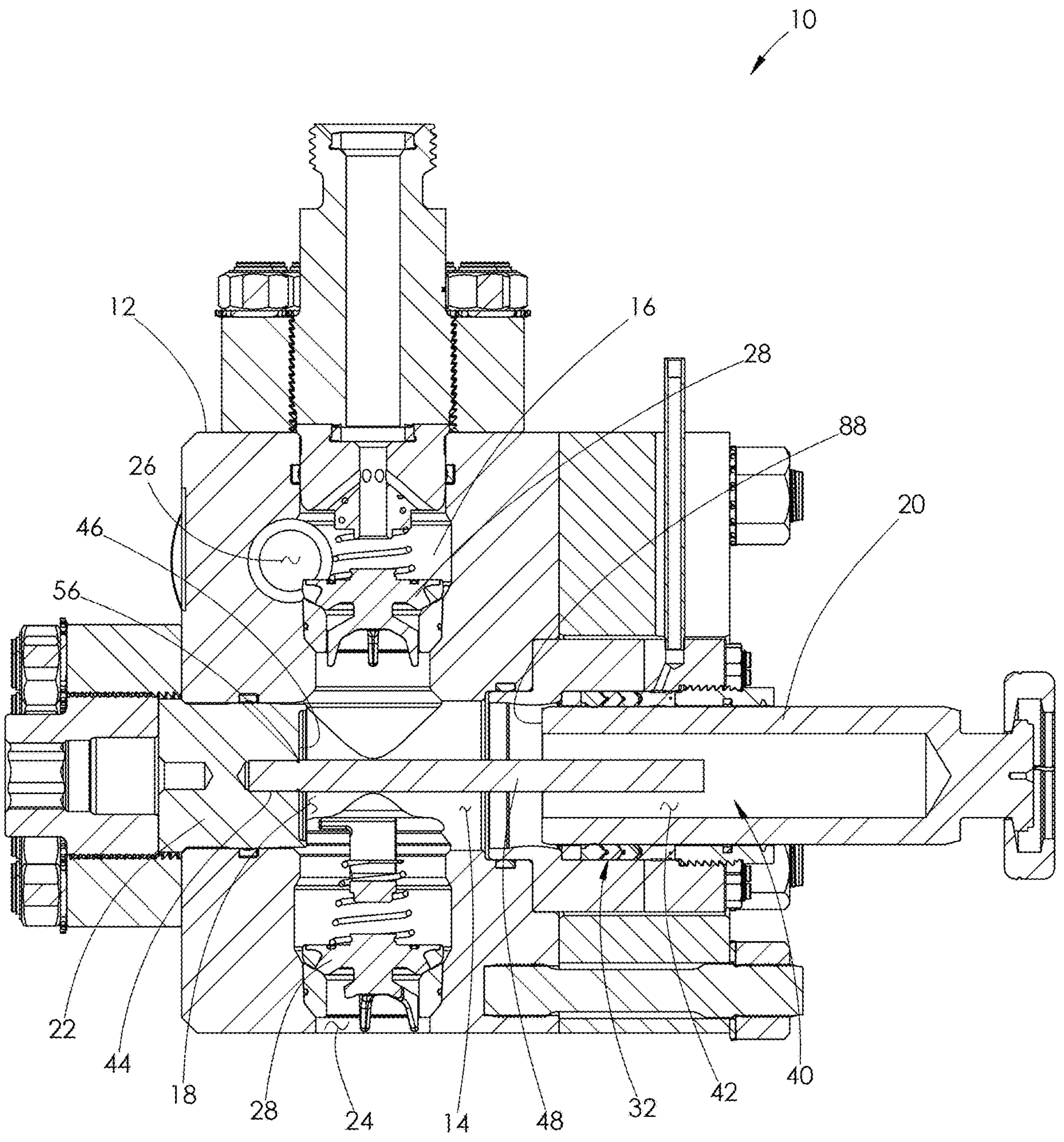
FIG. 6 is a cross-sectional view of the fluid end shown in FIG. 5, with the plunger of the liquid cooled plunger system in the fully retracted or minimally inserted position.

Turning to FIGS. 5 and 6, the fluid end 10 comprises a housing 12 having a plurality of horizontal bores 14 and a plurality of vertical bores 16 formed therein. Each vertical bore 16 intersects a corresponding horizontal bore 14 to form an internal chamber or cavity 18. A plunger 20 is installed within each horizontal bore 14. In this embodiment of a liquid cooled plunger system 40, the plunger 20 is made of an alloy steel. However, in alternative embodiments, the plunger 20 may be made of other materials. An opening of the horizontal bore 14 opposite the plunger 20 is sealed closed by a suction plug 22. A plunger packing 32 surrounds an exterior surface of the plunger 20.

During operation, the plunger 20 reciprocates within housing 12, specifically the horizontal bore 14 and the internal chamber 18, to pressurize fluid within the housing 12. The plunger 20 is reciprocable between a maximally inserted or fully extended position, and a minimally inserted or fully retracted position. FIG. 5 shows the plunger 20 in the maximally inserted position, while FIG. 6 shows the plunger 20 in the minimally inserted position. Fluid enters the housing 12 through an opening 24 at the lower end of the vertical bore 16 and exits the housing 12 through a discharge conduit 26. A pair of valves 28 route fluid throughout the housing 12 as the plunger 20 reciprocates.

Continuing with FIGS. 5 and 6, the fluid end 10 is shown with one embodiment of a liquid cooled plunger system 40 of the present disclosure installed therein. The liquid cooled plunger system 40 comprises a plunger 20 with a blind bore 42 formed therein. The blind bore 42 opens on a front surface 88 of the plunger 20. The blind bore 42, as well as other blind bores within plungers described herein, is configured to extend to a depth that results in the blind bore 42 being encircled or surrounded by the entirety of the plunger packing 32 in every position of the plunger 20. This may mean that the blind bore 42 extends at least half of the length of the plunger 20, or more. This allows adequate cooling of the plunger 20, described more herein. The blind bore 42 of plunger 20 originates on the front surface 88 of the plunger 20. The blind bore 42 does not intersect any other surface of the plunger 20.

In short, the plunger packing 32 is configured to surround the blind bore 42 while the plunger 20 is in both the maximally and minimally inserted positions, as well as all positions between.

The suction plug 22 also has a blind bore 44 formed therein and opening on a rear surface 46 of the suction plug 22. Installed within the blind bore 44 and projecting out and away from the suction plug 22 is an elongate stem 48. The stem 48 is positioned to extend into the blind bore 42 formed within the plunger 20. During operation, the stem 48 stays in one place and the plunger 20 reciprocates back and forth over the stem 48. Movement of the plunger 20 over the stem 48 causes the stem 48 to force fluid within the blind bore 42 of the plunger 20 to circulate or flow therein. Insertion of the stem 48 within the blind bore 42 forces the fluid to exit the blind bore 42. This allows new fluid to enter the blind bore 42 during operation, cooling the plunger 20.

Figure 7:
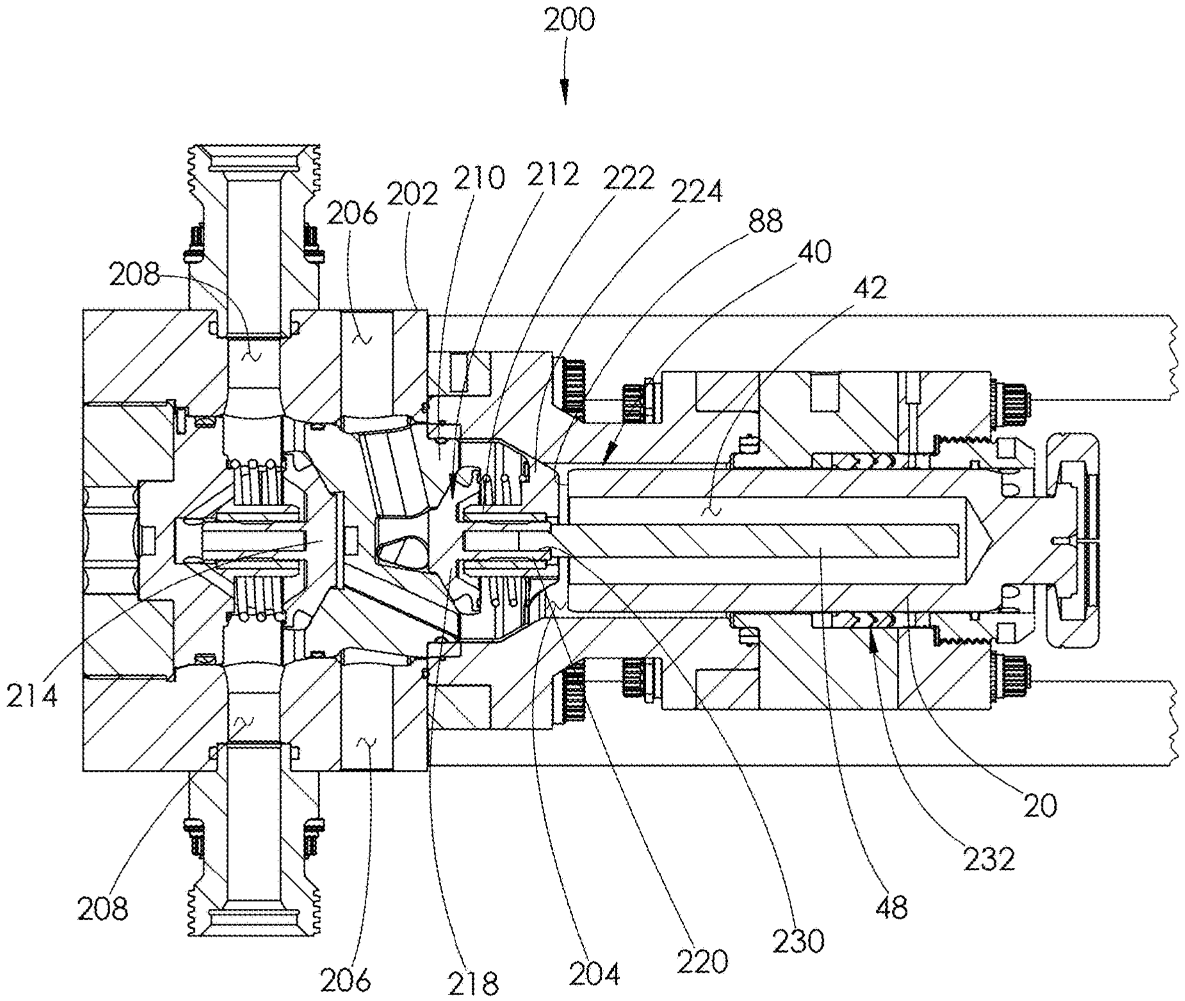
FIG. 7 is a cross-sectional view of the fluid end section shown in FIG. 3, taken along line B-B. The embodiment of the liquid cooled plunger system shown in FIG. 5 is shown installed therein. The plunger of the liquid cooled plunger system is in the fully extended position.
Figure 8:
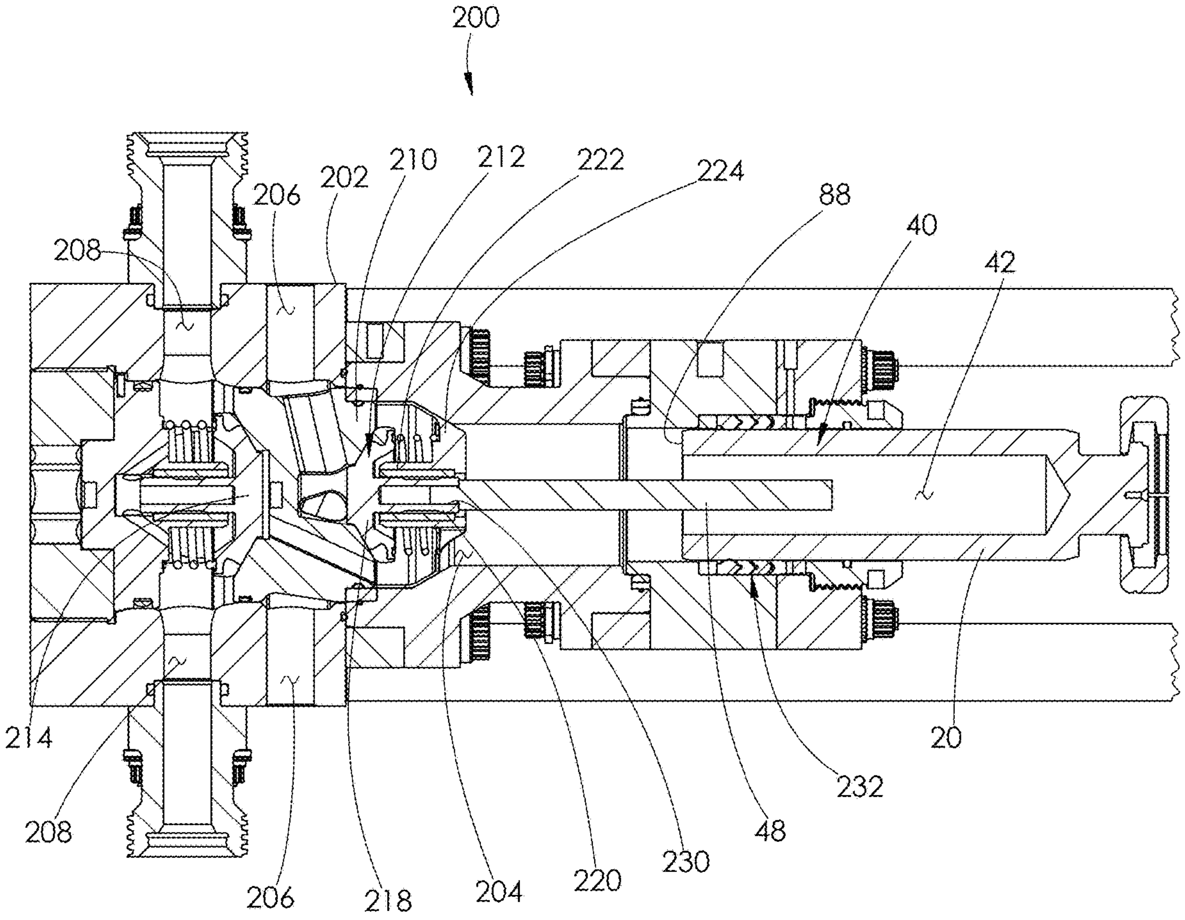
FIG. 8 is a cross-sectional view of the fluid end section shown in FIG. 7, with the plunger of the liquid cooled plunger system in the fully retracted position.

Turning now to FIGS. 7 and 8, the liquid cooled plunger system 40 is shown installed within the fluid end section 200. The liquid cooled plunger system 40 comprises a plunger 20, which is shown installed within the horizontal bore 204 and in a spaced relationship with the suction valve 212. The plunger 20 is in a maximally inserted or fully extended position in FIG. 7, and a minimally inserted or fully retracted position in FIG. 8. Plunger packing 232 prevents high pressure fluid from leaking between the plunger 20 and housing 202. The plunger packing 232 surrounds the plunger 20 when the plunger 20 is in both the maximally and minimally inserted positions, as well as all positions between the two. The suction valve 212 comprises a body 218 configured to seat against the fluid routing plug 210 and a valve stem 220 projecting from the body 218. The valve stem 220 is sized to reciprocate within a bore 222 formed within a suction valve guide 224 positioned between the suction valve 212 and the plunger 20. The suction valve guide 224 maintains the suction valve 212 in proper alignment relative to the fluid routing plug 210 during operation.

Continuing with FIGS. 7 and 8, an elongate stem 48 is shown situated within the plunger 20. The stem 48 is installed within a blind bore 230 formed within the valve stem 220 of the suction valve 212. The stem 48 may be installed within the blind bore 230 via threads, press-fit, or other means known in the art. The stem 48 extends away from the suction valve 212 and into the blind bore 42 of the plunger 20. During operation, the plunger 20 reciprocates over the stem 48. In contrast to the system 40 as shown installed within the fluid end 10 in FIGS. 5 and 6, the stem 48 is attached to the suction valve 212. Because the stem 48 is attached to the suction valve 212, the stem 48 also moves in and out of the plunger 20 a short distance as the suction valve 212 moves between open and closed positions. The system 40 installed in the fluid end section 200 functions to cool the plunger 20 in the same manner as the system 40 installed in the fluid end 10 as shown in FIGS. 5 and 6.

Figure 9:
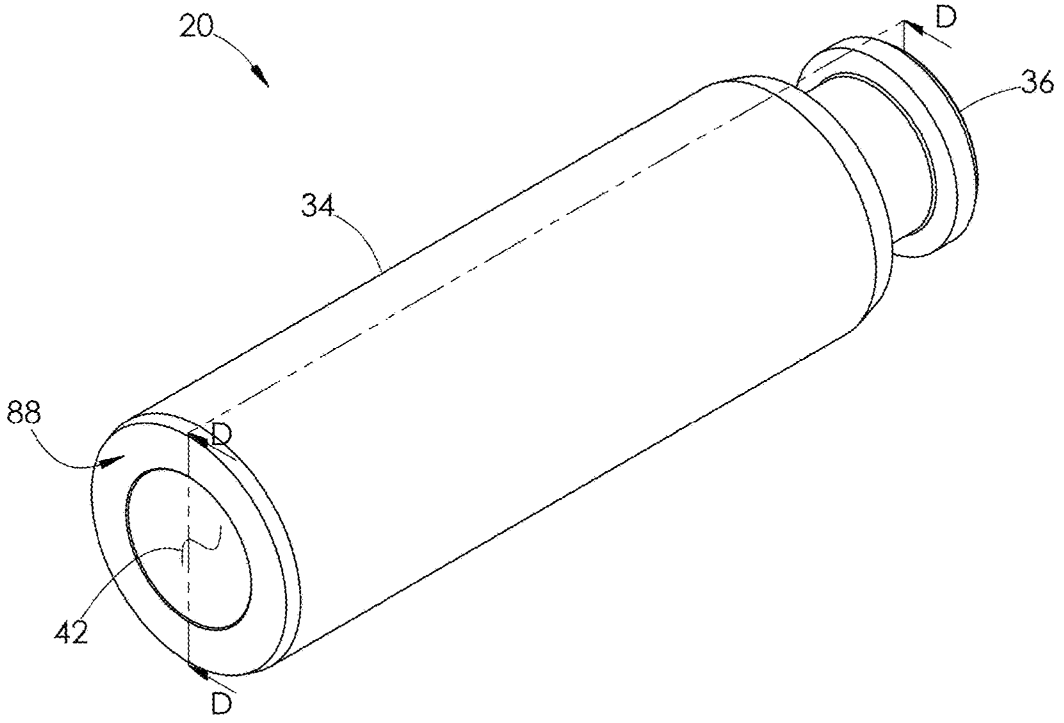
FIG. 9 is an isometric view of the plunger used in the liquid cooled plunger system shown in FIGS. 5-8.
Figure 10:
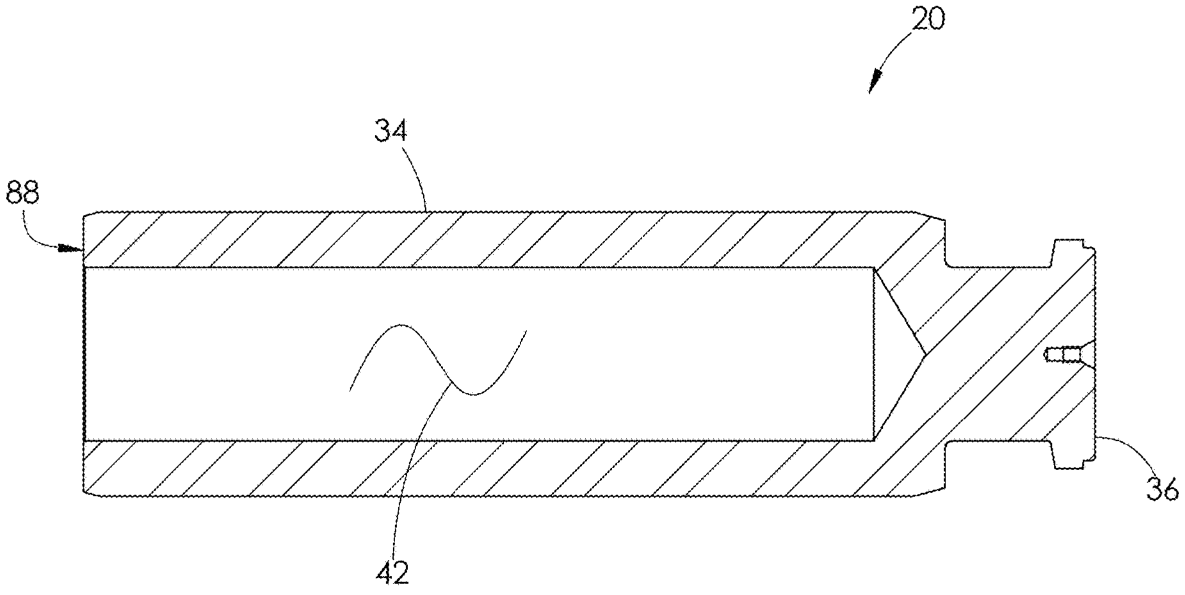
FIG. 10 is a cross-sectional view of the plunger shown in FIG. 9, taken along line D-D.

Turning now to FIGS. 9 and 10, the plunger 20 is shown in greater detail. The plunger 20 may be used in multiple embodiments of liquid cooled systems described herein. A general description of the plunger 20 is discussed below.

The plunger 20 comprises opposed first and second surfaces 88 and 36. The first surface 88 may also be referred to as a front surface. Likewise, the second surface 36 may also be referred to as a rear surface. Further, the first and second surfaces 88 and 36 may also be referred to as first and second ends. The first surface 88 is configured to stay within the fluid end 10 or fluid end section 200 during operation, while the second surface 36 is configured to protrude from the fluid end 10/fluid end section 200 during operation. Likewise, the first surface 88 is configured to be exposed to the internal chamber 18 or horizontal bore 204, while the second surface 36 is not.

The surfaces 88 and 36 are joined by an intermediate outer surface 34. The intermediate outer surface 34 is configured to contact the plunger packing 32/232. As described herein, the blind bore 42 is formed within the first surface 88 of plunger 20. The blind bore 42 may receive various objects or components, as described herein. In some embodiments, the blind bore 42 may be in fluid communication with the internal chamber 18 or horizontal bore 204. In alternative embodiments discussed herein, the blind bore 42 may not be in fluid communication with the internal chamber 18 or horizontal bore 204.

Figure 11:
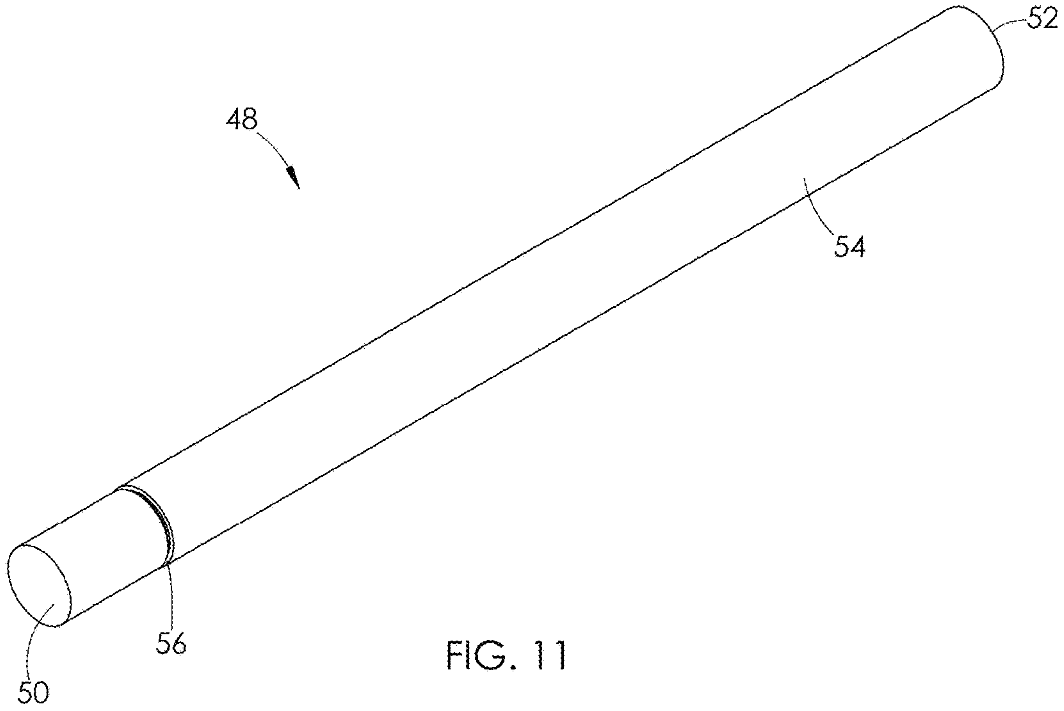
FIG. 11 is an isometric view of the stem used with the liquid cooled plunger system shown in FIGS. 5-8.
Figure 12:
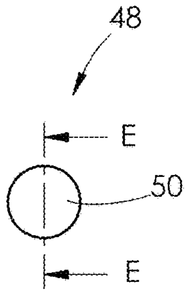
FIG. 12 is a front elevational view of the stem shown in FIG. 11.
Figure 13:
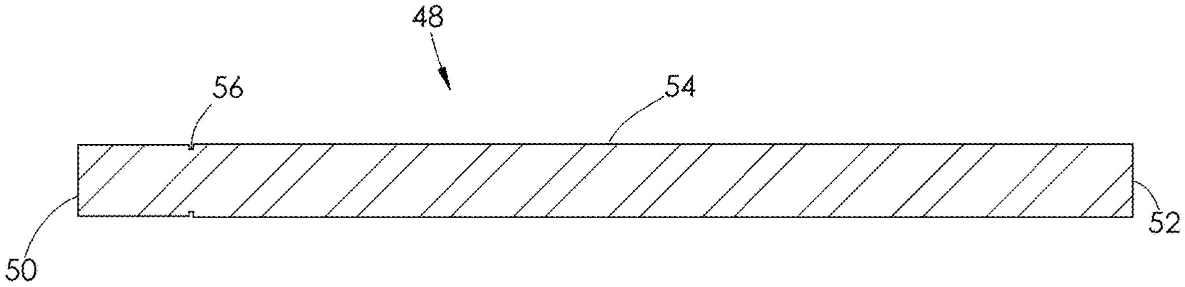
FIG. 13 is a cross-sectional view of the stem shown in FIG. 12, taken along line E-E.

Turning now to FIGS. 11-13, the stem 48 is shown in more detail. The stem 48 comprises opposed first and second ends 50 and 52 joined by a solid elongate body 54. When used in fluid end 10, the first end 50 is installed within the blind bore 44 formed in the suction plug 22. The first end 50 may be threaded or press fit into the blind bore 44, or attached to the suction plug 22 by other means known in the art. A groove 56 is formed in the outer surface of the body 54 adjacent the first end 50. When the first end 50 is installed within the blind bore 44 of the suction plug 22, the groove 56 may be positioned immediately adjacent the rear surface 46 of the suction plug 22. The groove 56 is a relief cutout. When installed in fluid end section 200, the first end 50 is situated within the blind bore 230 of the valve stem 220 of the suction valve 212. The first end 50 may be threaded or press-fit into the blind bore 230, or attached to the suction valve 212 by other means known in the art. The groove 56 may be positioned immediately adjacent the rear surface of the valve stem 220. In alternative embodiments, a seal (not shown) may be installed within the groove 56 to prevent fluid from leaking into the blind bore 44 of the suction plug 22 or the blind bore 230 of the valve stem 220. The stem 48 shown in the figures is solid. In alternative embodiments, the stem 48 may have a cavity formed therein to reduce any unnecessary weight.

Figure 14:
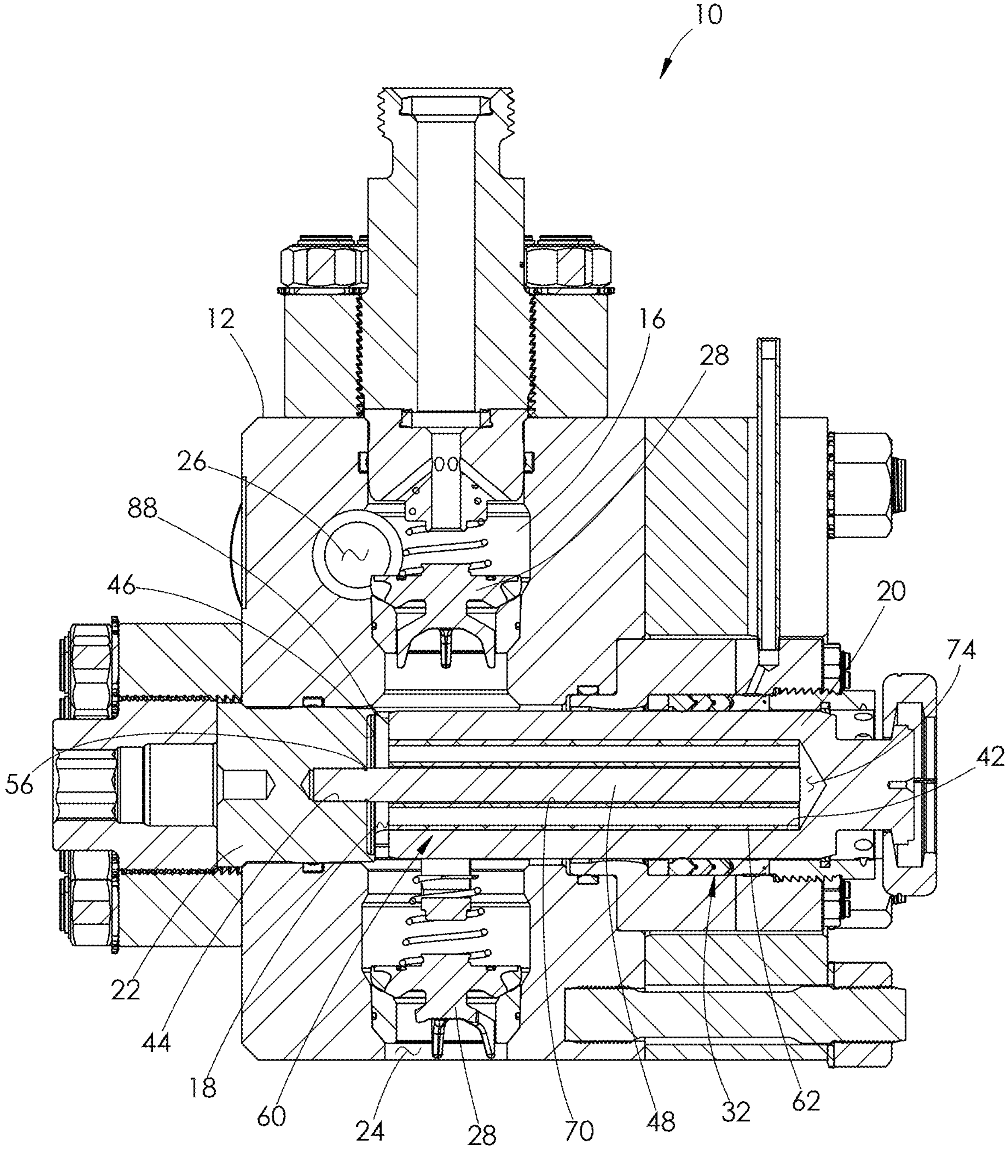
FIG. 14 is a cross-sectional view of the fluid end shown in FIG. 1, taken along line C-C with another embodiment of a liquid cooled plunger system installed therein. The plunger of the liquid cooled plunger system is in the fully extended or maximally inserted position.
Figure 15:
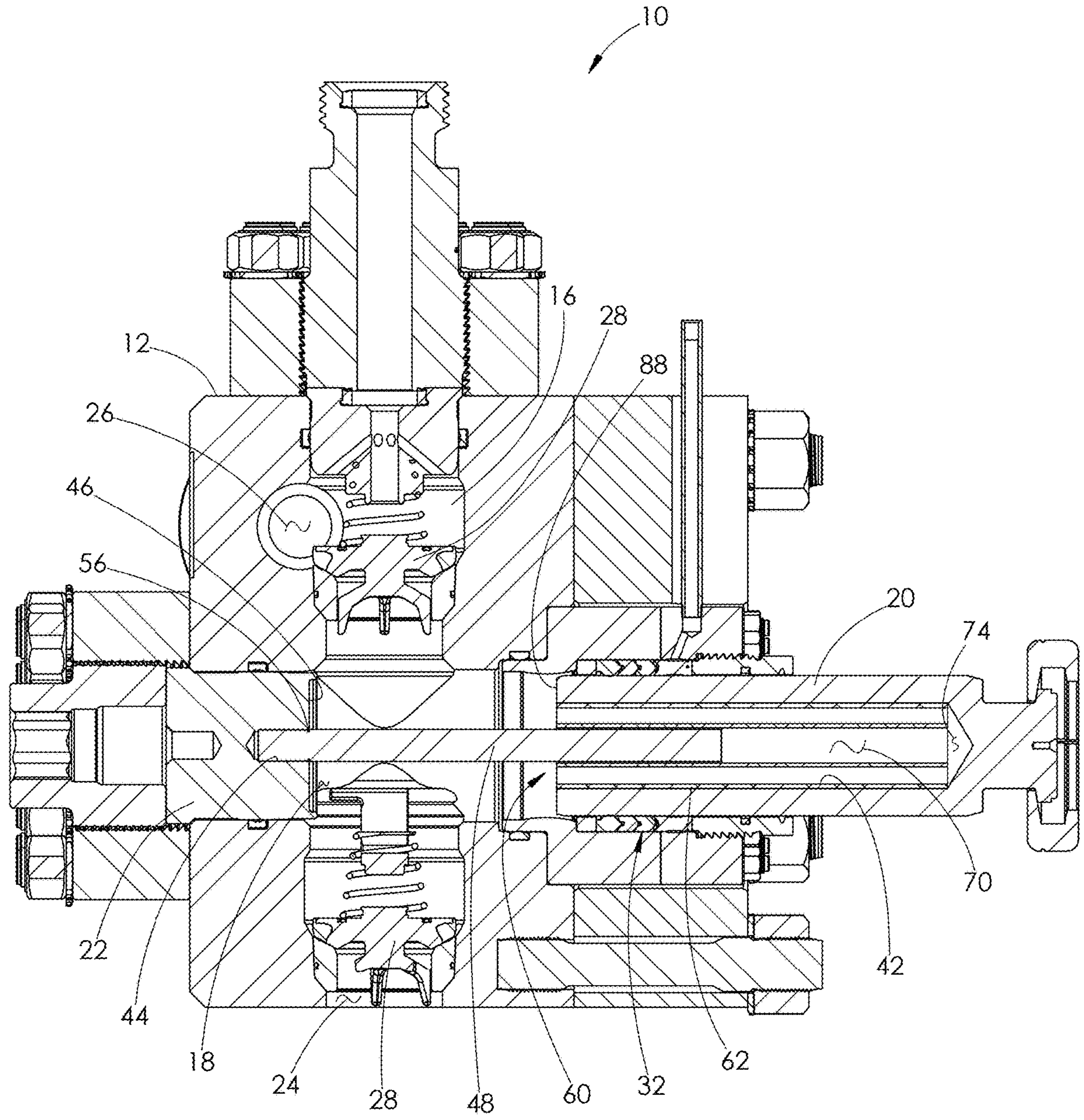
FIG. 15 is a cross-sectional view of the fluid end shown in FIG. 14, with the plunger of the liquid cooled plunger system in the fully retracted or minimally inserted position.

Turning to FIGS. 14 and 15, another embodiment of a liquid cooled plunger system 60 is shown installed in the fluid end 10. The liquid cooled plunger system 60 is similar to the liquid cooled plunger system 40 shown in FIGS. 5 and 6, but further utilizes a heat exchanger 62. The heat exchanger 62 is installed within the blind bore 42 of the plunger 20 and provides more surface area for dissipating heat to fluid within the interior of the plunger 20. The heat exchanger 62 also helps to more uniformly distribute and circulate fluid throughout the interior of the plunger 20. The plunger 20 is shown in the maximally inserted or fully extended position in FIG. 14, and the minimally inserted or fully retracted position in FIG. 15.

Figure 16:
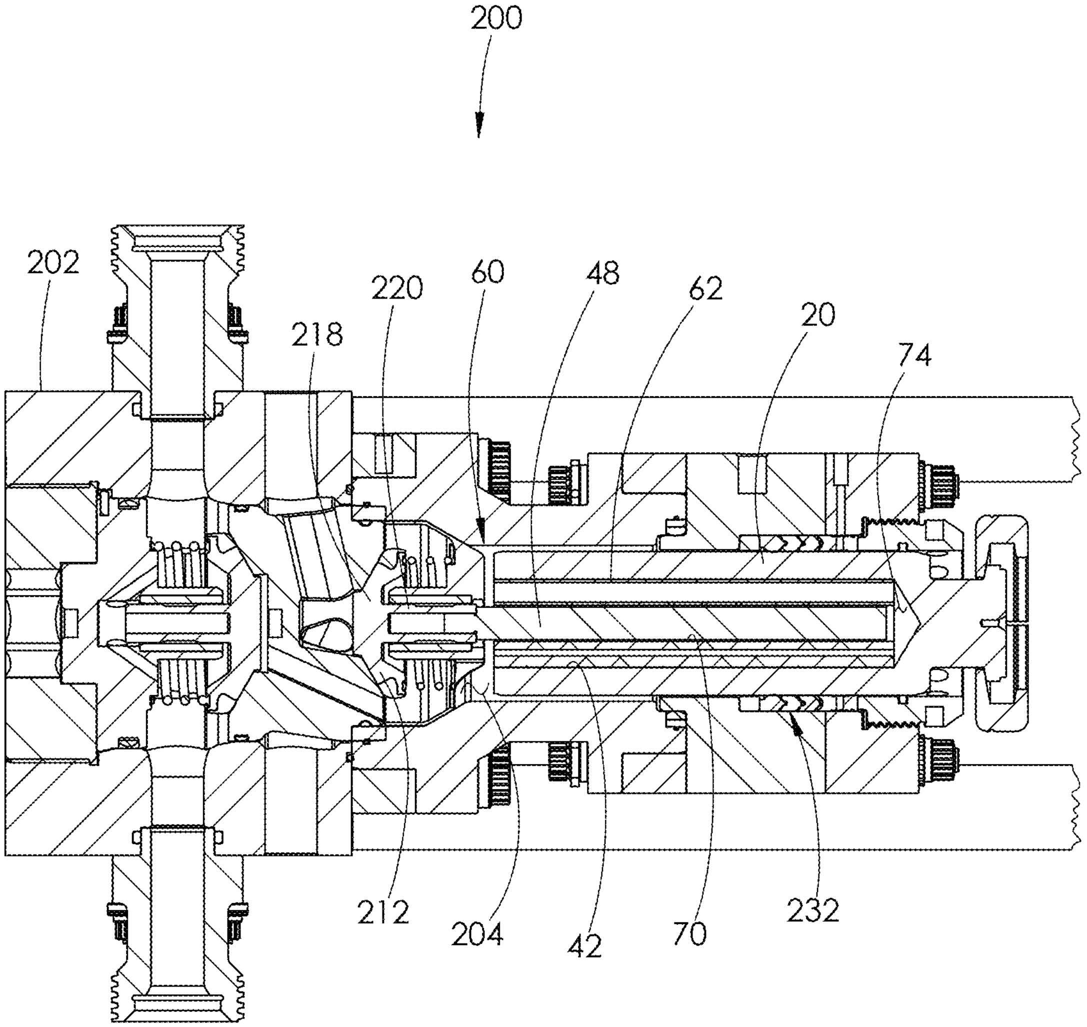
FIG. 16 is a cross-sectional view of the fluid end section shown in FIG. 3, taken along line B-B. The embodiment of the liquid cooled plunger system shown in FIG. 14 is installed therein. The plunger of the liquid cooled plunger system is in the fully extended or maximally inserted position.
Figure 17:
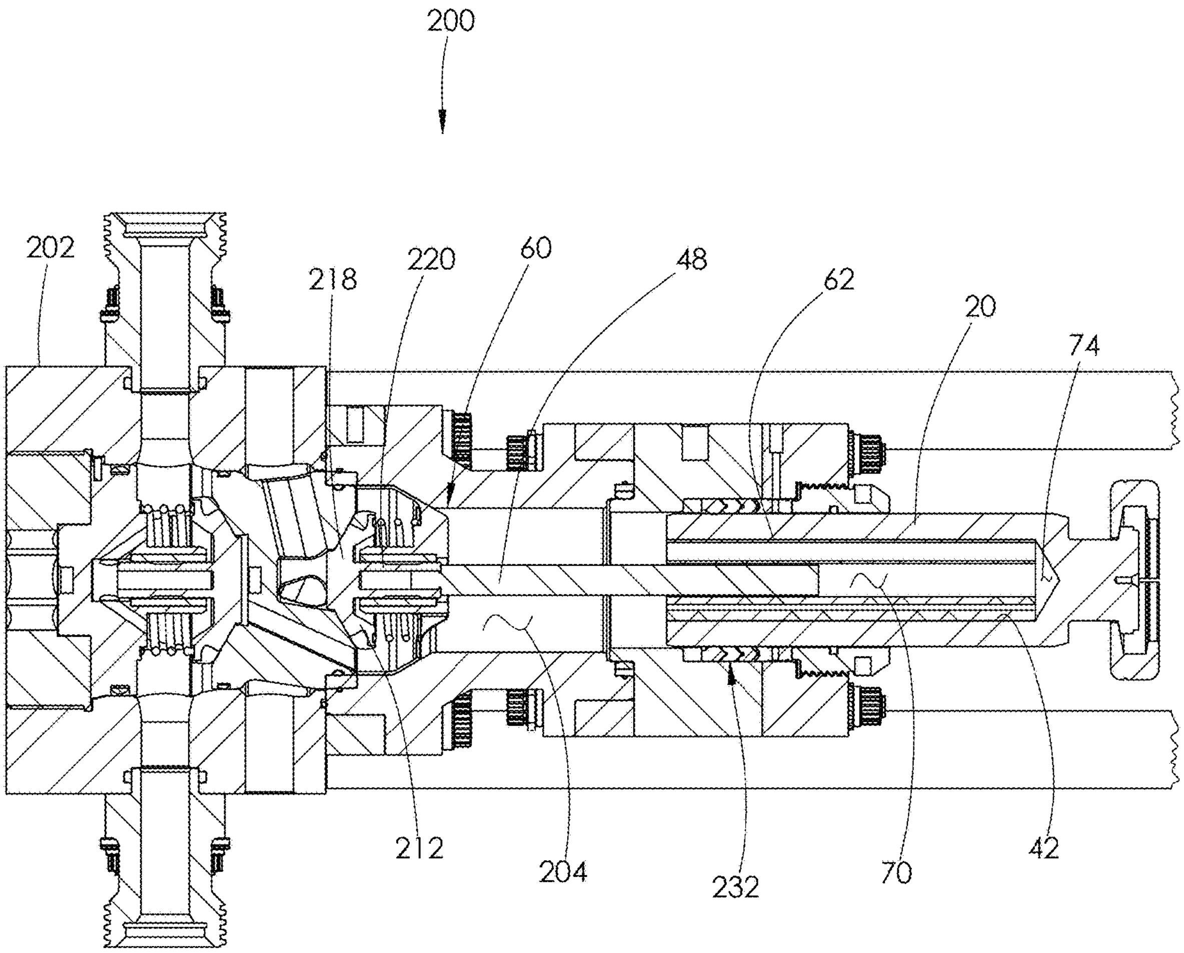
FIG. 17 is a cross-sectional view of the fluid end section shown in FIG. 16, with the plunger of the liquid cooled plunger system in the fully retracted or minimally inserted position.

Turning to FIGS. 16 and 17, the liquid cooled plunger system 60 is shown installed within the fluid end section 200. In alterative embodiments, the liquid cooled plunger system 60 may utilize the heat exchanger 110 in place of the heat exchanger 62. The plunger 20 is shown in the maximally inserted or fully extended position in FIG. 16, and the minimally inserted or fully retracted position in FIG. 17.

With reference to FIGS. 14-17, when the heat exchanger 62 is installed within the plunger 20, the stem 48 is positioned to be installed within the central passage 70. During operation, plunger 20 moves back and forth over the stem 48 such that central passage 70 reciprocates around the stem 48. Fluid within the plunger 20 flows through the plurality of passages 72, into the cavity 74 and back through the same or another passage 72. New fluid from the internal chamber 18 or horizontal bore 204 is continually circulated throughout the plunger 20 to help cool the plunger 20 during operation.

Figure 18:
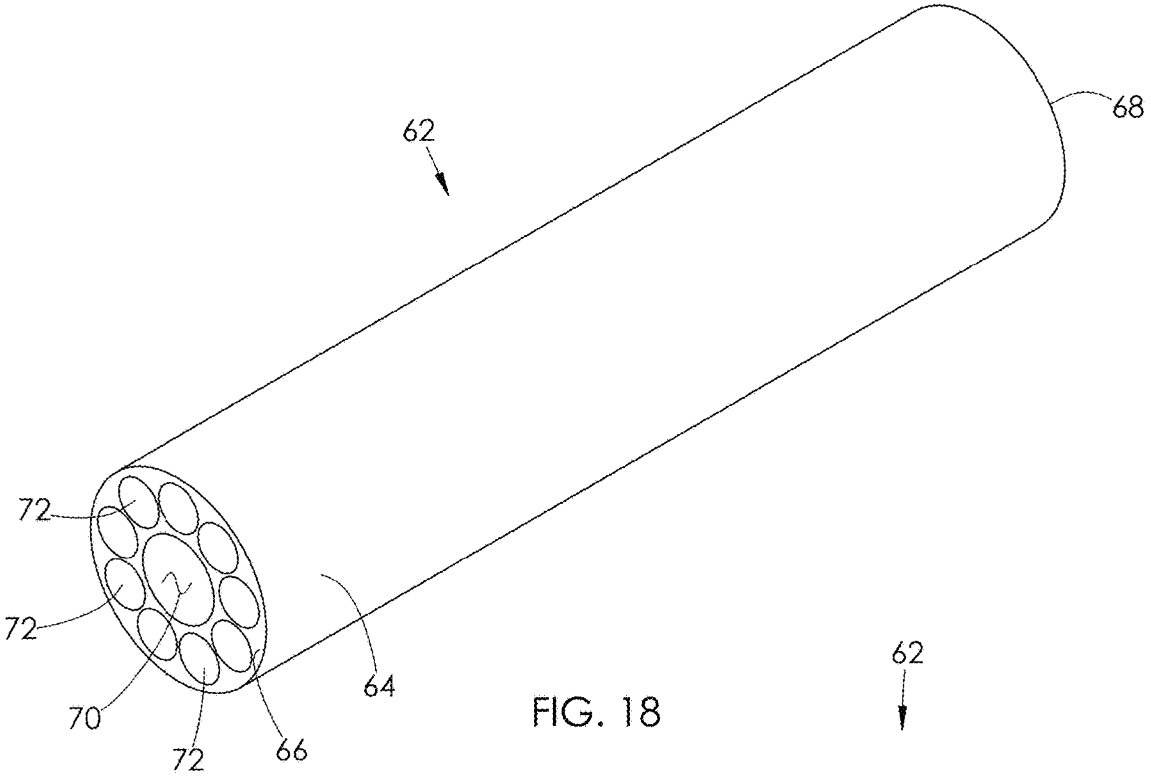
FIG. 18 is an isometric view of the heat exchanger used with the liquid cooled plunger system shown in FIGS. 14-17.
Figure 19:
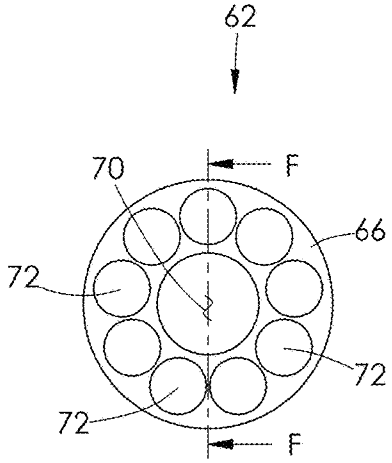
FIG. 19 is a front elevational view of the heat exchanger shown in FIG. 18.
Figure 20:
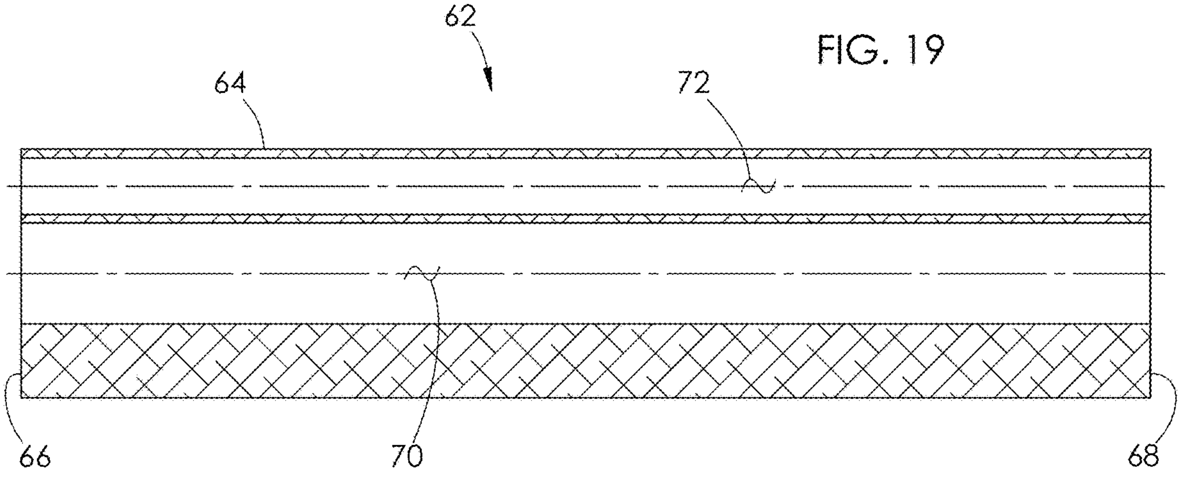
FIG. 20 is a cross-sectional view of the heat exchanger shown in FIG. 19, taken along line F-F.

Turning now to FIGS. 18-20, the heat exchanger 62 is shown in more detail. The heat exchanger 62 comprises an elongate body 64 having opposed first and second surfaces 66 and 68. A central passage 70 is formed within the interior of the heat exchanger 62 and interconnects the opposed first and second surfaces 66 and 68. A plurality of passages 72 are also formed in the heat exchanger 62. The plurality of passages 72 surround the central passage 70 and interconnect the opposed first and second surfaces 66 and 68. The heat exchanger 62 is sized to slide closely or have an interference fit within the blind bore 42 formed in the plunger 20, as shown in FIGS. 14-17. When installed therein, the central passage 70 and the plurality of passages 72 open into a cavity 74 formed between the base of the blind bore 42 and the second surface 68 of the heat exchanger 62, as shown in FIGS. 14-17. In this embodiment, the heat exchanger 62 is made of aluminum, however in alternative embodiments the heat exchanger 62 may be made of other materials. It is preferable that the material forming the heat exchanger 62 have a higher thermal conductivity than the material forming the plunger 20.

Turning to FIGS. 21-25, another embodiment of a liquid cooled plunger system 80 is shown. The system 80 is shown in a fluid end 10 in FIGS. 21 and 22, and a fluid end section 200 in FIGS. 23 and 24. The system 80 functions within the fluid end section 200 in the same manner as the system 80 functions within the fluid end 10. The plunger 20 of the system 80 is shown in the maximally inserted or fully extended position in FIGS. 21 and 23, and the minimally inserted or fully retracted position in FIGS. 22 and 24. As with all embodiments, the plunger packing 32/232 surrounds the blind bore 42 of the plunger 20 when the plunger 20 is in both the maximally and minimally inserted positions.

Continuing with FIGS. 21-25, the system 80 does not utilize a stem. Instead, a ball valve 82 is installed within the blind bore 42 of the plunger 20. The ball valve 82 comprises a ball 84 and a seat 86. The seat 86 is installed within the blind bore 42 immediately adjacent a front surface 88 of the plunger 20. The seat 86 may be press-fit within the blind bore 42 or installed within the plunger 20 by other means known in the art.

Figure 21:
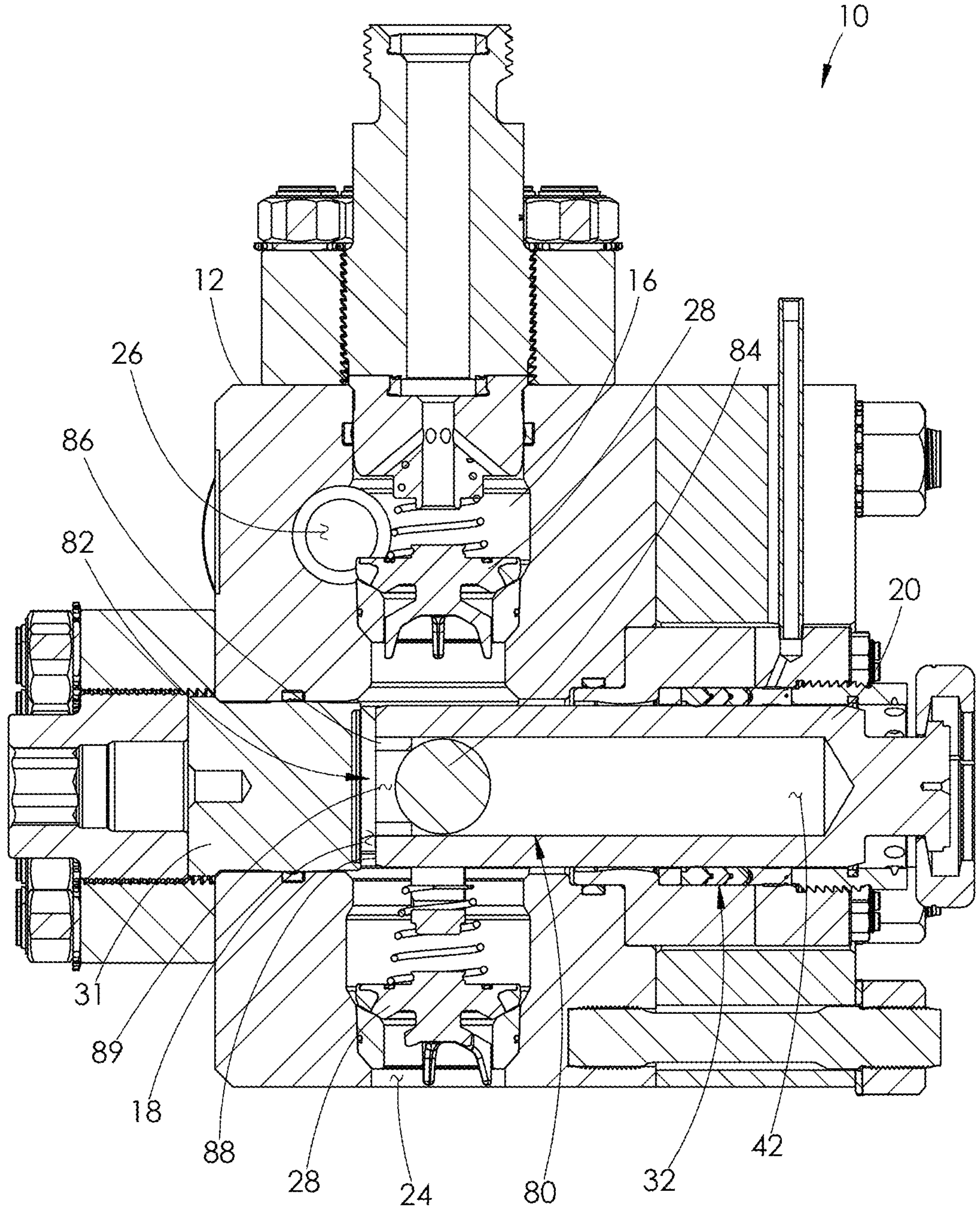
FIG. 21 is a cross-sectional view of the fluid end shown in FIG. 1, taken along line C-C, with another embodiment of a liquid cooled plunger system installed therein. The plunger of the liquid cooled plunger system is in the fully extended or maximally inserted position.
Figure 22:
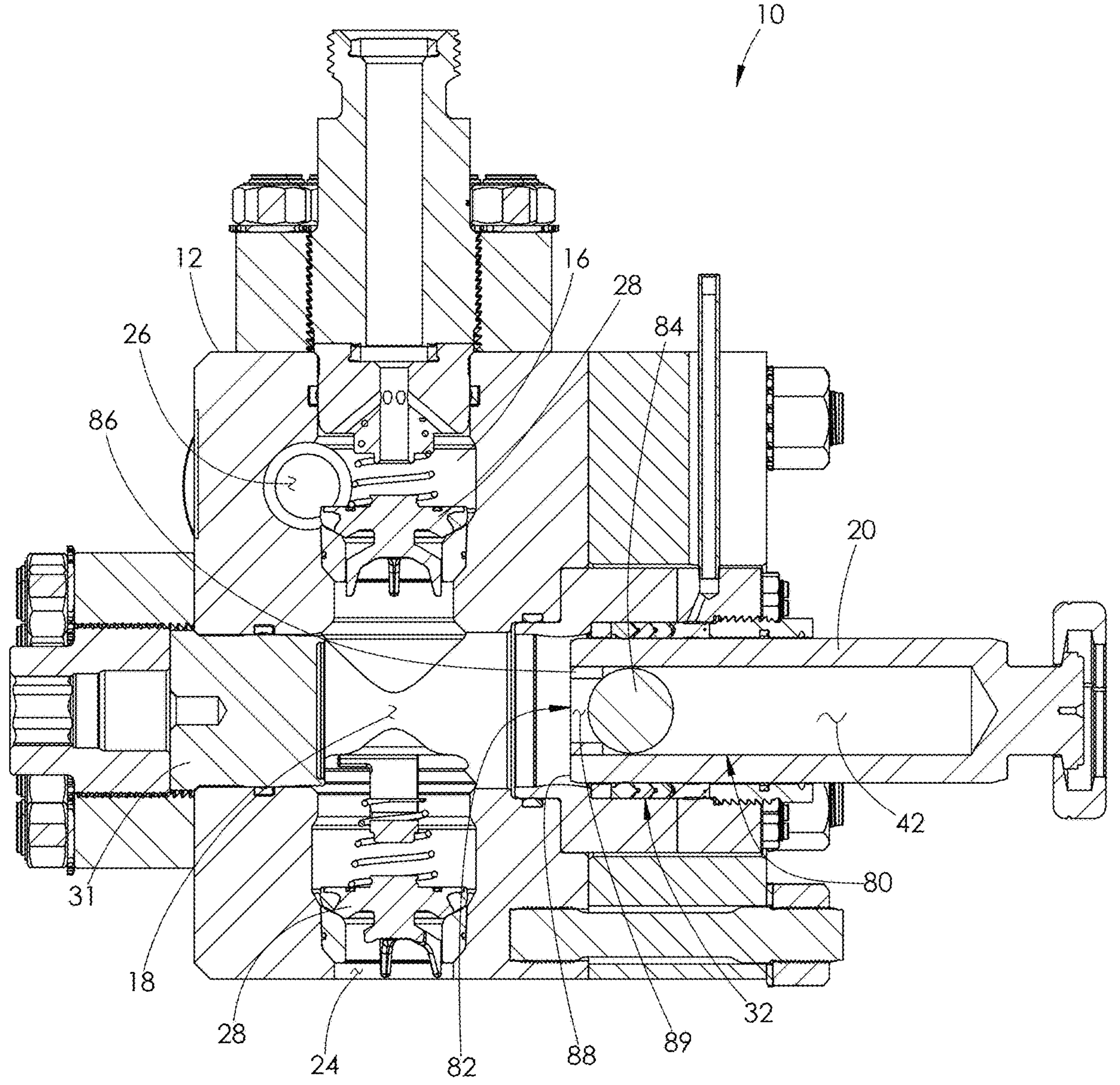
FIG. 22 is a cross-sectional view of the fluid end shown in FIG. 21, with the plunger of the liquid cooled plunger system in the fully retracted or minimally inserted position.
Figure 23:
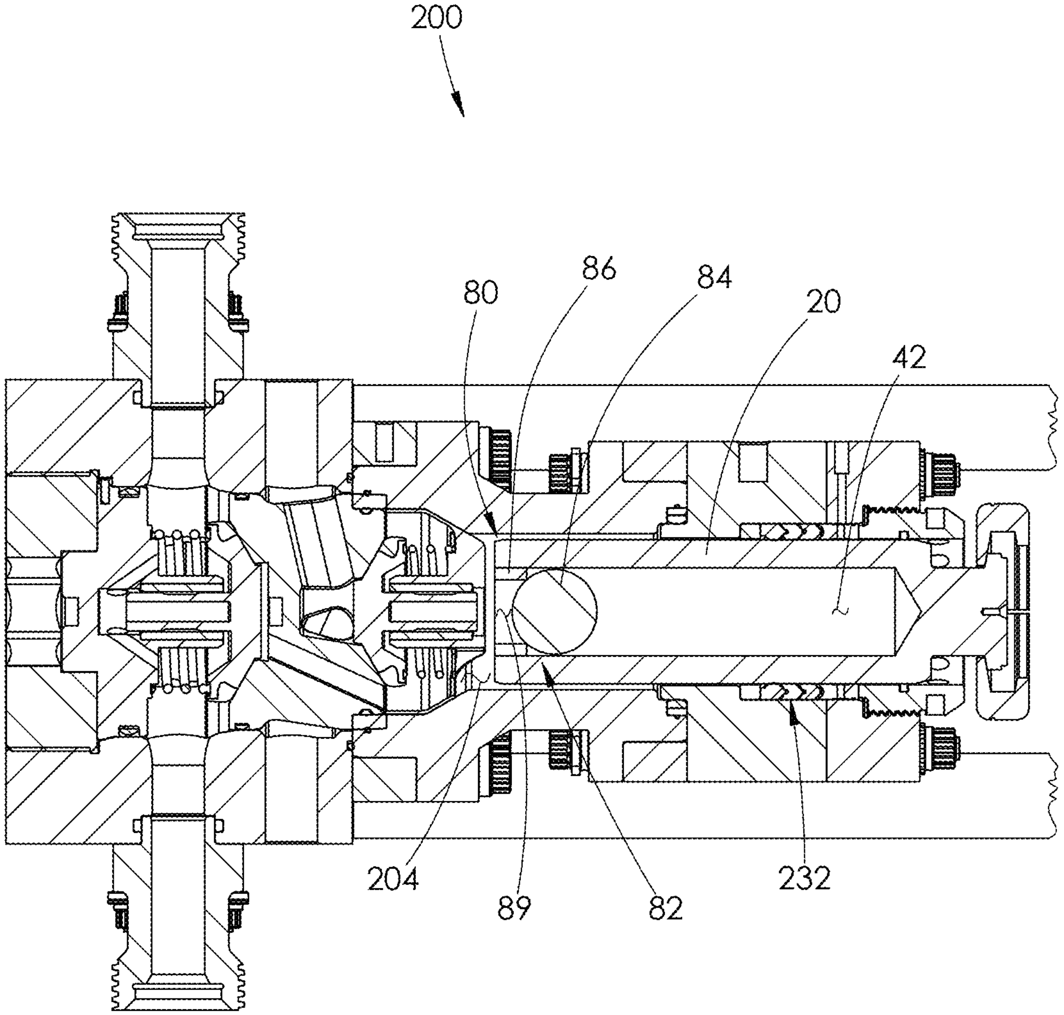
FIG. 23 is a cross-sectional view of the fluid end section shown in FIG. 3, taken along line B-B. The embodiment of the liquid cooled plunger system shown in FIG. 21 is installed therein. The plunger of the liquid cooled plunger system is in the fully extended or maximally inserted position.
Figure 24:
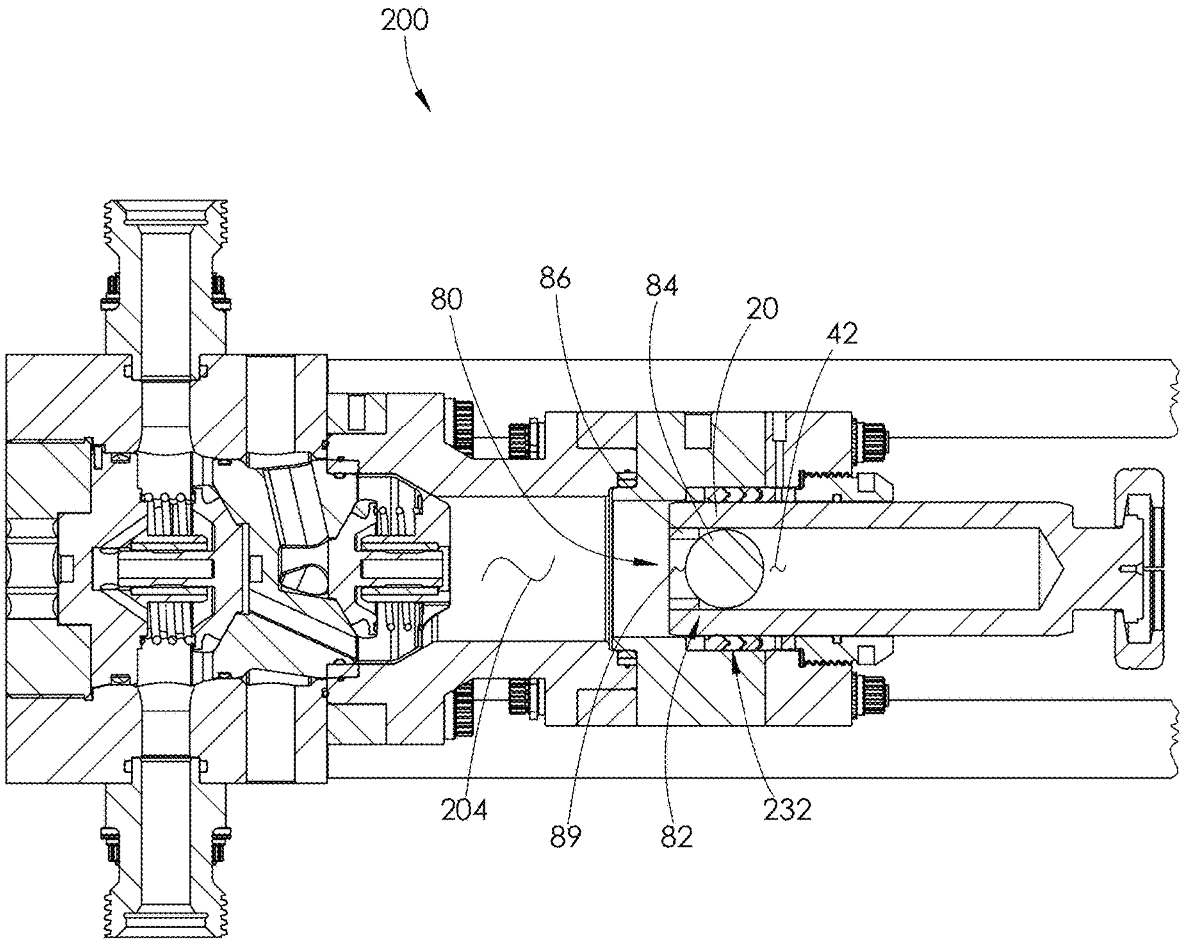
FIG. 24 is a cross-sectional view of the fluid end section shown in FIG. 23, with the plunger of the liquid cooled plunger system in the fully retracted or minimally inserted position.
Figure 25:
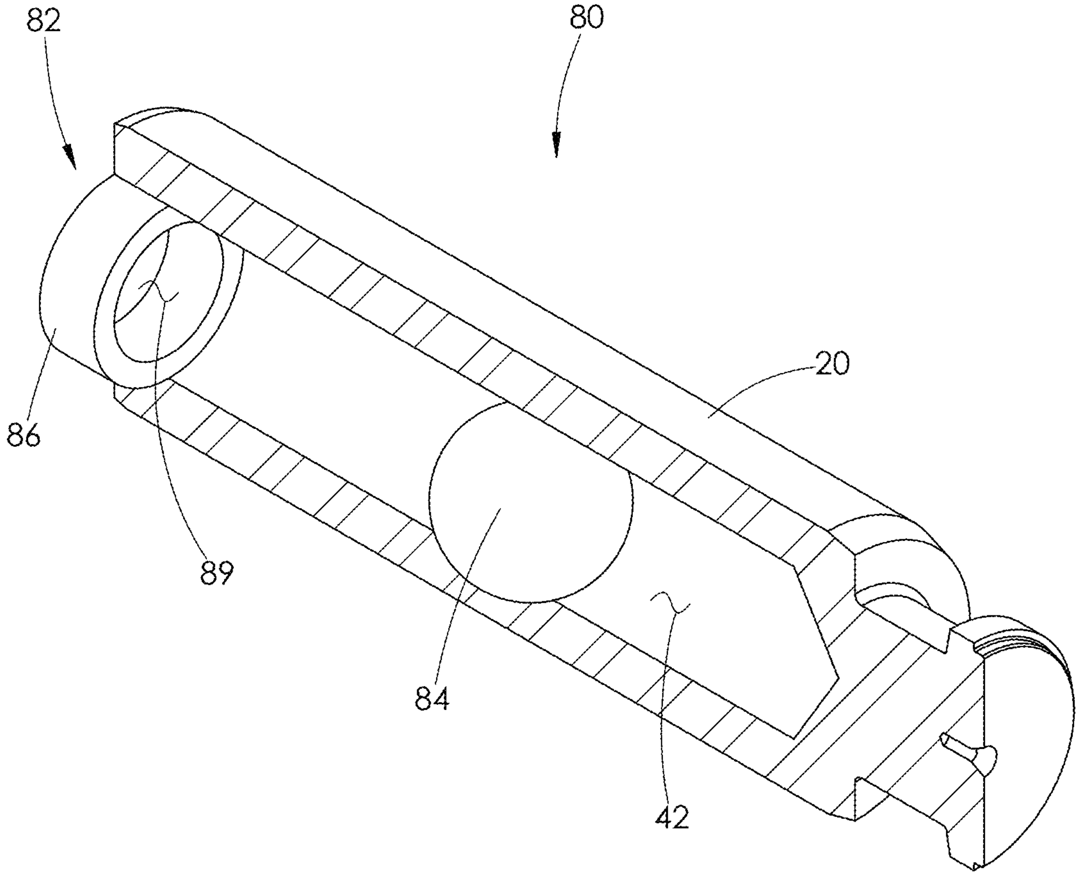
FIG. 25 is a rear isometric and partial cross-sectional view of the liquid cooled plunger system shown in FIGS. 21-24.

The seat 86 comprises a central opening 89 sized to be blocked by the ball 84, as shown in FIGS. 21 and 23. When the ball 84 is seated over the central opening 89, the ball valve 82 is in a closed position. When the ball 84 moves away from the seat 86, the ball valve 82 is in an open position. During operation, as the plunger 20 reciprocates within the housing 12, the ball 84 moves back and forth within the blind bore 42, thereby continually opening and closing the ball valve 82. Movement of the ball 84 within the plunger 20 forces fluid within the blind bore 42 to circulate or flow into and out of the blind bore 42, thereby continually bringing new and cooler fluid into the plunger 20. The system 80 may be used in any fluid end known in the art by simply replacing the current plunger with the system 80.

Turning to FIGS. 26-30, another embodiment of a liquid cooled plunger system 90 is shown. The liquid cooled plunger system 90 is similar to the system 80 shown in FIGS. 21-25, but the system 90 also utilizes the heat exchanger 62. Instead of installing a stem 48 within the heat exchanger 62, the liquid cooled plunger system 90 utilizes a ball valve 92. The ball valve 92 comprises a ball 94 and a seat 96. The seat 96 has a central opening 98 and a plurality of openings 100 formed therein. The openings 98 and 100 are sized and positioned to correspond with the central passage 70 and the plurality of passages 72 formed within the heat exchanger 62. The ball 94 is much smaller than the ball 84 and is sized to fit within the central passage 70 of the heat exchanger 62. The ball valve 92 operates in the same manner as the ball valve 82 but fluid is also moved throughout the heat exchanger 62. The heat exchanger 62 provides the same benefits as described above—more surface area to dissipate heat and more uniform movement of fluid.

Figure 26:
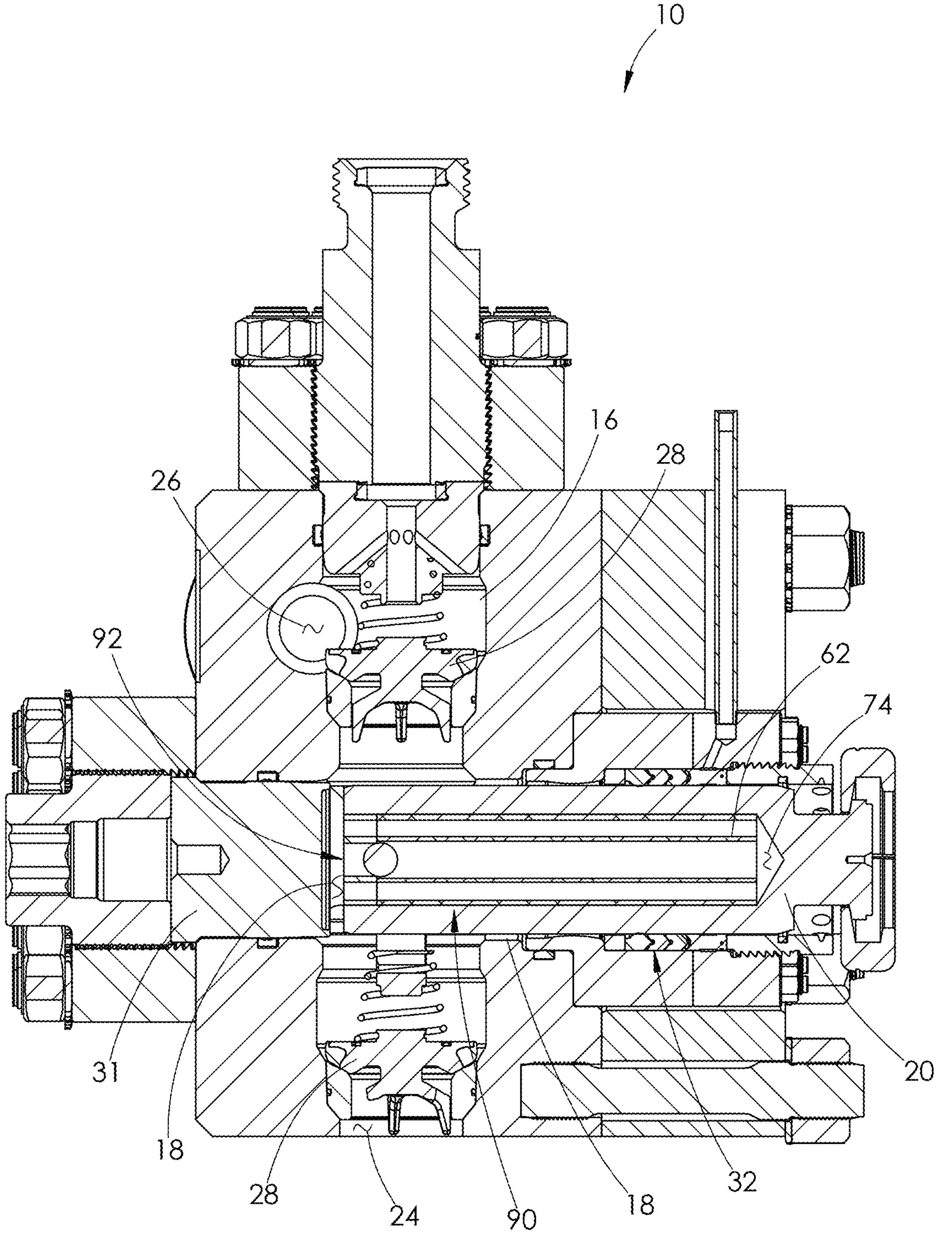
FIG. 26 is a cross-sectional view of the fluid end shown in FIG. 1, taken along line C-C, with another embodiment of a liquid cooled plunger system installed therein. The plunger of the liquid cooled plunger system is in the fully extended or maximally inserted position.
Figure 27:
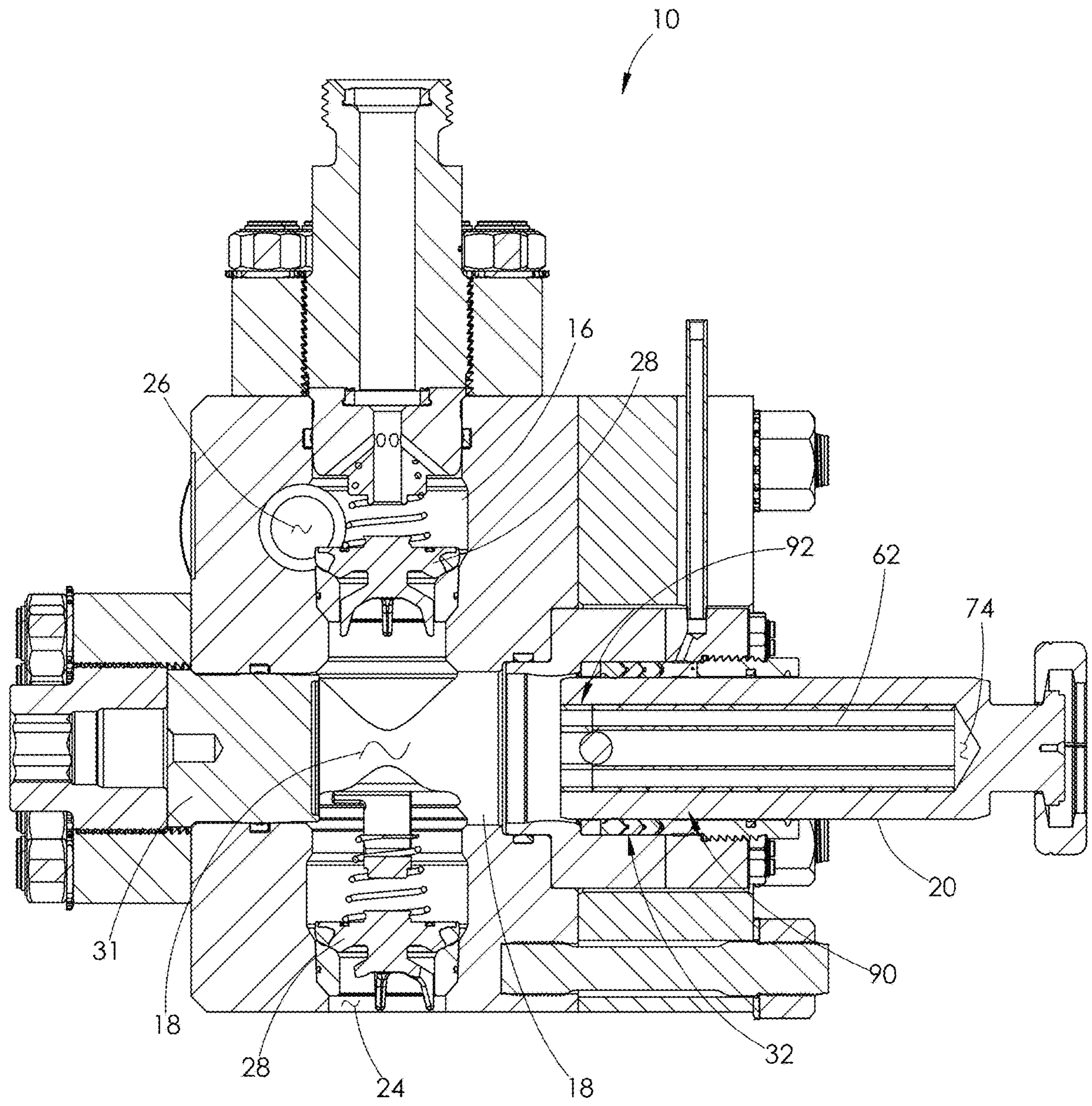
FIG. 27 is a cross-sectional view of the fluid end shown in FIG. 26, with the plunger of the liquid cooled plunger system in the fully retracted or minimally inserted position.
Figure 28:
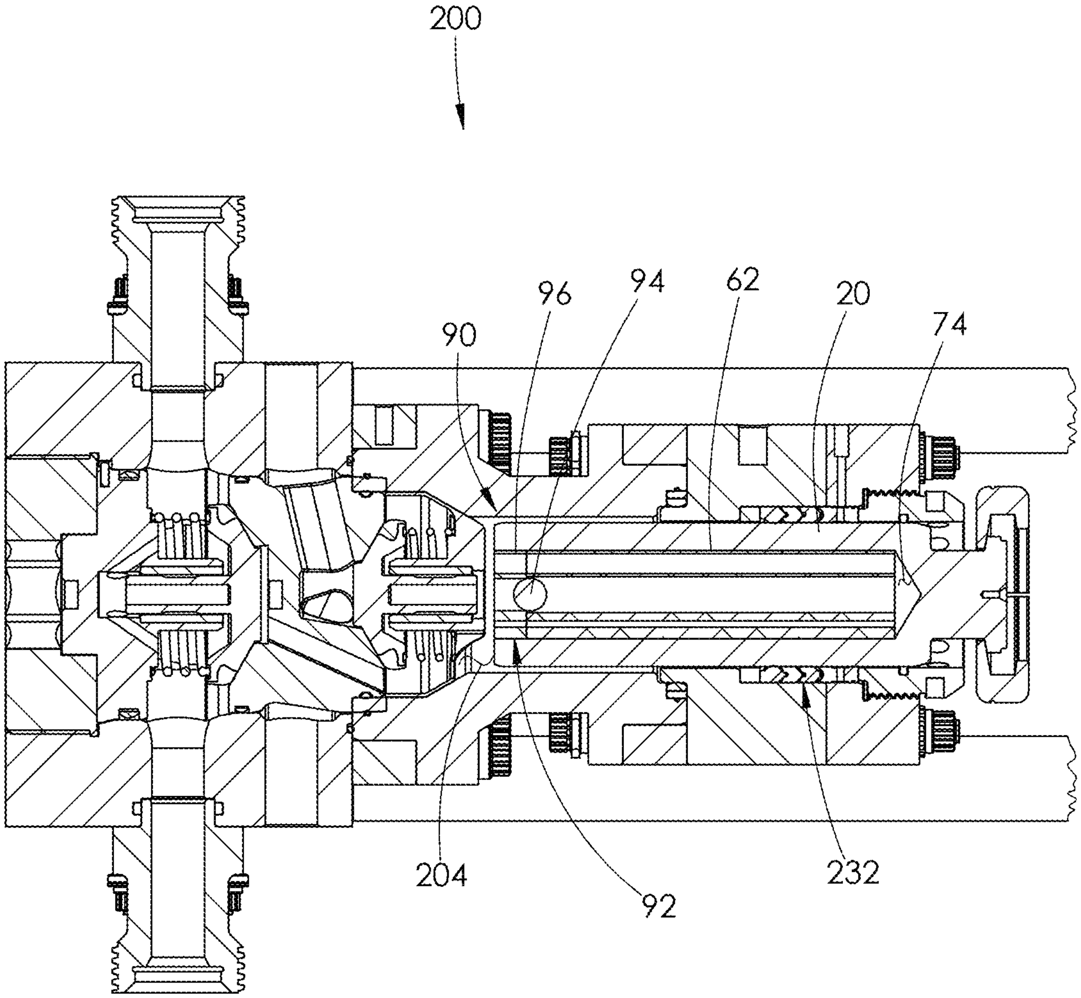
FIG. 28 is a cross-sectional view of the fluid end section shown in FIG. 3, taken along line B-B. The embodiment of the liquid cooled plunger system shown in FIG. 26 is installed therein. The plunger of the liquid cooled plunger system is in the fully extended or maximally inserted position.
Figure 29:
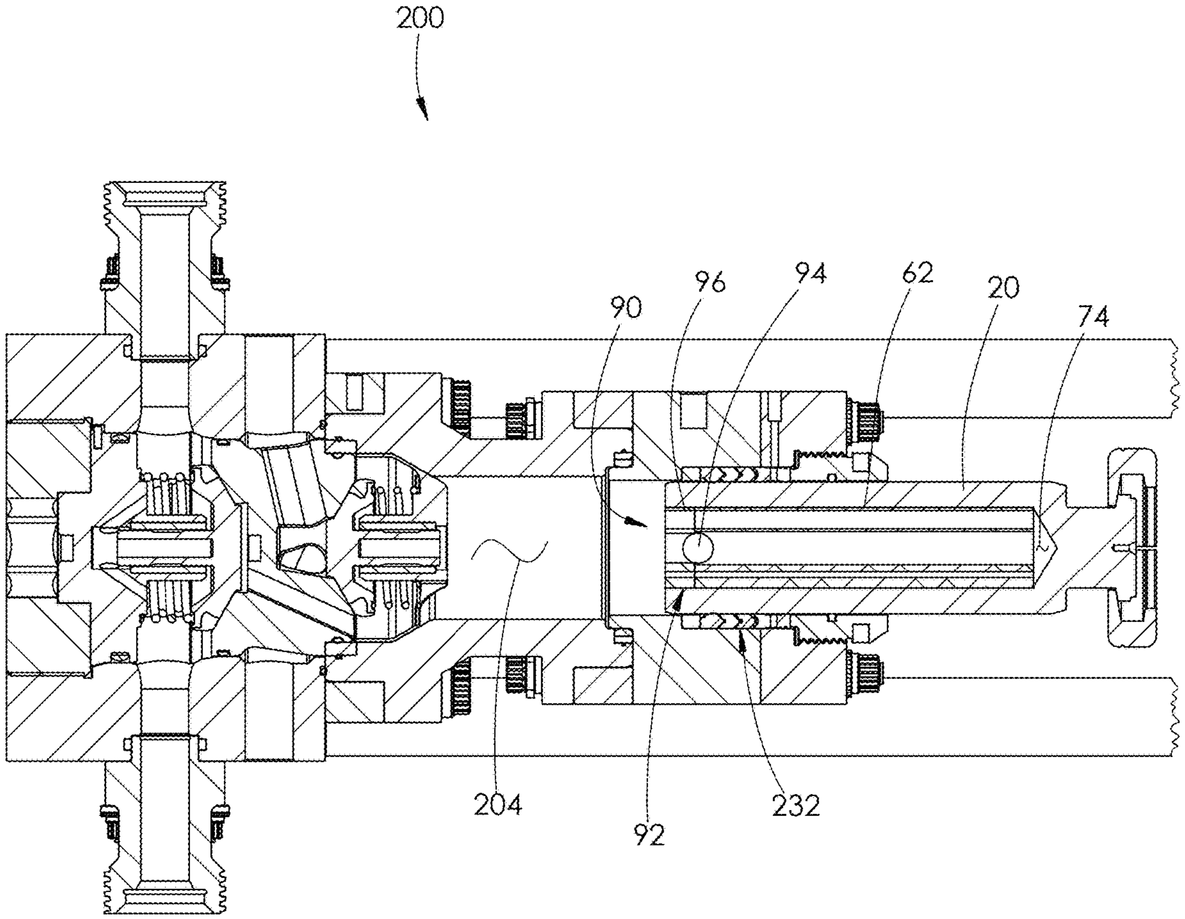
FIG. 29 is a cross-sectional view of the fluid end section shown in FIG. 28, with the plunger of the liquid cooled plunger system in the fully retracted or minimally inserted position.
Figure 30:
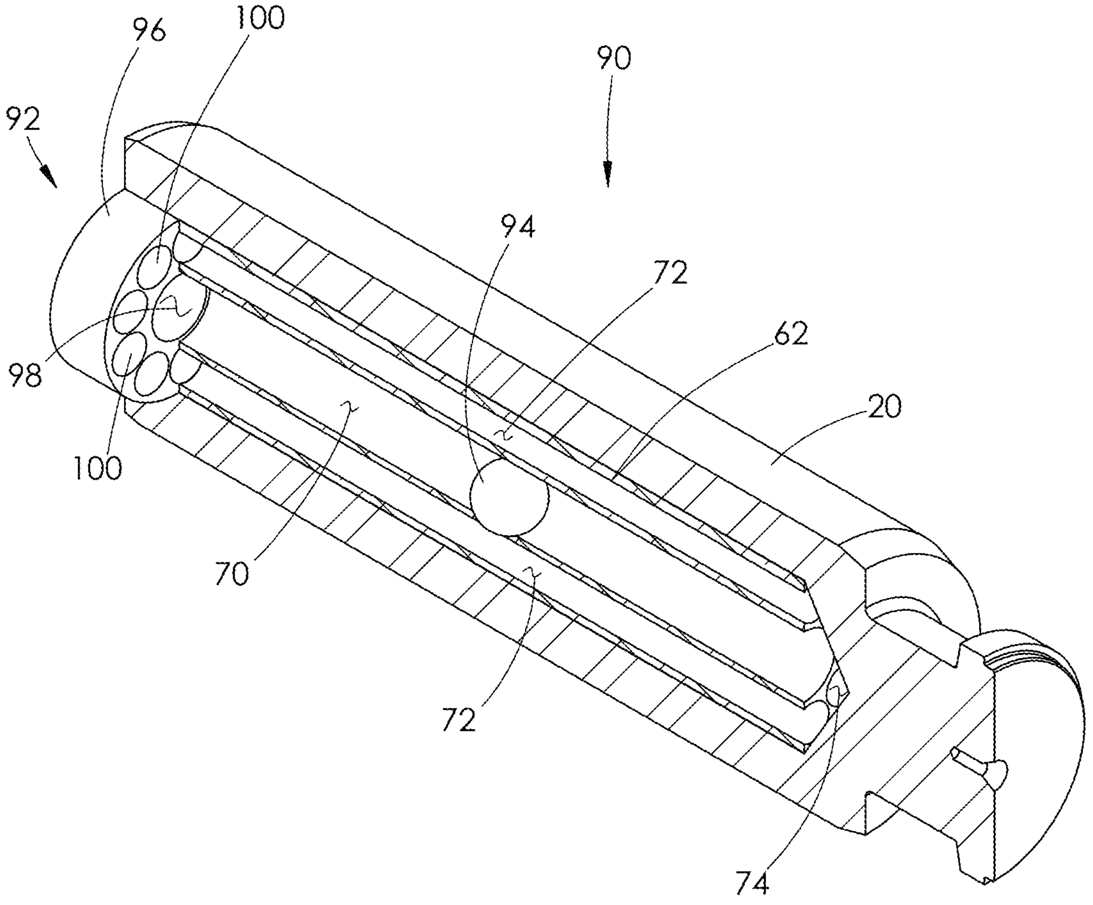
FIG. 30 is a rear isometric and partial cross-sectional view of the liquid cooled plunger system shown in FIGS. 26-29.

The liquid cooled plunger system 90 can be used within the fluid end 10, as shown in FIGS. 26 and 27, or fluid end section 200, as shown in FIGS. 28 and 29. The system 90 functions within the fluid end section 200 in the same manner as the system 90 functions within the fluid end 10. Like other embodiments, the plunger 20 of the system 90 may be in a maximally inserted position, or a minimally inserted position.

Figure 31:
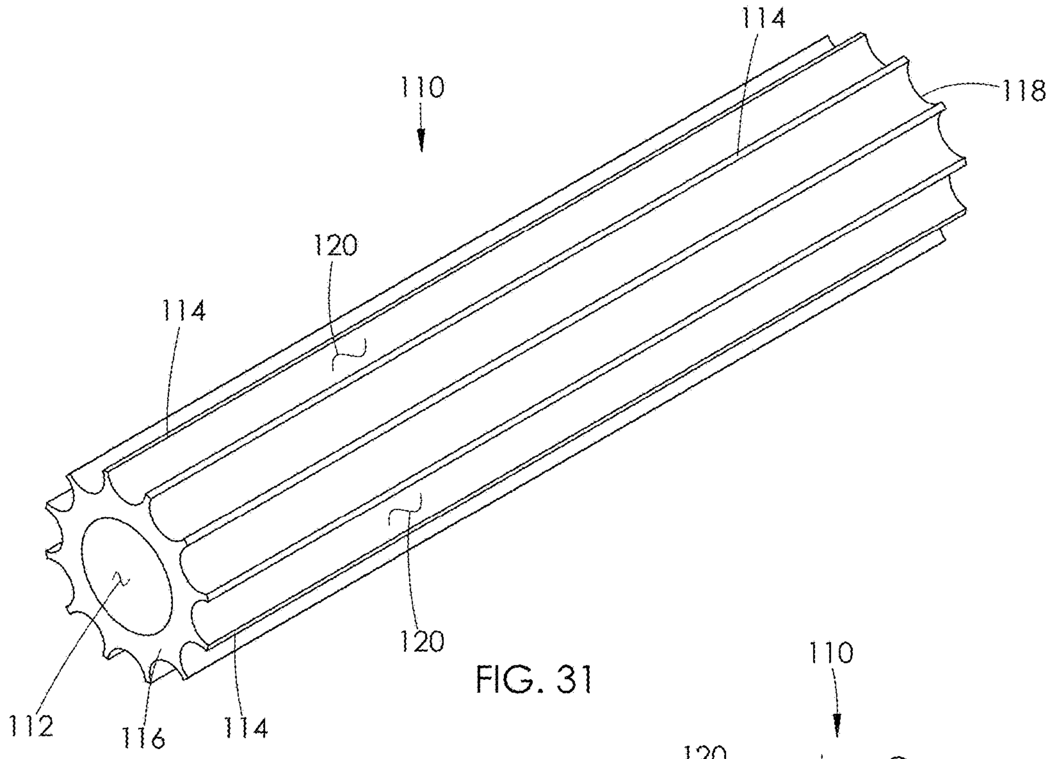
FIG. 31 is an isometric view of another embodiment of a heat exchanger for use with liquid cooled plunger systems.
Figure 32:
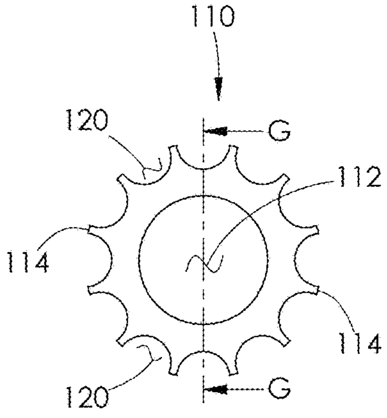
FIG. 32 is a front elevational view of the heat exchanger shown in FIG. 31.
Figure 33:
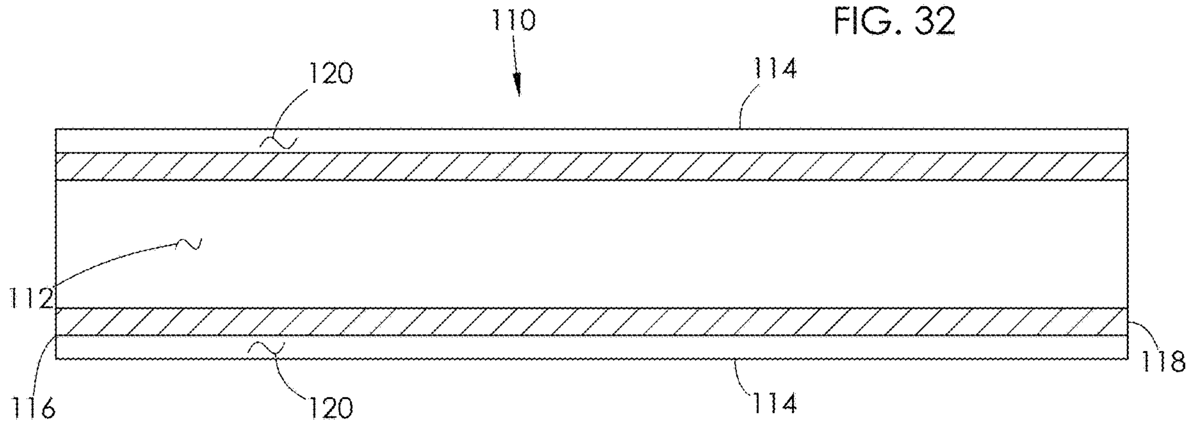
FIG. 33 is a cross-sectional view of the heat exchanger shown in FIG. 32, taken along line G-G.
Figure 34:
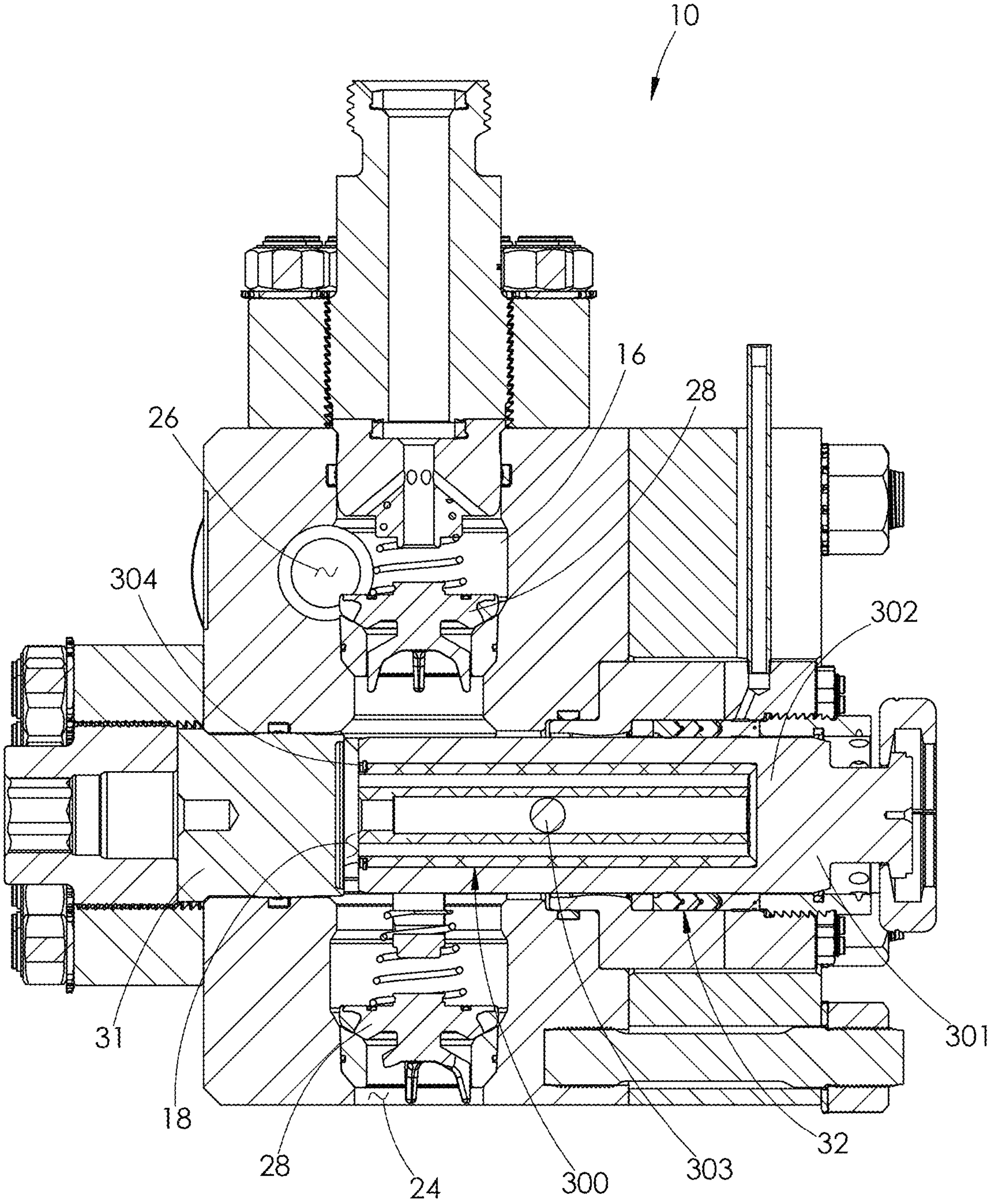
FIG. 34 is a cross-sectional view of the fluid end shown in FIG. 1, taken along line C-C, with another embodiment of a liquid cooled plunger system installed therein. The plunger of the liquid cooled plunger system is in the fully extended or maximally inserted position.
Figure 35:
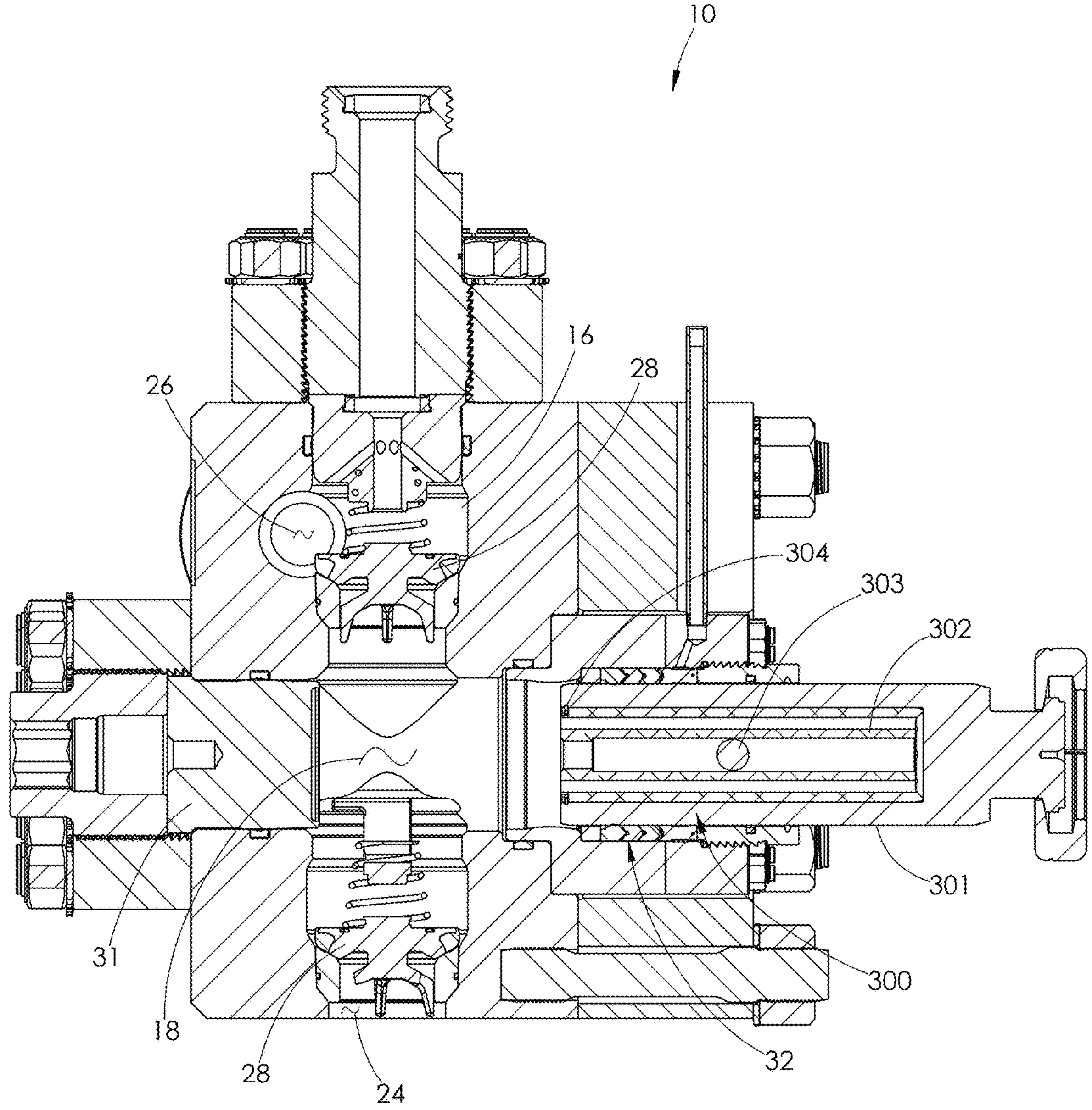
FIG. 35 is a cross-sectional view of the fluid end shown in FIG. 34, with the plunger of the liquid cooled plunger system in the fully retracted or minimally inserted position.
Figure 36:
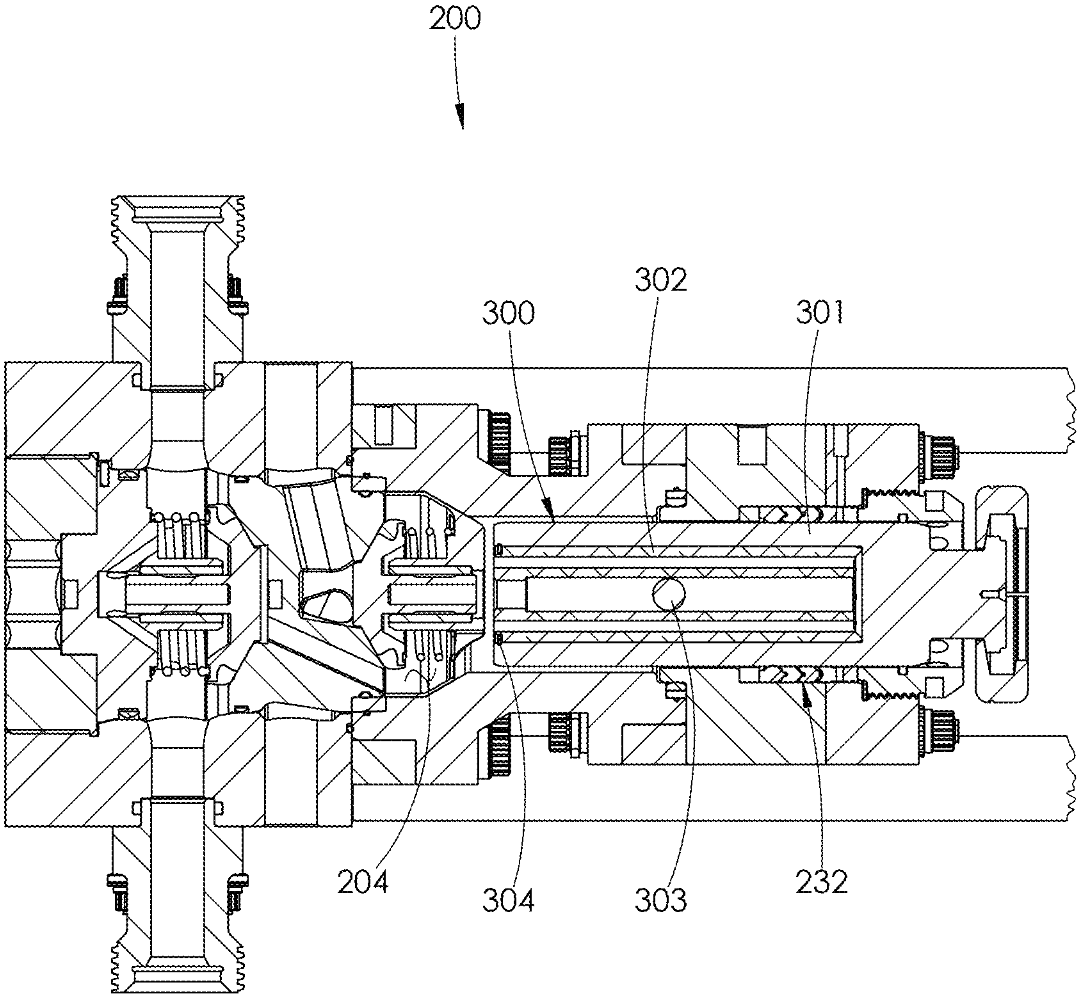
FIG. 36 is a cross-sectional view of the fluid end section shown in FIG. 3, taken along line B-B. The embodiment of the liquid cooled plunger system shown in FIG. 34 is installed therein. The plunger of the liquid cooled plunger system is in the fully extended or maximally inserted position.
Figure 37:
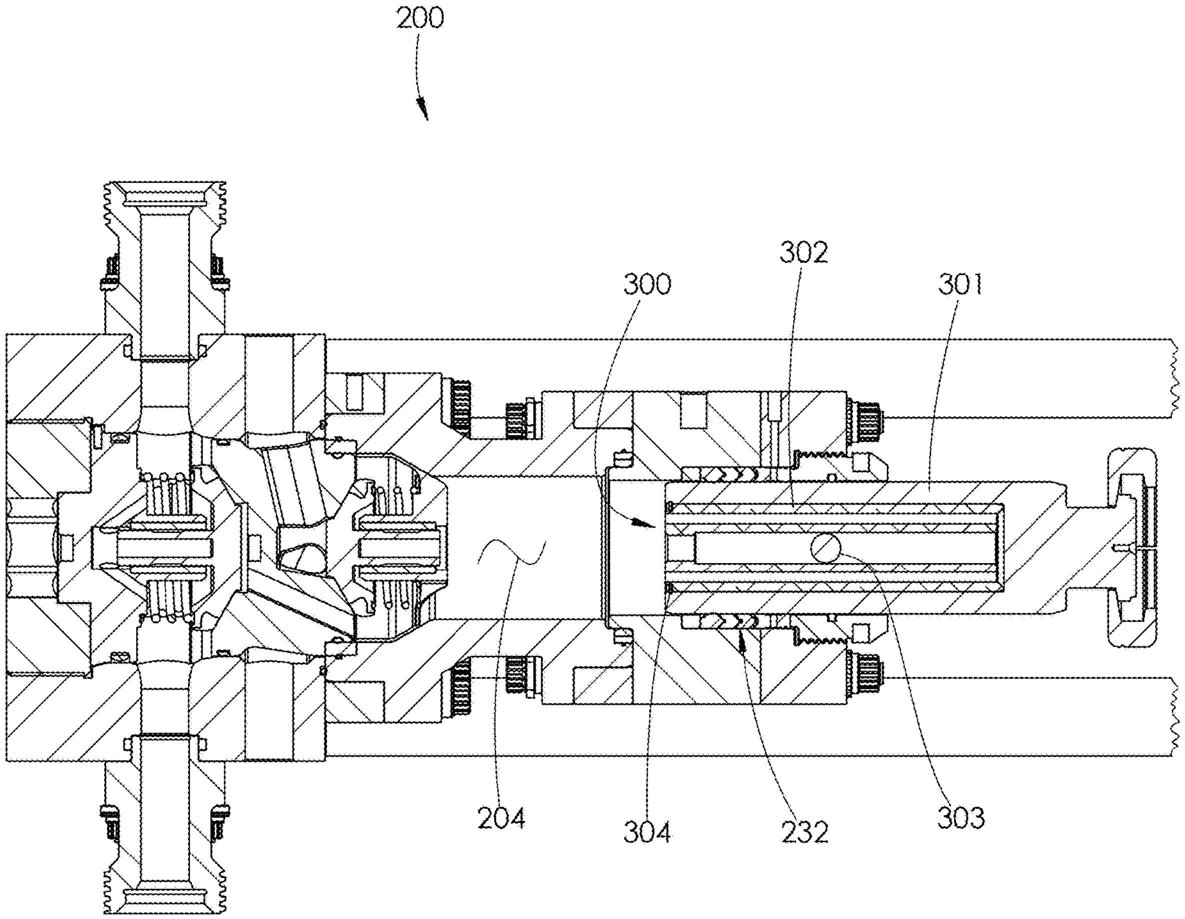
FIG. 37 is a cross-sectional view of the fluid end section shown in FIG. 36, with the plunger of the liquid cooled plunger system in the fully retracted or minimally inserted position.
Figure 38:
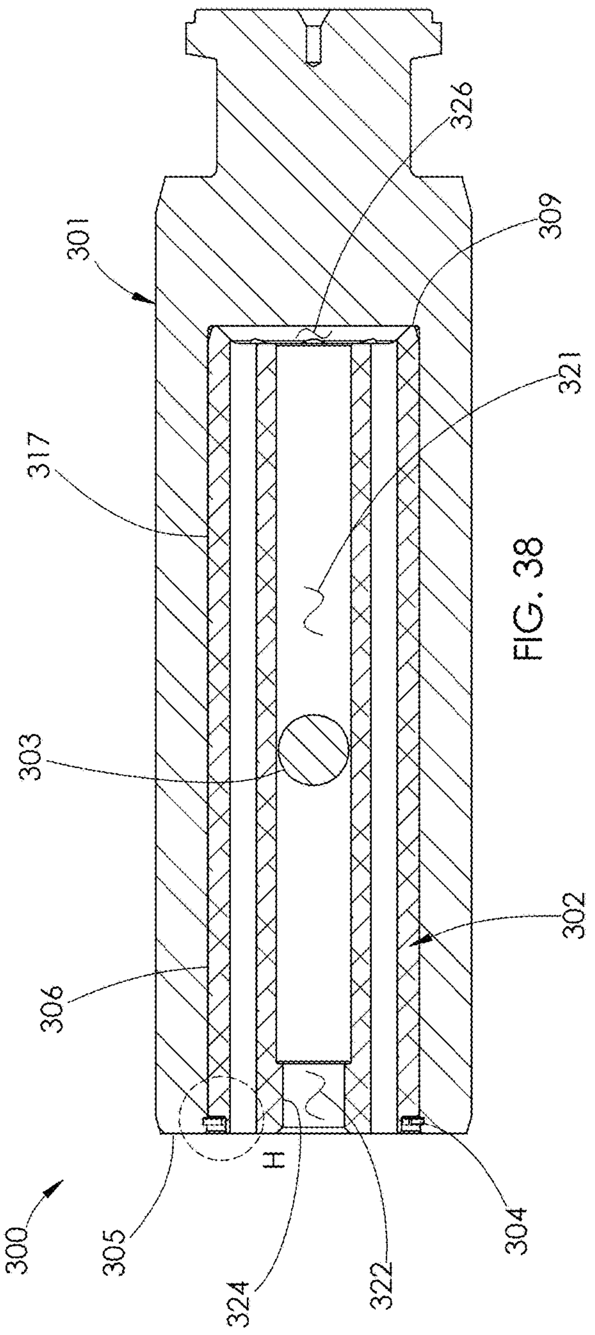
FIG. 38 is a cross-sectional view of the liquid cooled plunger system shown in FIGS. 36 and 37, taken along line B-B of FIG. 3.

Turning to FIGS. 31-33, another embodiment of a heat exchanger 110 is shown. The heat exchanger 110 is interchangeable with the heat exchanger 62. The heat exchanger 110 is similar to the heat exchanger 62, but instead of a plurality of passages 72 surrounding a central passage 70, a plurality of circumferentially spaced and elongate radial splines 114 surround the central passage 112. Each spline 114 extends between opposed first and second surfaces 116 and 118 of the heat exchanger 110, forming a channel 120 for fluid flow. The heat exchanger 110 operates in the same manner as the heat exchanger 62. For example, if the heat exchanger 110 is used in system 90, the openings 100 of seat 96 may be modified to match the splines 114 of the heat exchanger 110. The openings 98 and 100 are thus sized and positioned to correspond with the central passage 112 and the plurality of channels 120 formed within the heat exchanger 110. In this embodiment the heat exchanger 110 is made of aluminum, however in alternative embodiments the heat exchanger 110 may be made of other materials. It is preferable that the material forming the heat exchanger 110 have a higher thermal conductivity than the material forming the plunger 20.

Figure 39:
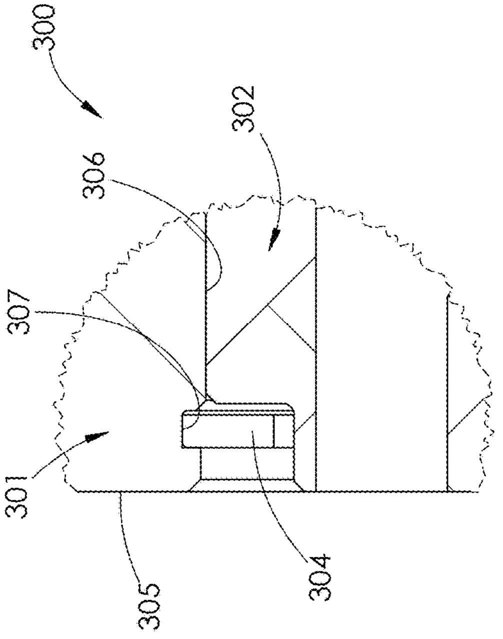
FIG. 39 is an enlarged view of area H of the liquid cooled plunger system shown in FIG. 38.
Figure 40:
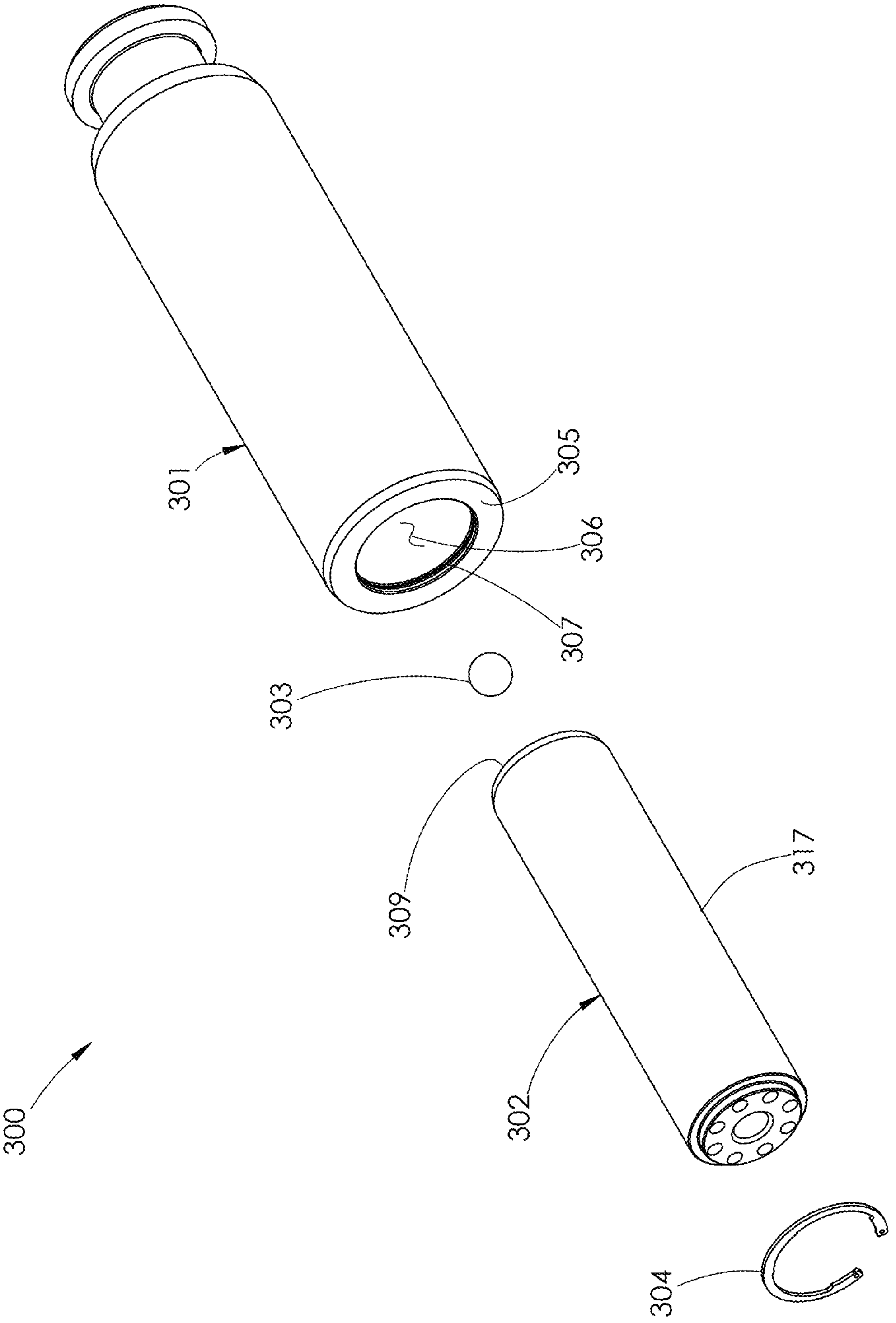
FIG. 40 is an exploded isometric view of the liquid cooled plunger system shown in FIG. 38.

Turning now to FIGS. 34-40, another embodiment of a liquid cooled plunger system 300 is shown. The liquid cooled plunger system 300 comprises a plunger 301, a heat exchanger 302, a ball 303, and a retainer 304. The plunger 301 has a generally cylindrical shape and comprises a front surface 305 and a heat exchanger bore 306. The heat exchanger bore 306 is a blind bore with a bore axis coincident with the longitudinal axis of the plunger 301. The heat exchanger bore 306 comprises a snap ring groove 307, as shown in FIGS. 39 and 40. In this embodiment the plunger 301 is made of an alloy steel, however in alternative embodiments the plunger 301 may be made of other materials. It is preferable that the material forming the plunger 301 have a lower thermal conductivity than the material forming the heat exchanger 302.

Figure 41:
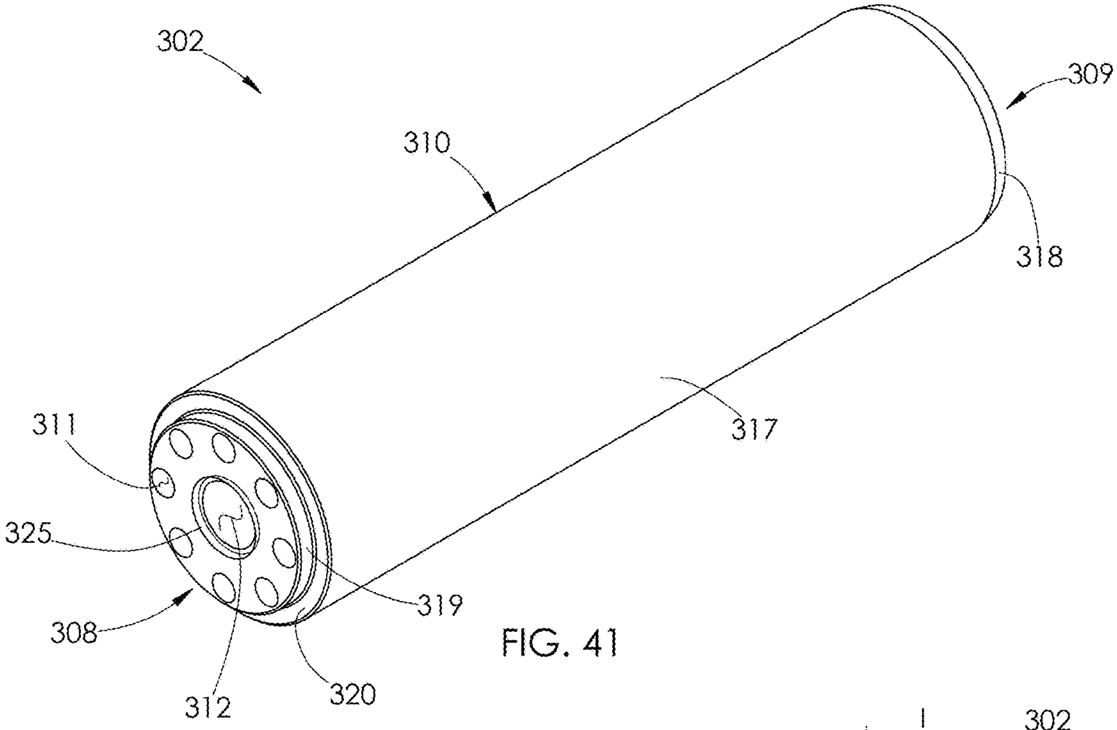
FIG. 41 is an isometric view of the heat exchanger used with the liquid cooled plunger system shown in FIG. 38.
Figure 42:
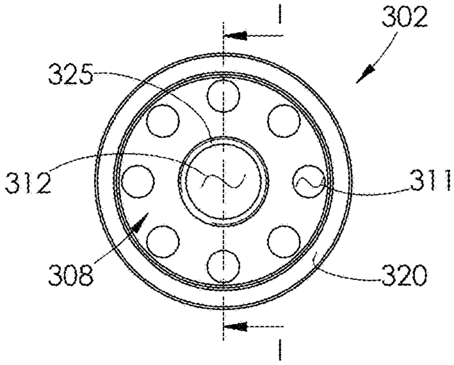
FIG. 42 is a front elevational view of the heat exchanger shown in FIG. 41.
Figure 43:
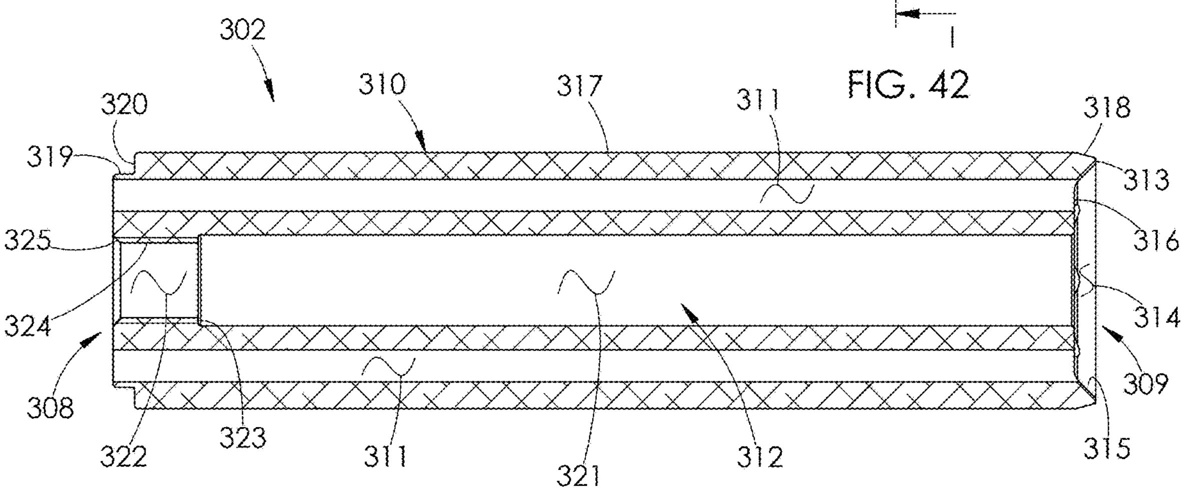
FIG. 43 is a cross-sectional view of the heat exchanger shown in FIG. 42, taken along line I-I.
Figure 44:
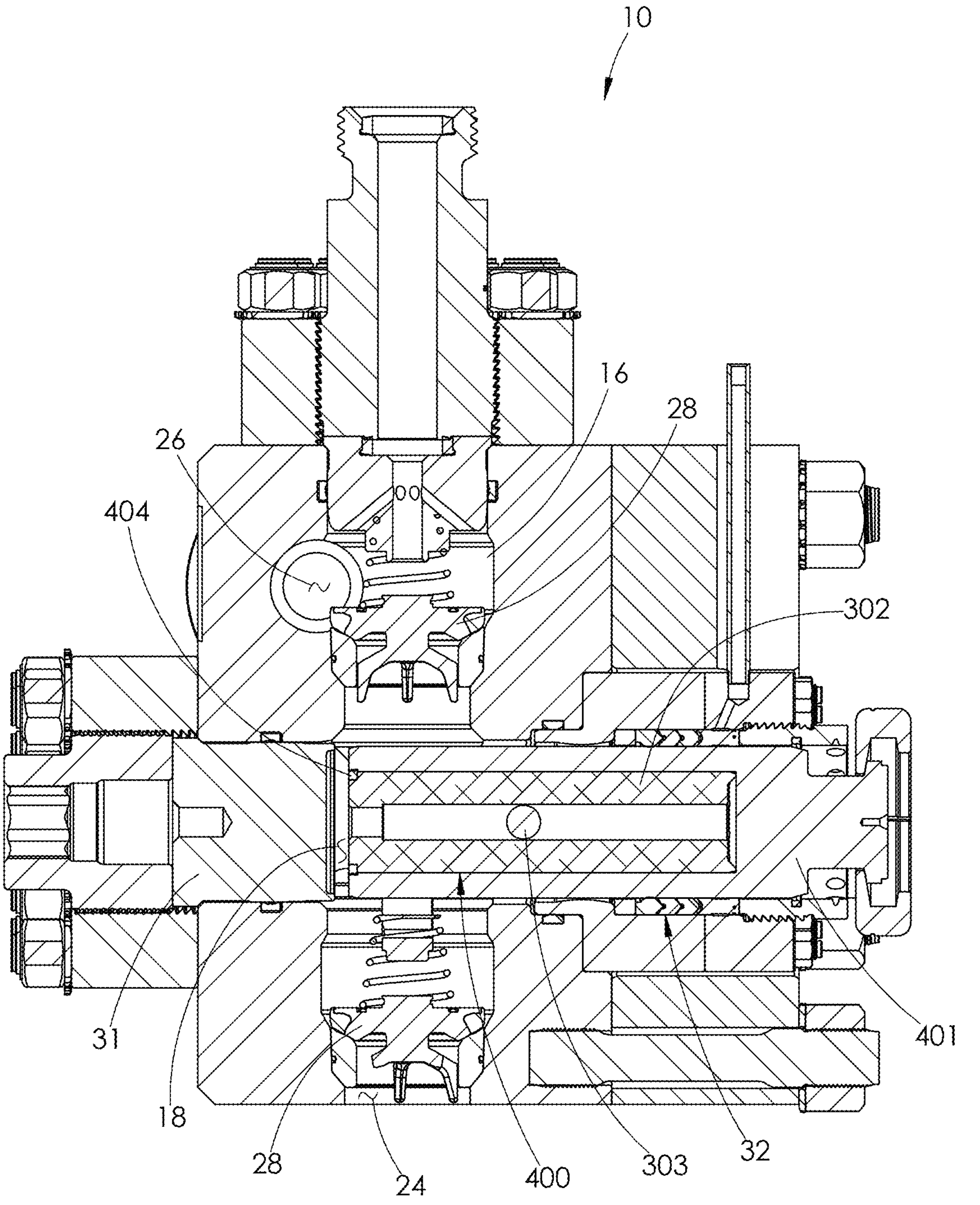
FIG. 44 is a cross-sectional view of the fluid end shown in FIG. 1, taken along line C-C, with another embodiment of a liquid cooled plunger system installed therein. The plunger of the liquid cooled plunger system is in the fully extended or maximally inserted position.
Figure 45:
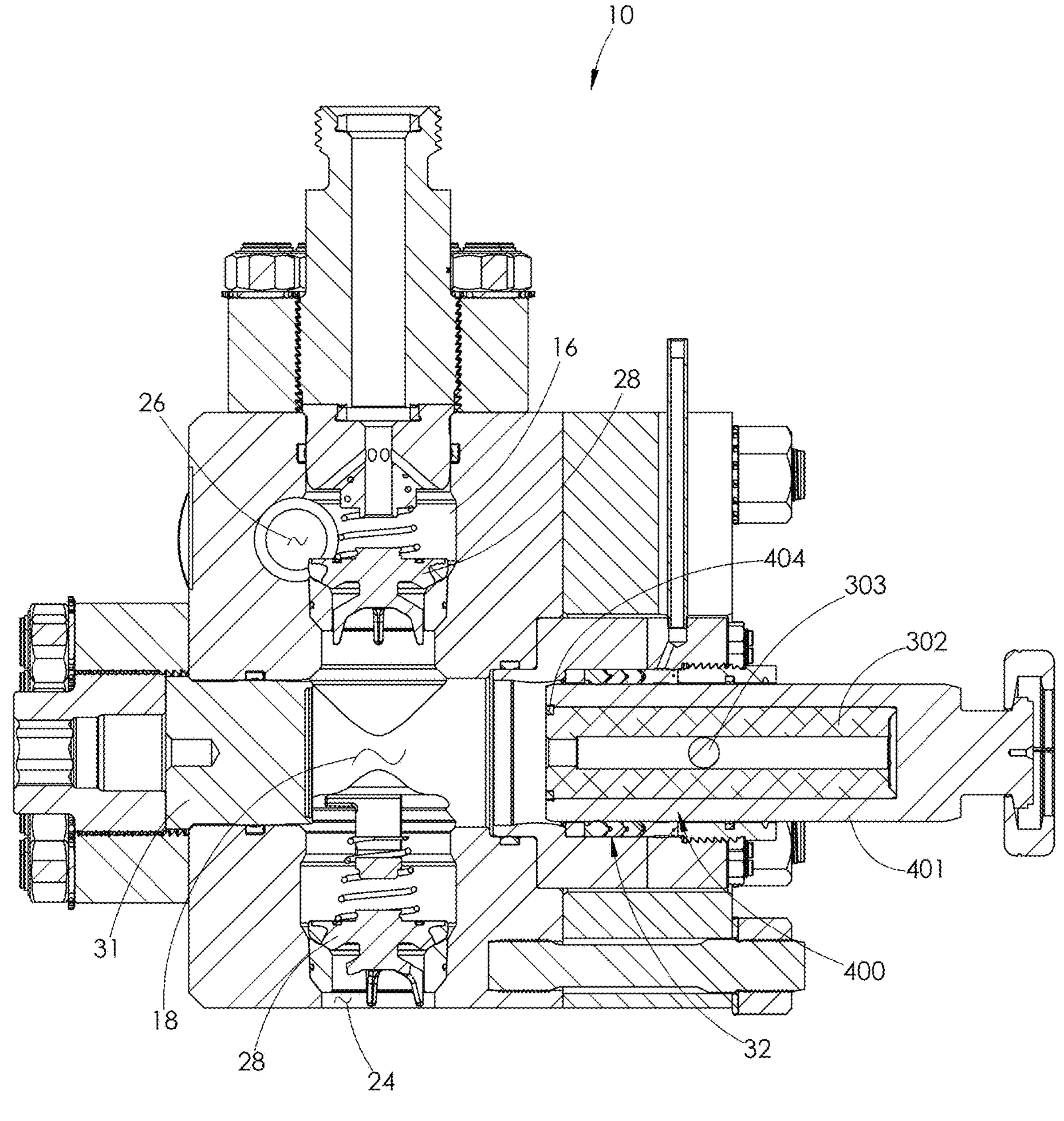
FIG. 45 is a cross-sectional view of the fluid end shown in FIG. 44, with the plunger of the liquid cooled plunger system in the fully retracted or minimally inserted position.
Figure 46:
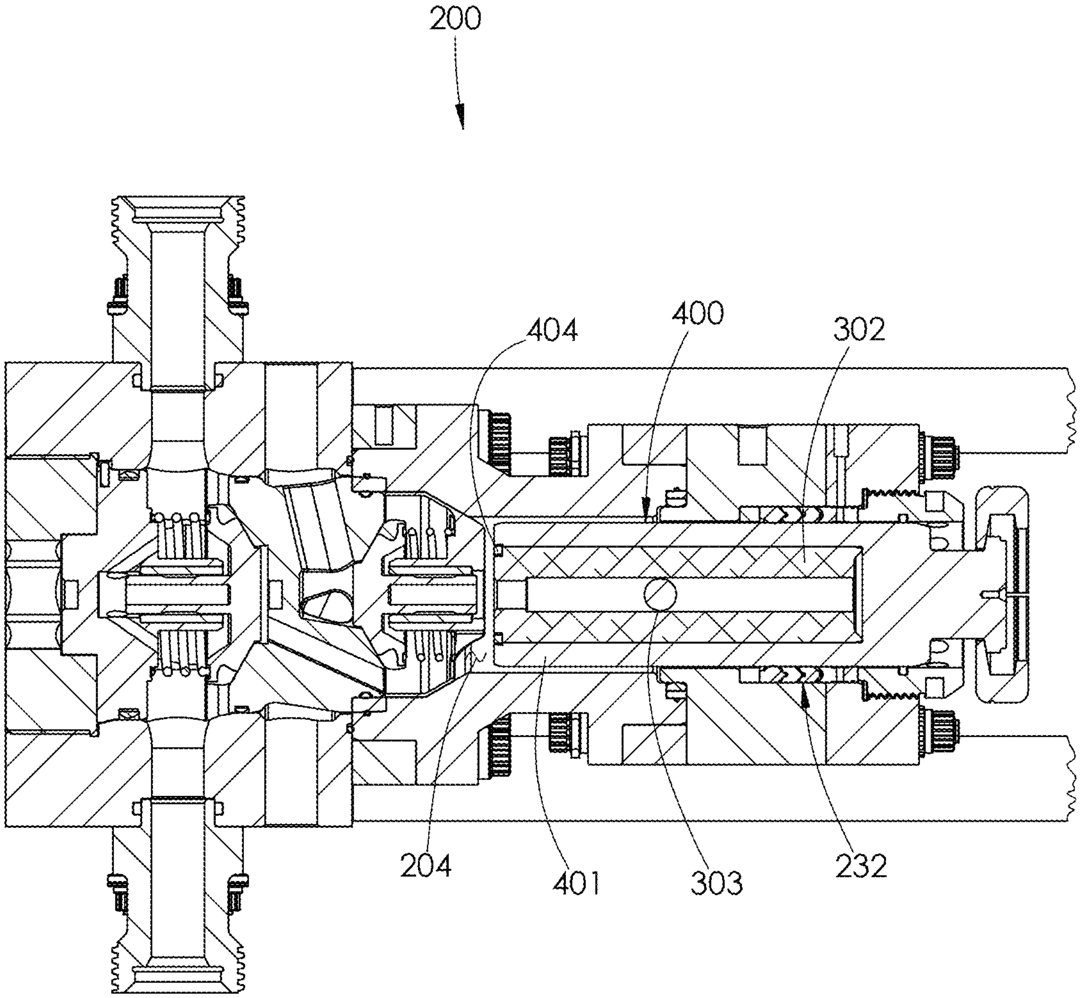
FIG. 46 is a cross-sectional view of the fluid end section shown in FIG. 3, taken along line B-B. The embodiment of the liquid cooled plunger system shown in FIG. 44 is installed therein. The plunger of the liquid cooled plunger system is in the fully extended or maximally inserted position.
Figure 47:
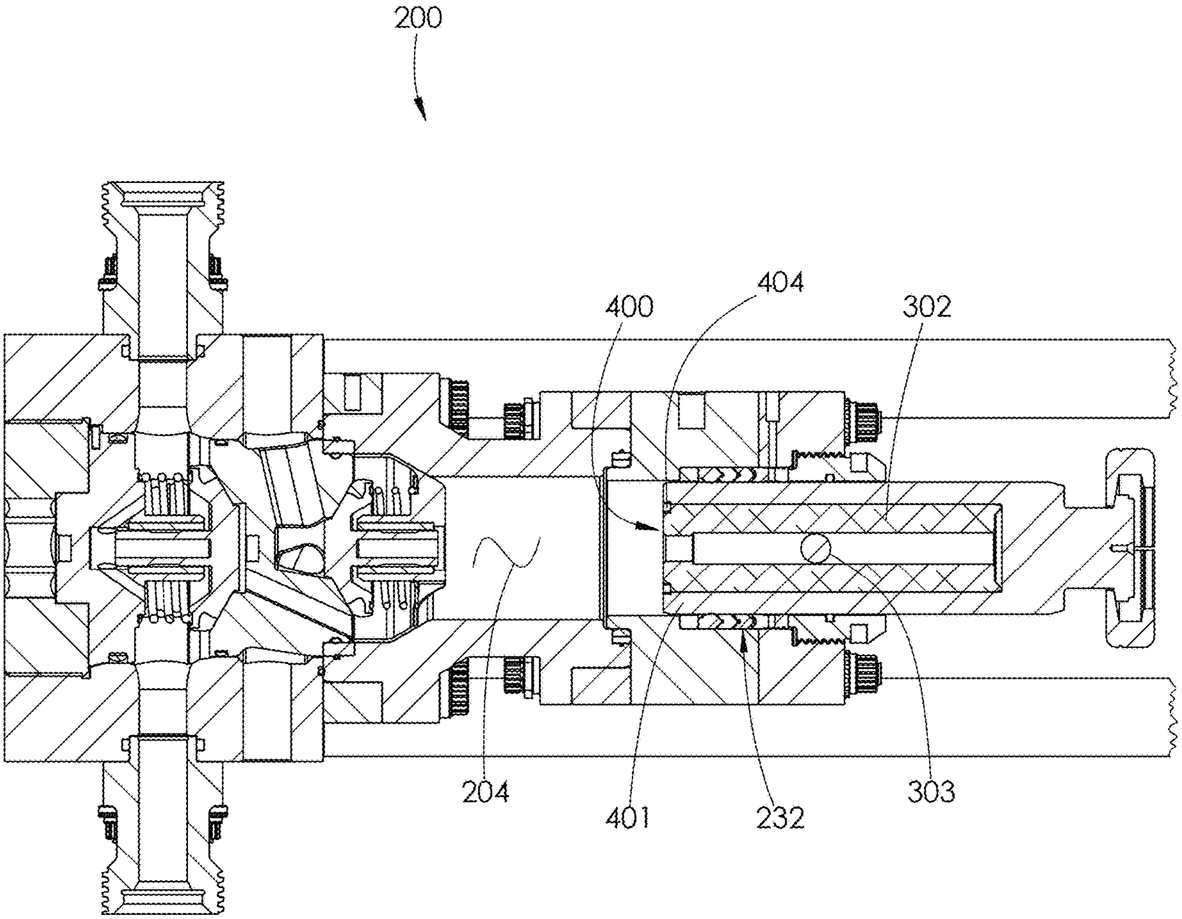
FIG. 47 is a cross-sectional view of the fluid end section shown in FIG. 46, with the plunger of the liquid cooled plunger system in the fully retracted or minimally inserted position.
Figure 48:
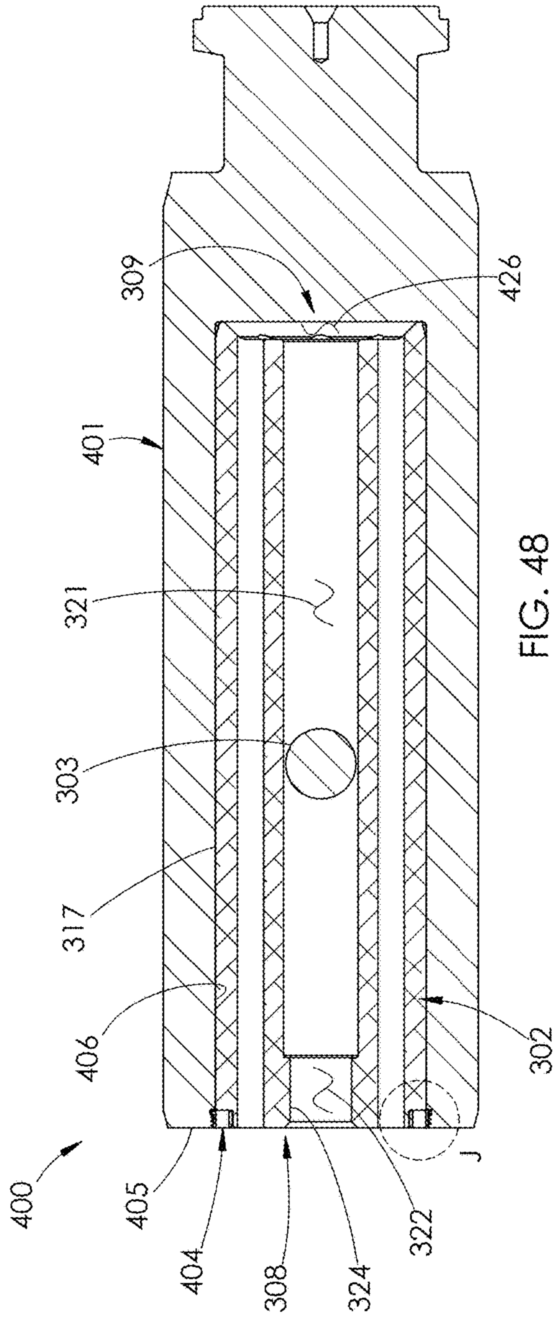
FIG. 48 is a cross-sectional view of the liquid cooled plunger system shown in FIGS. 46 and 47, taken along line B-B of FIG. 3.
Figure 49:
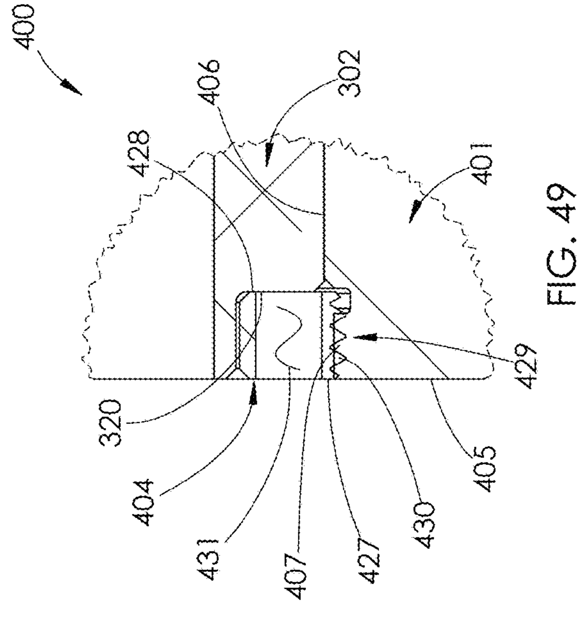
FIG. 49 is an enlarged view of area J of the liquid cooled plunger system shown in FIG. 48.
Figure 50:
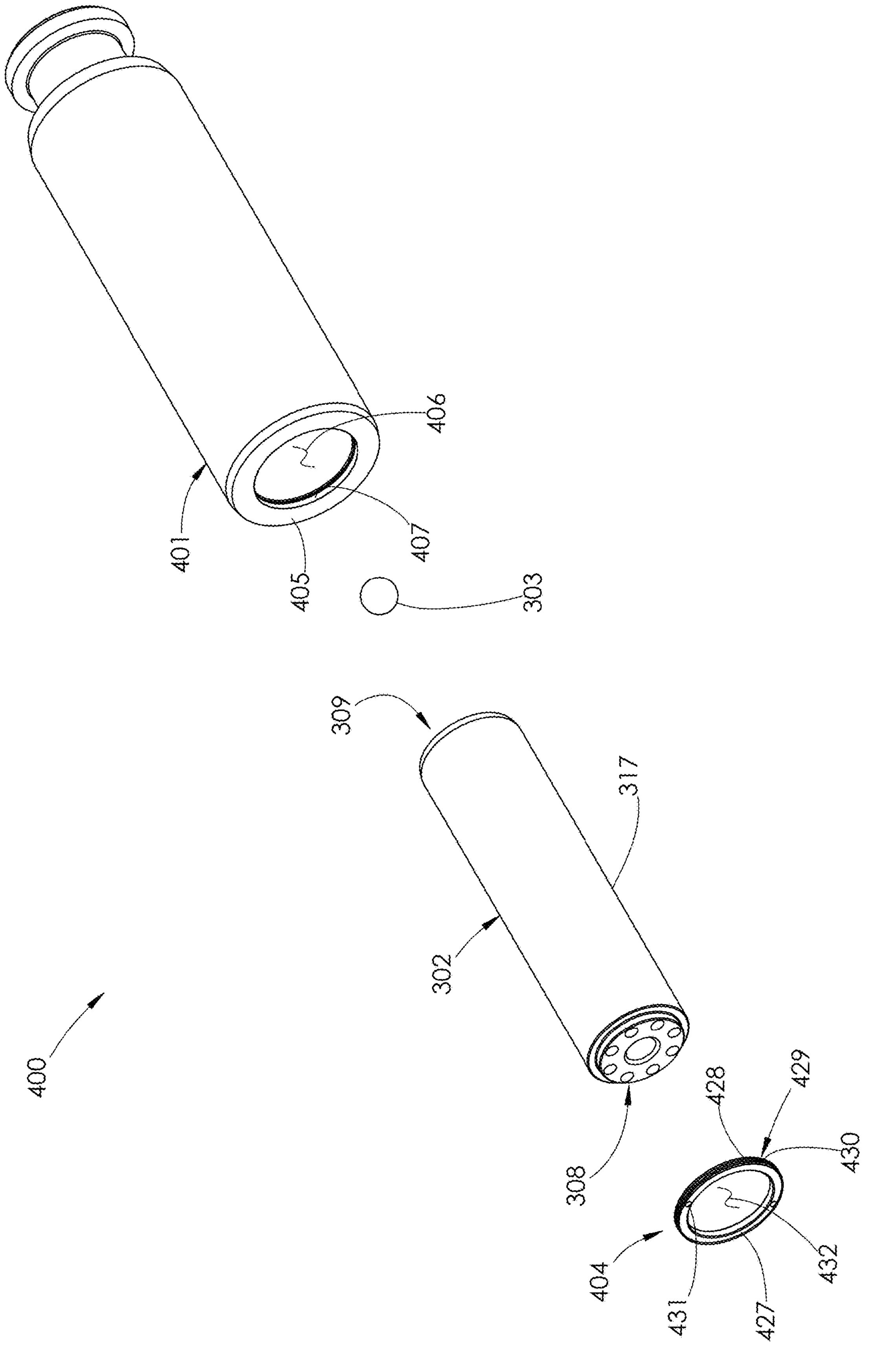
FIG. 50 is an exploded isometric view of the liquid cooled plunger system shown in FIG. 48.
Figure 51:
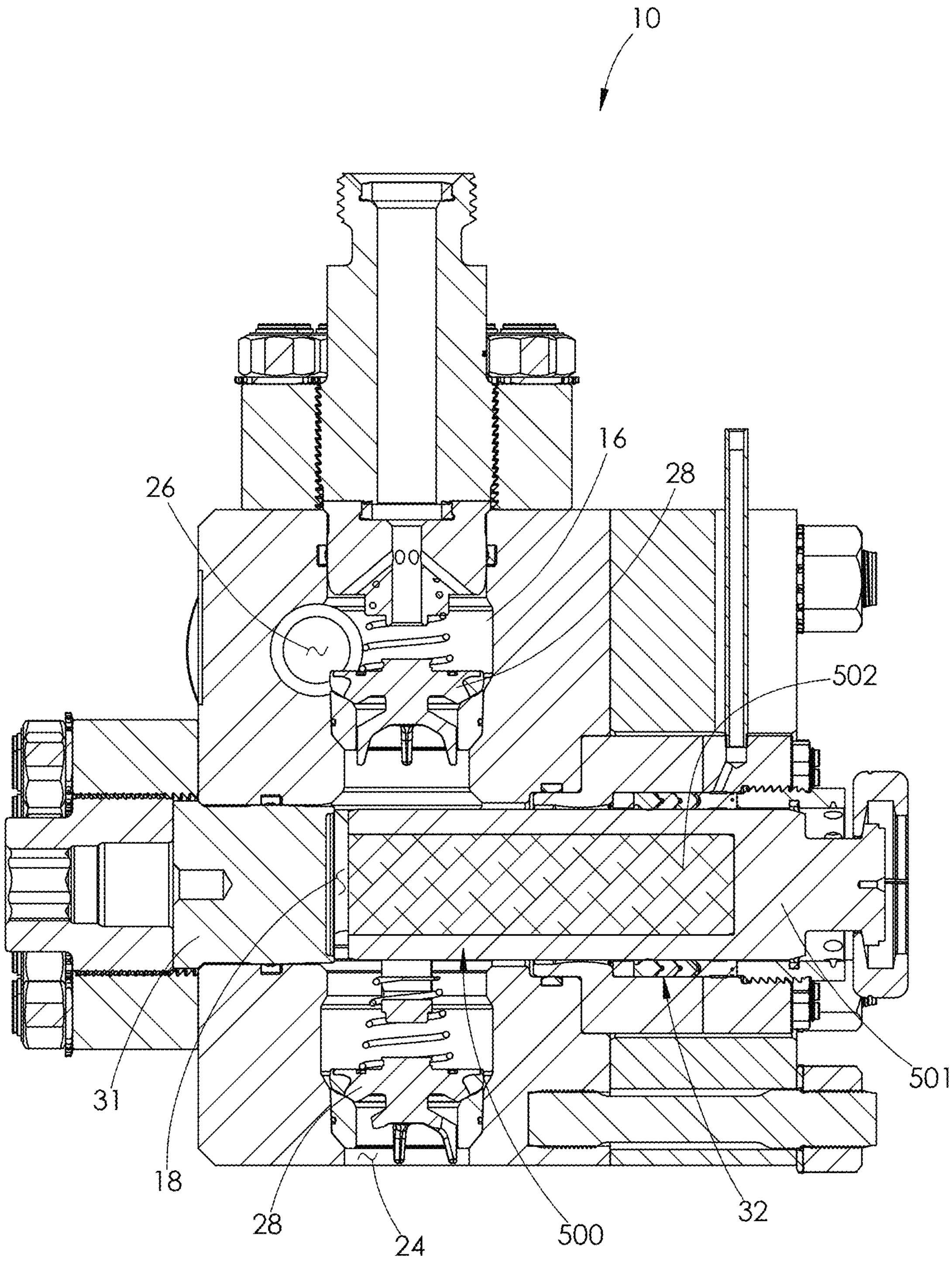
FIG. 51 is a cross-sectional view of the fluid end shown in FIG. 1, taken along line C-C, with another embodiment of a liquid cooled plunger system installed therein. The plunger of the liquid cooled plunger system is in the fully extended or maximally inserted position.
Figure 52:
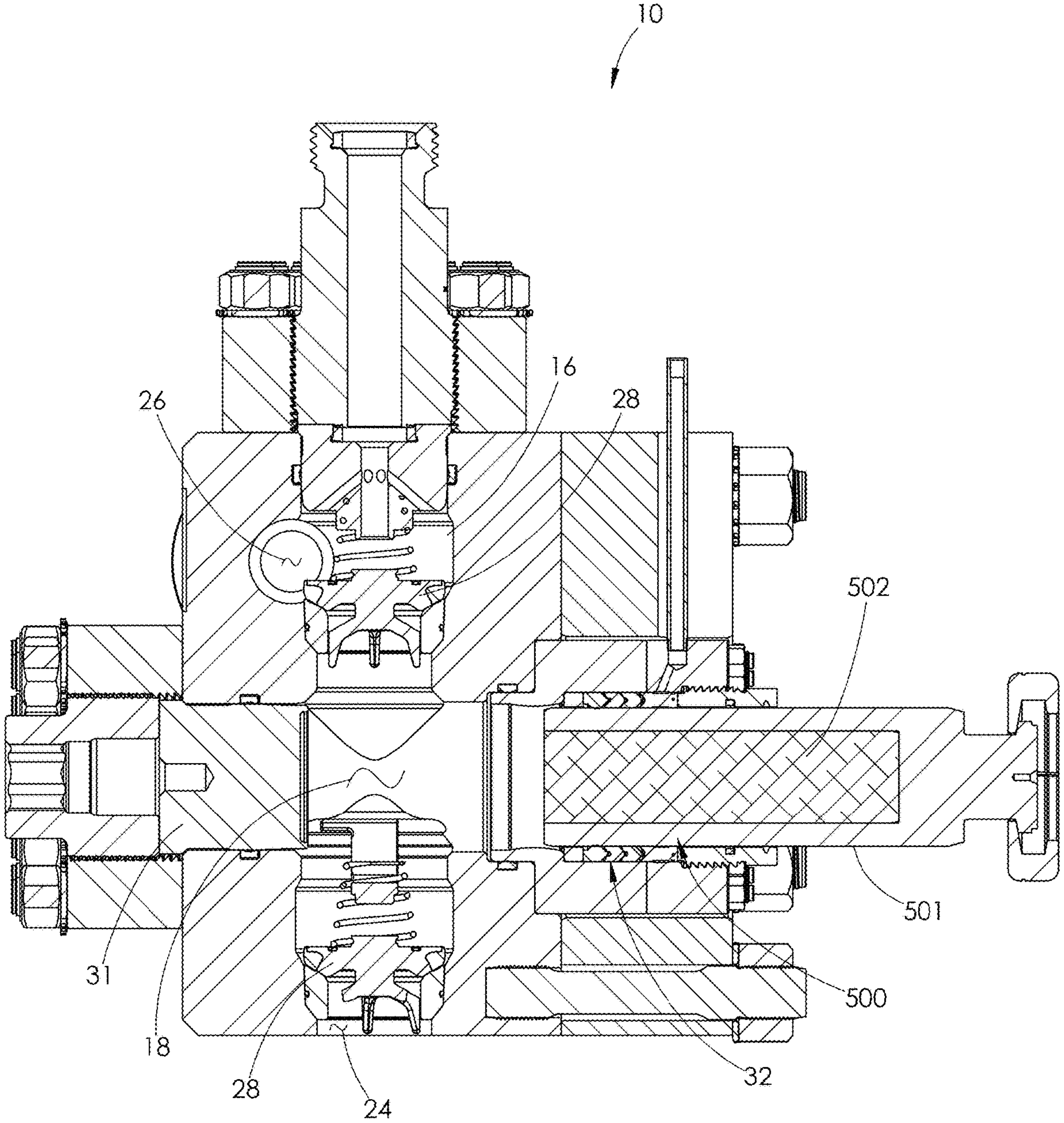
FIG. 52 is a cross-sectional view of the fluid end shown in FIG. 51, with the plunger of the liquid cooled plunger system in the fully retracted or minimally inserted position.
Figure 53:
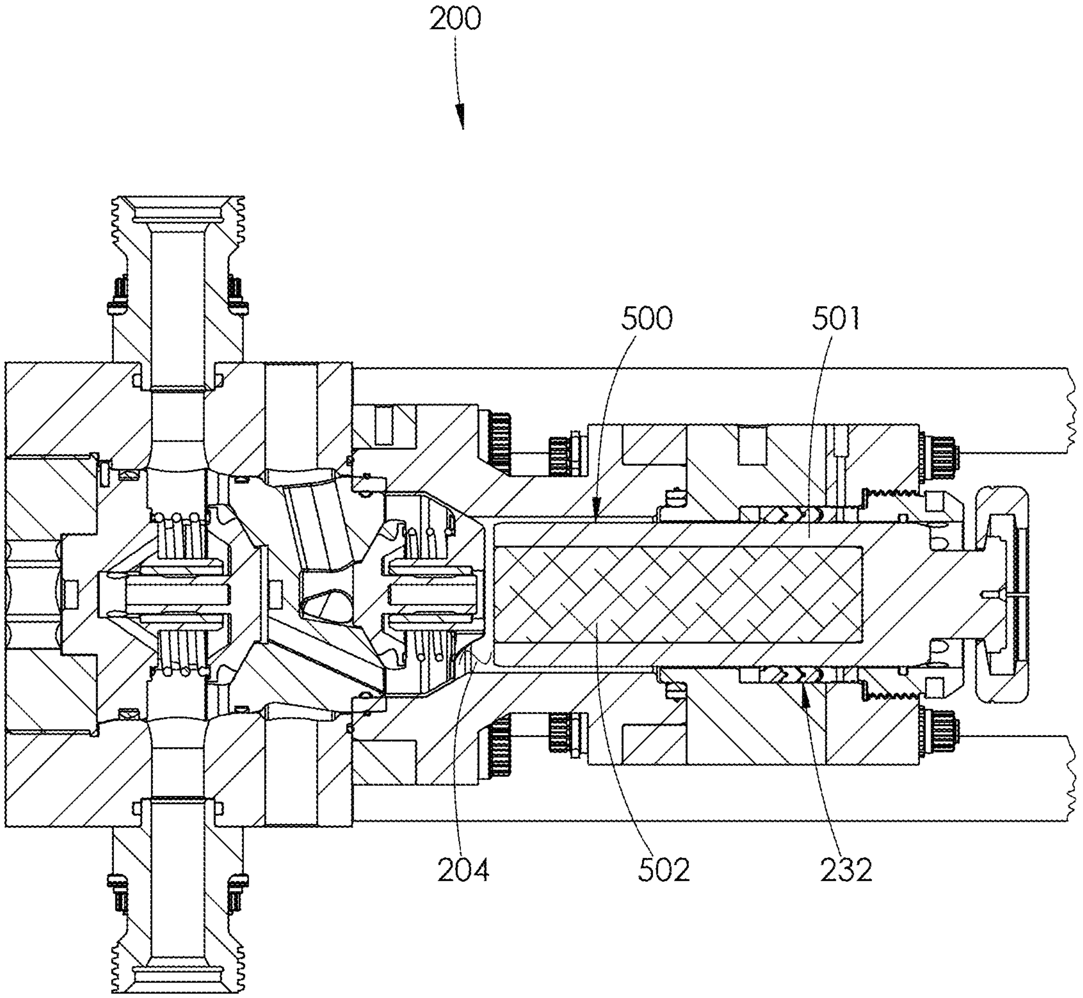
FIG. 53 is a cross-sectional view of the fluid end section shown in FIG. 3, taken along line B-B. The embodiment of the liquid cooled plunger system shown in FIG. 51 is installed therein. The plunger of the liquid cooled plunger system is in the fully extended or maximally inserted position.
Figure 54:
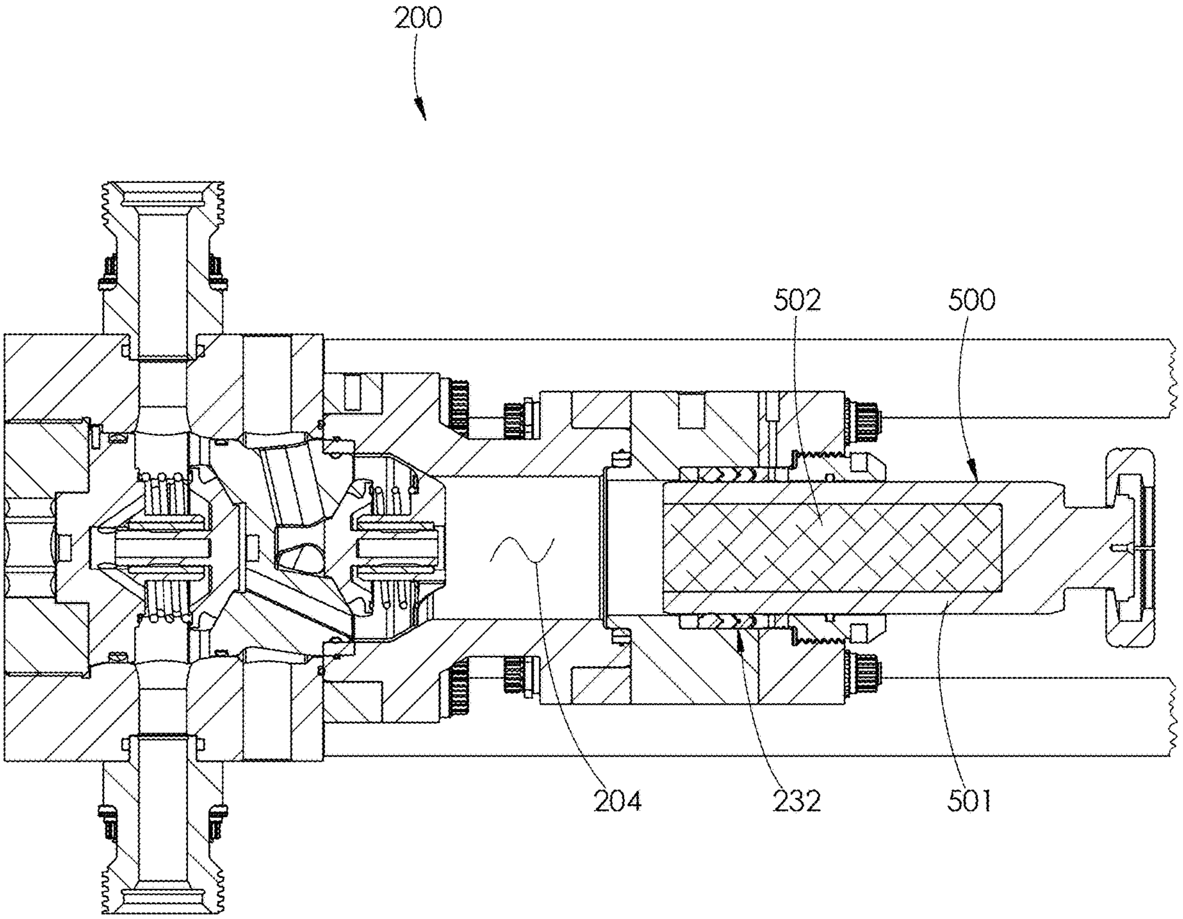
FIG. 54 is a cross-sectional view of the fluid end shown in FIG. 53, with the plunger of the liquid cooled plunger system in the fully retracted or minimally inserted position.
Figure 55:
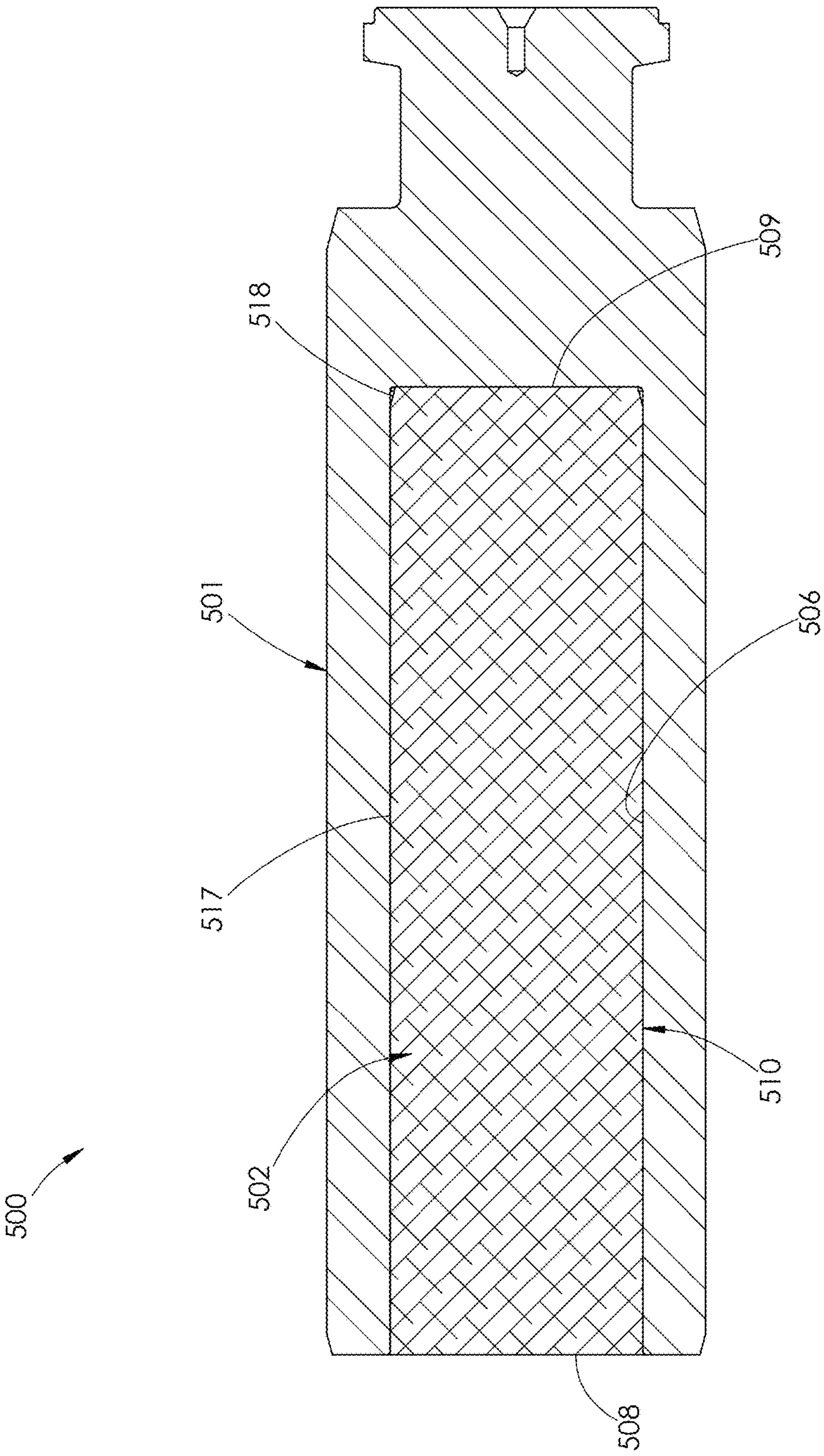
FIG. 55 is a cross-sectional view of the liquid cooled plunger system shown in FIGS. 53 and 54, taken along line B-B of FIG. 3.
Figure 56:
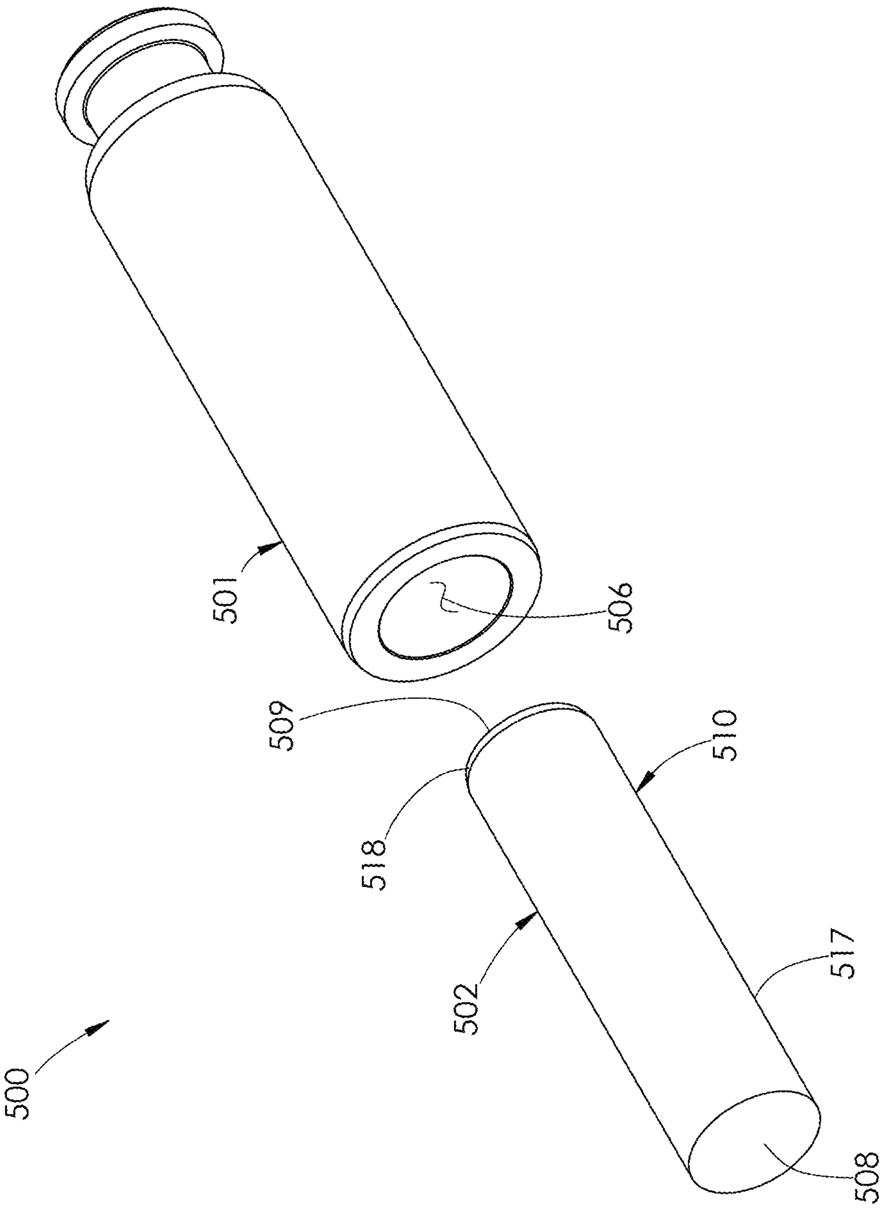
FIG. 56 is an exploded isometric view of the liquid cooled plunger system shown in FIG. 55.
Figure 57:
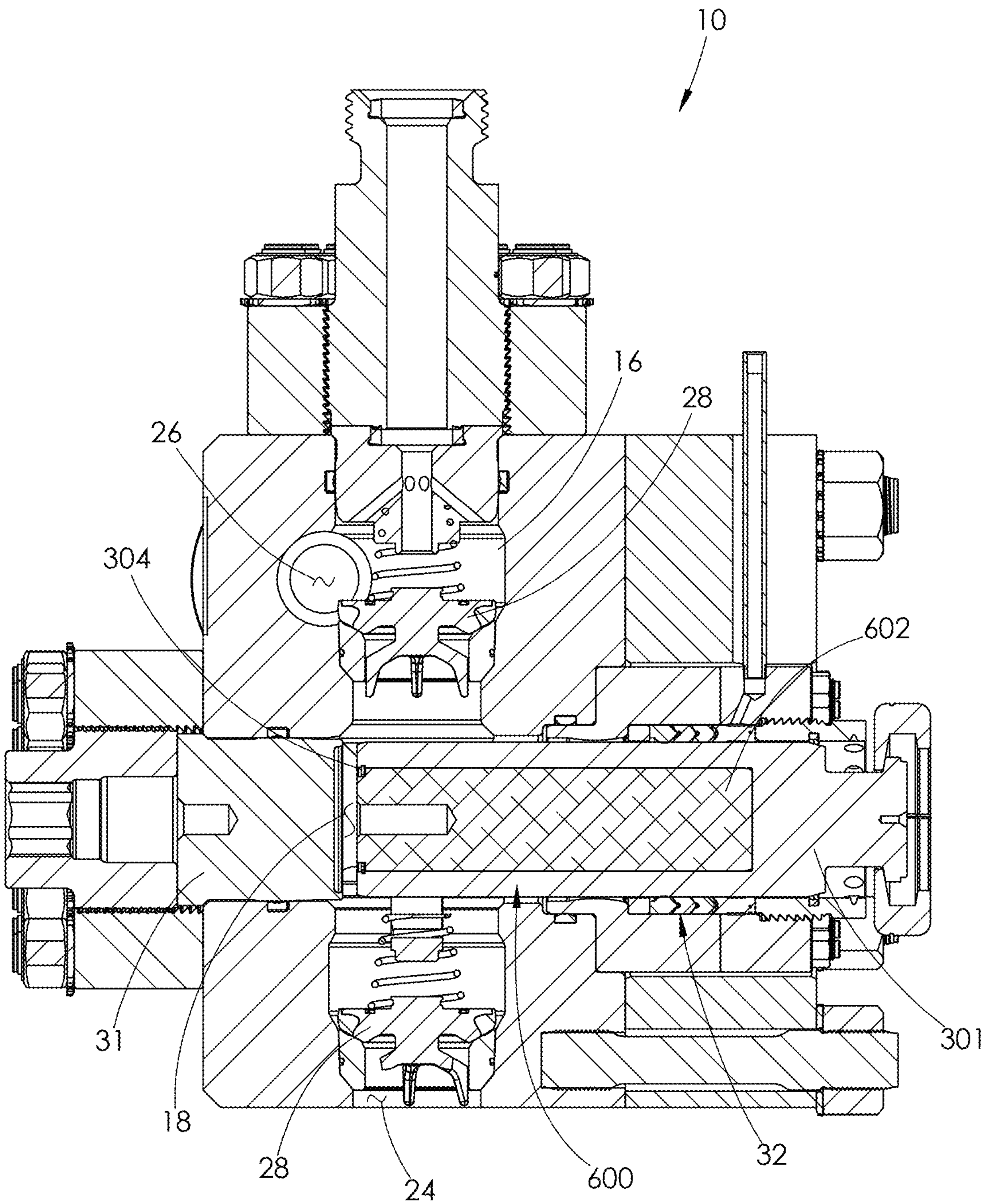
FIG. 57 is a cross-sectional view of the fluid end shown in FIG. 1, taken along line C-C, with another embodiment of a liquid cooled plunger system installed therein. The plunger of the liquid cooled plunger system is in the fully extended or maximally inserted position.
Figure 58:
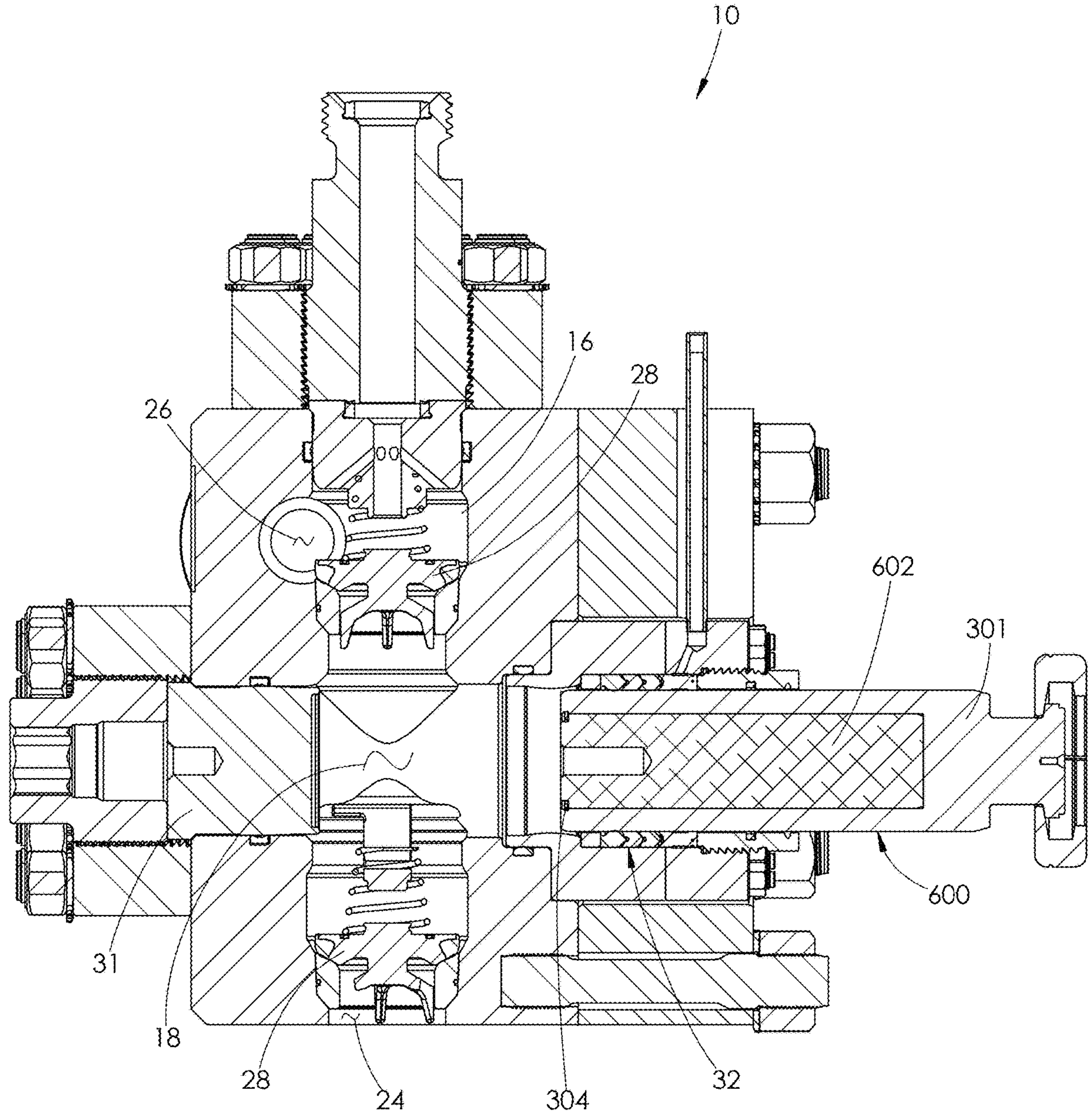
FIG. 58 is a cross-sectional view of the fluid end shown in FIG. 57, with the plunger of the liquid cooled plunger system in the fully retracted or minimally inserted position.
Figure 59:
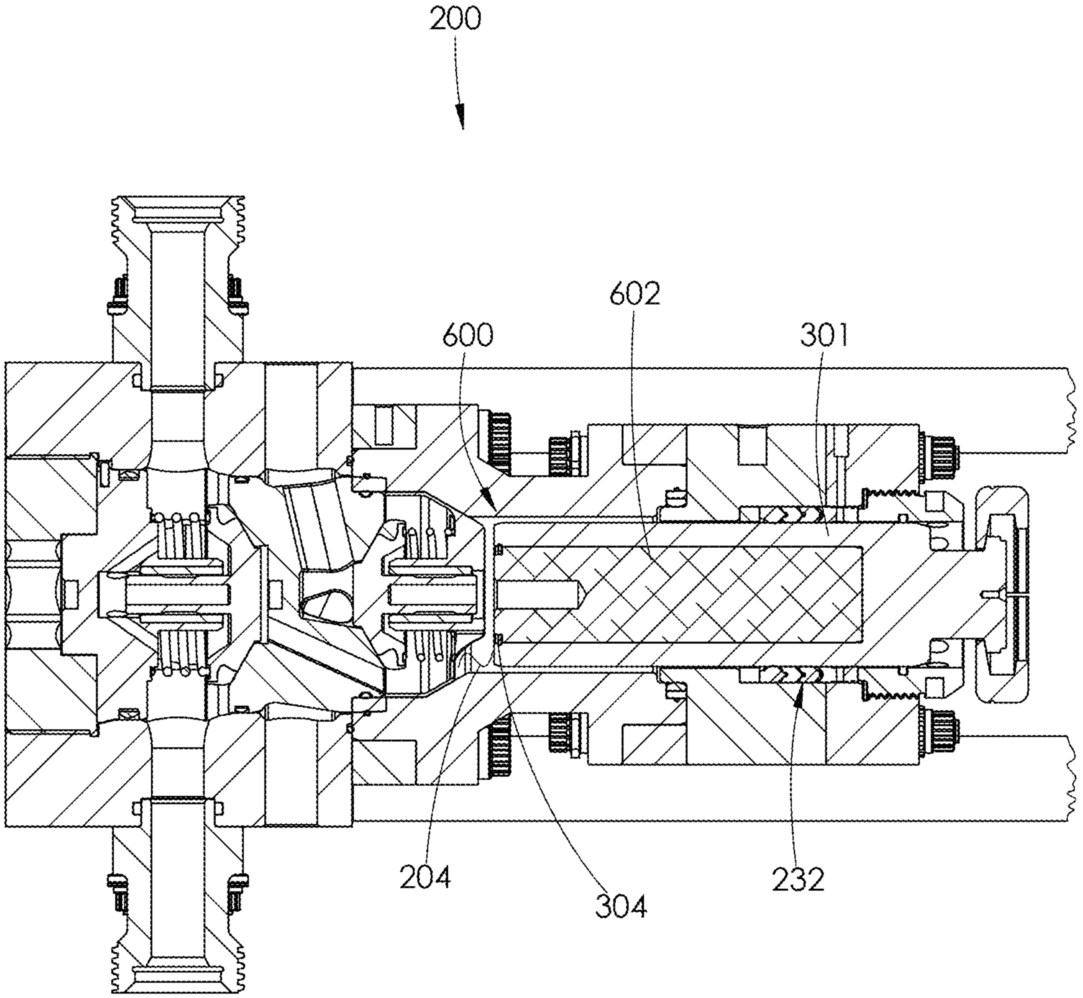
FIG. 59 is a cross-sectional view of the fluid end section shown in FIG. 3, taken along line B-B. The embodiment of the liquid cooled plunger system shown in FIG. 57 is installed therein. The plunger of the liquid cooled plunger system is in the fully extended or maximally inserted position.
Figure 60:
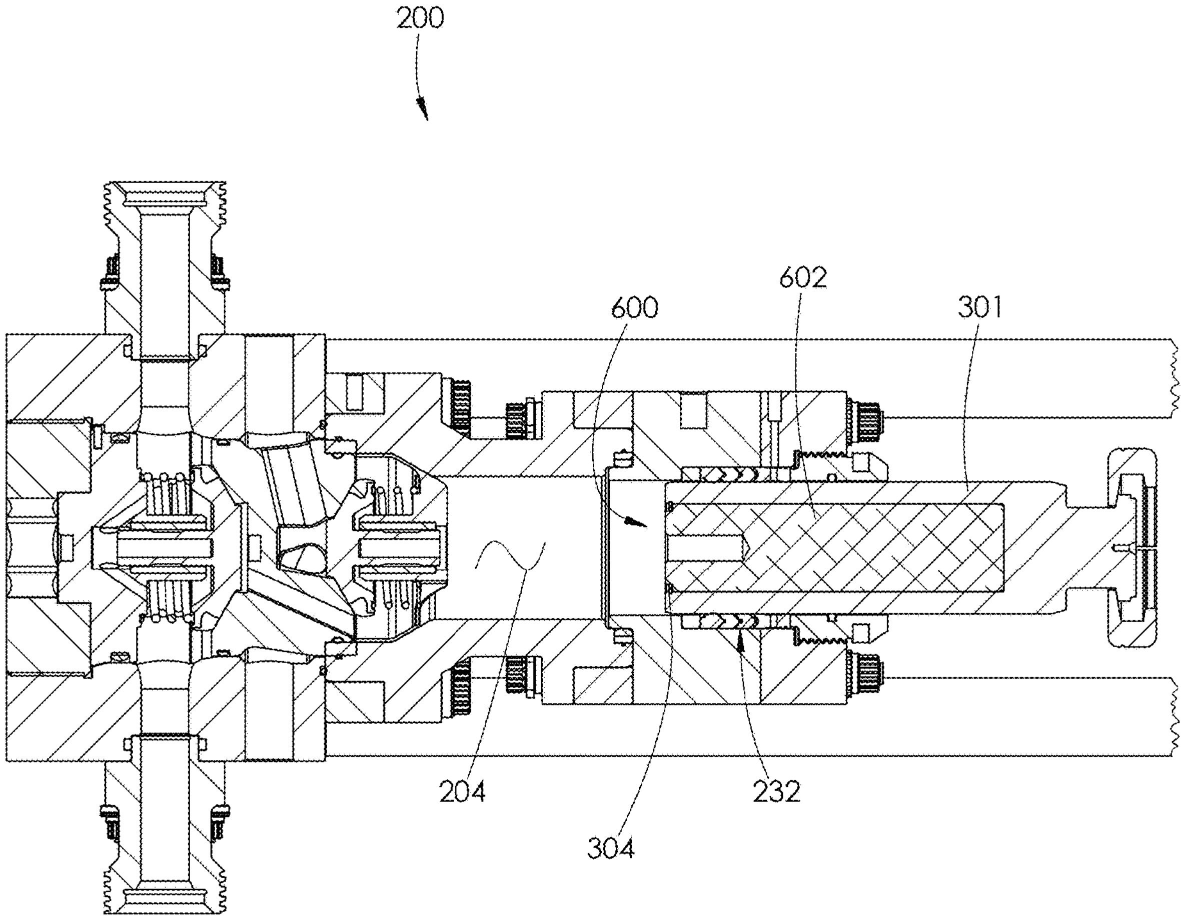
FIG. 60 is a cross-sectional view of the fluid end section shown in FIG. 59, with the plunger of the liquid cooled plunger system in the fully retracted or minimally inserted position.
Figure 61:
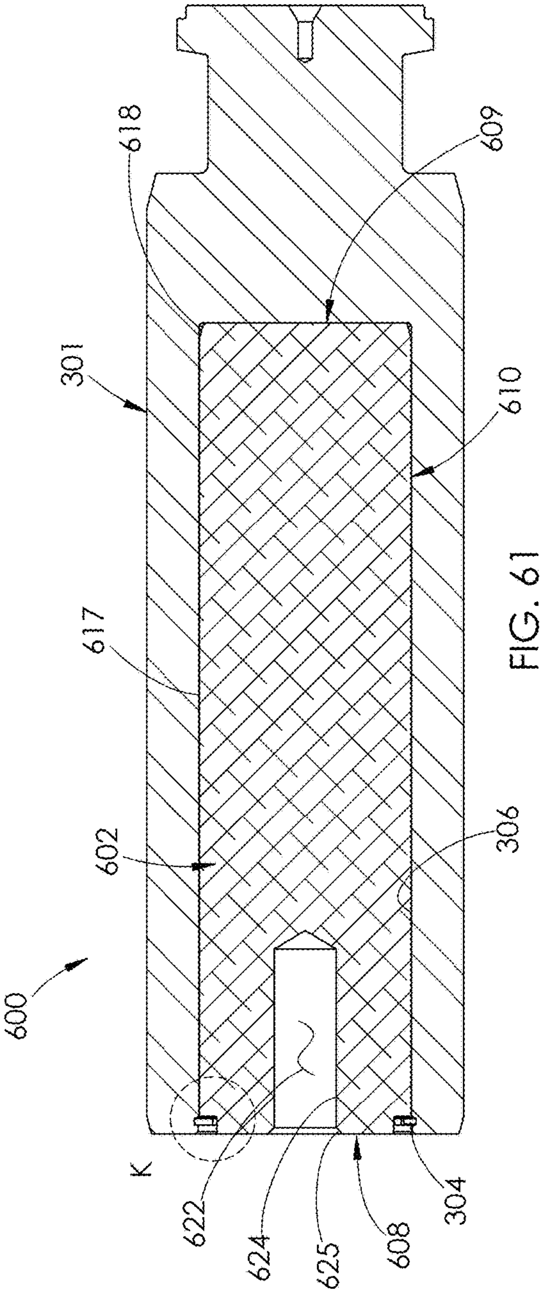
FIG. 61 is a cross-sectional view of the liquid cooled plunger system shown in FIGS. 59 and 60, taken along line B-B of FIG. 3.
Figure 62:
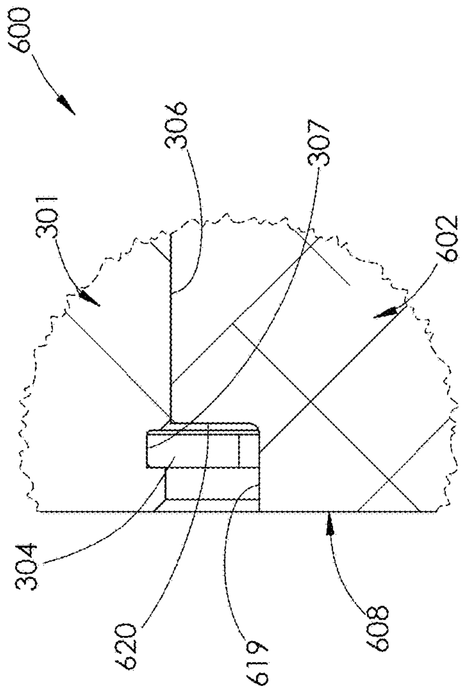
FIG. 62 is an enlarged view of area K of the liquid cooled plunger system shown in FIG. 61.
Figure 63:
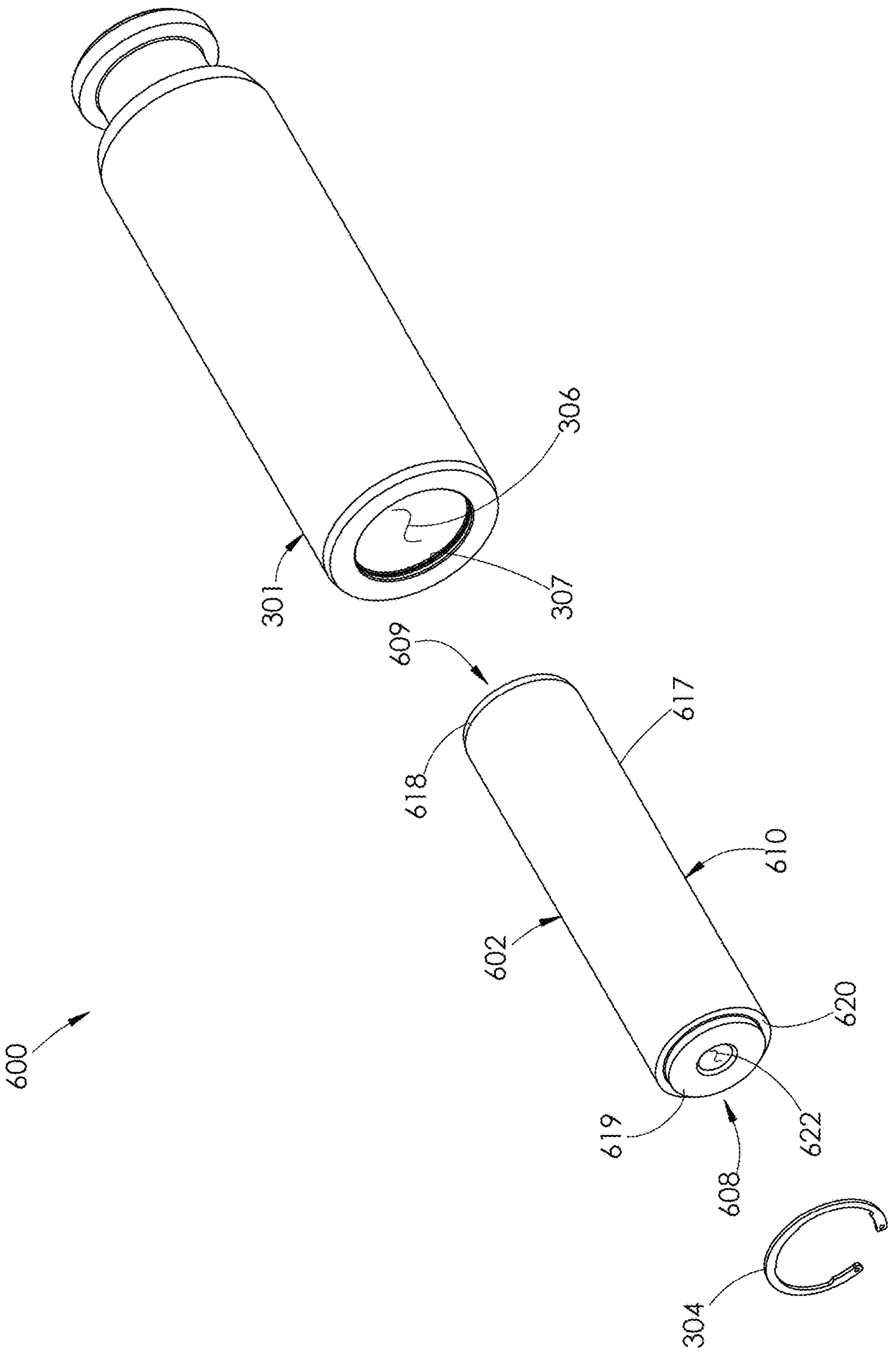
FIG. 63 is an exploded isometric view of the liquid cooled plunger system shown in FIG. 61.
Figure 64:
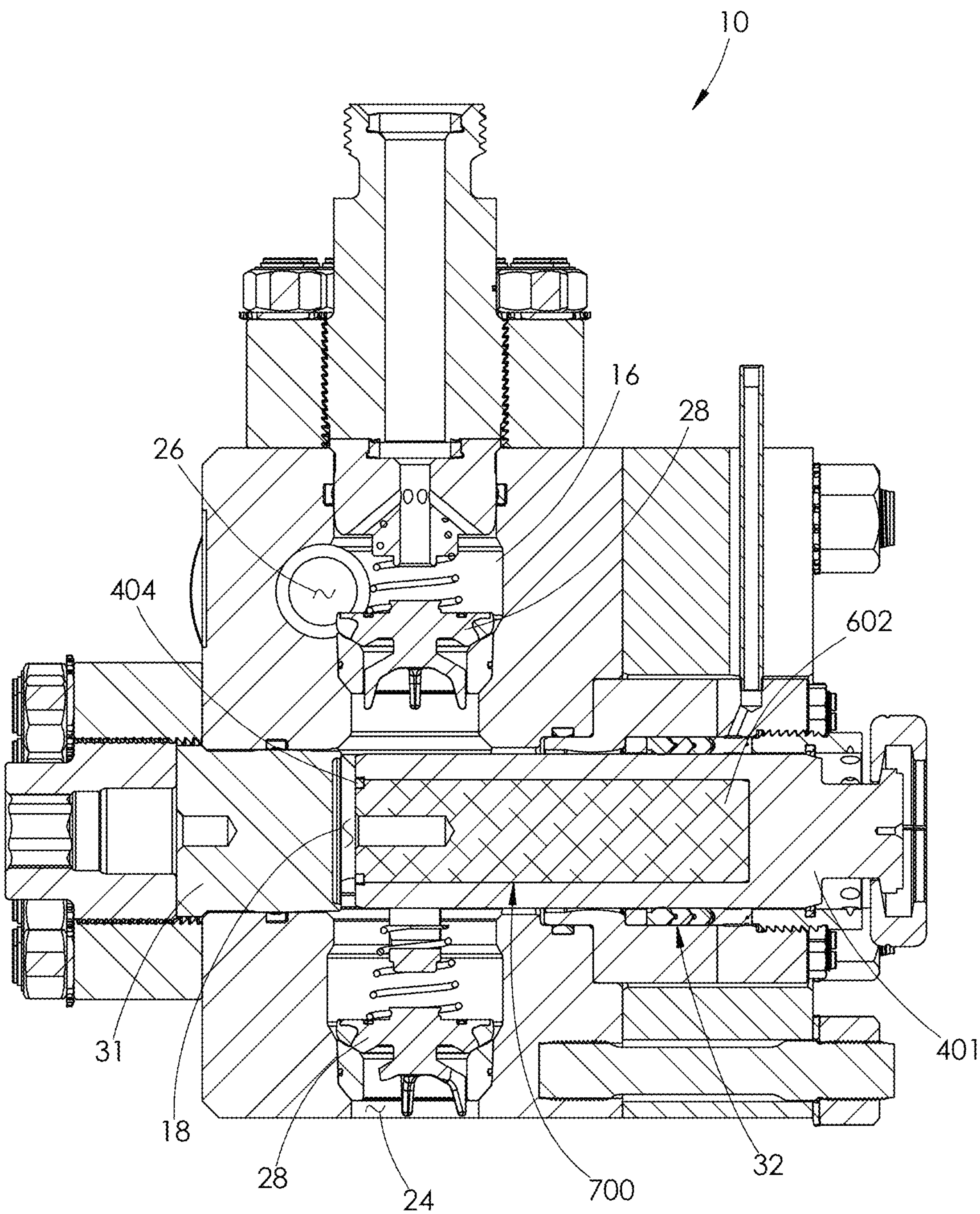
FIG. 64 is a cross-sectional view of the fluid end shown in FIG. 1, taken along line C-C, with another embodiment of a liquid cooled plunger system installed therein. The plunger of the liquid cooled plunger system is in the fully extended or maximally inserted position.
Figure 65:
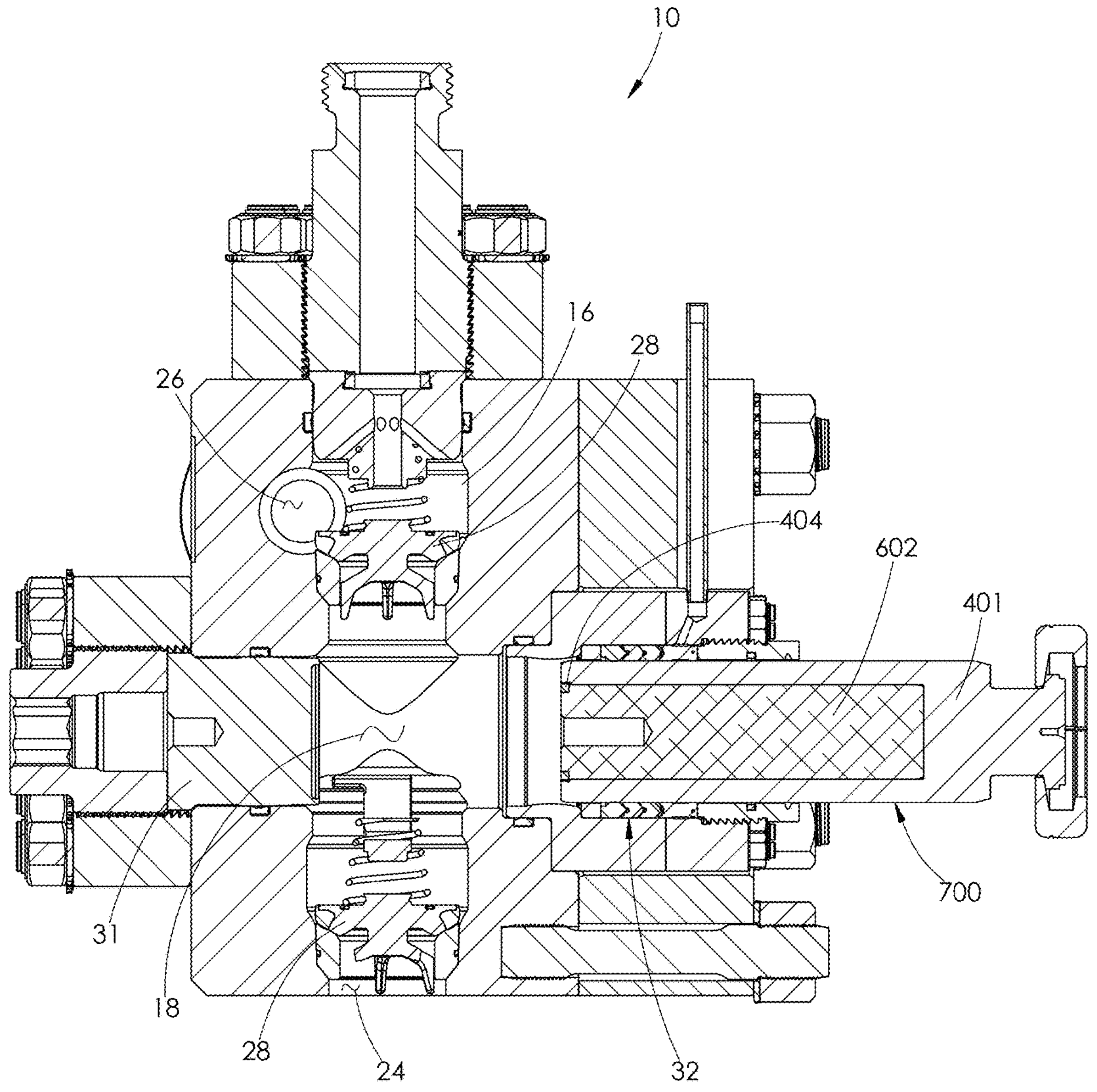
FIG. 65 is a cross-sectional view of the fluid end shown in FIG. 64, with the plunger of the liquid cooled plunger system in the fully retracted or minimally inserted position.
Figure 66:
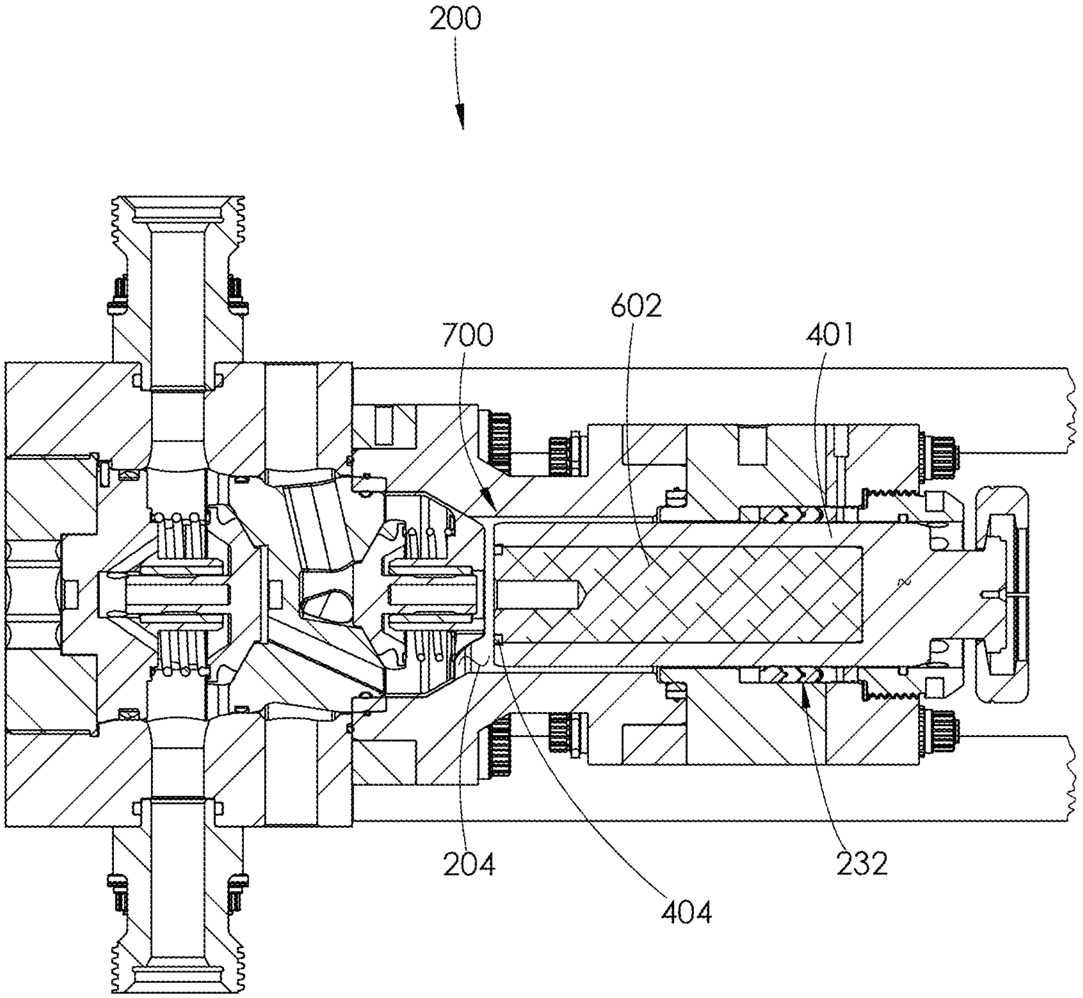
FIG. 66 is a cross-sectional view of the fluid end section shown in FIG. 3, taken along line B-B. The embodiment of the liquid cooled plunger system shown in FIG. 64 is installed therein. The plunger of the liquid cooled plunger system is in the fully extended or maximally inserted position.
Figure 67:
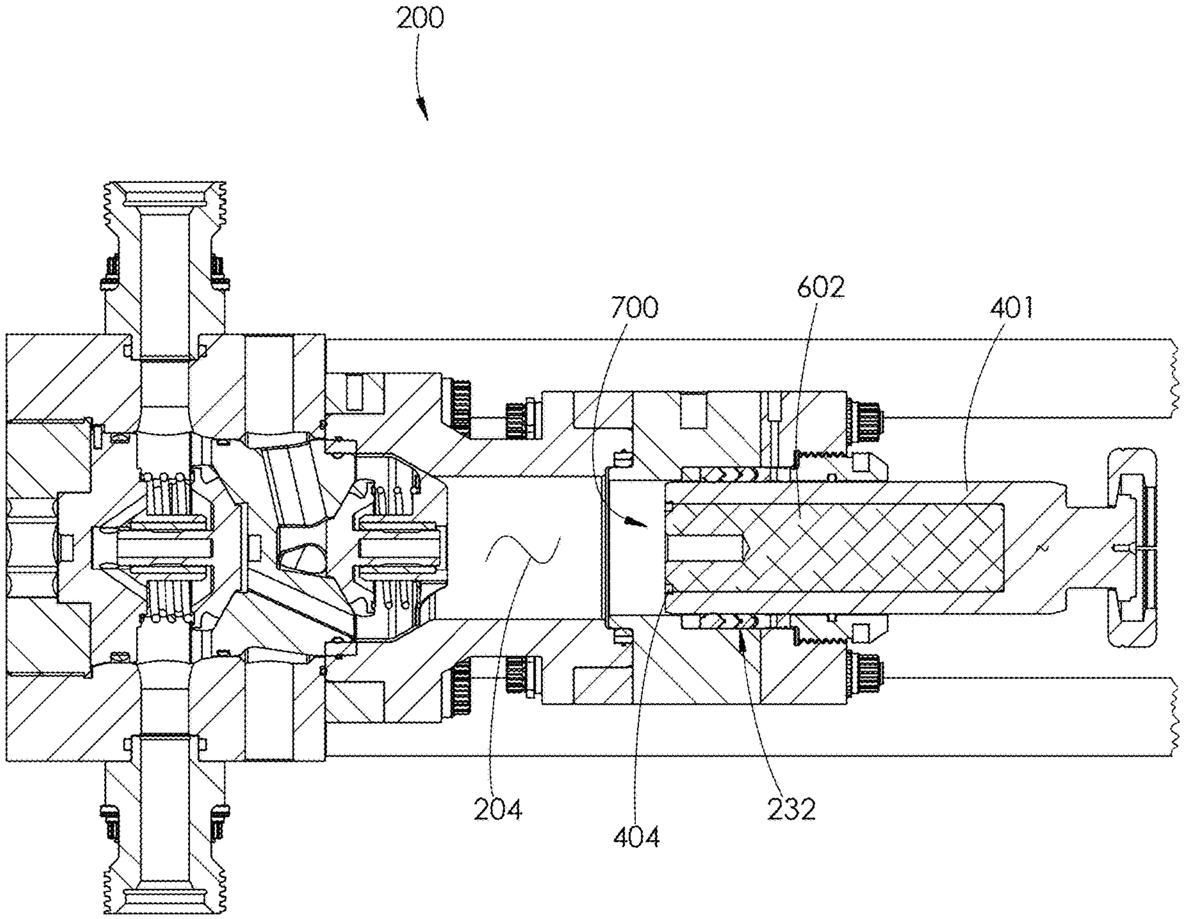
FIG. 67 is a cross-sectional view of the fluid end section shown in FIG. 66, with the plunger of the liquid cooled plunger system in the fully retracted or minimally inserted position.
Figure 68:
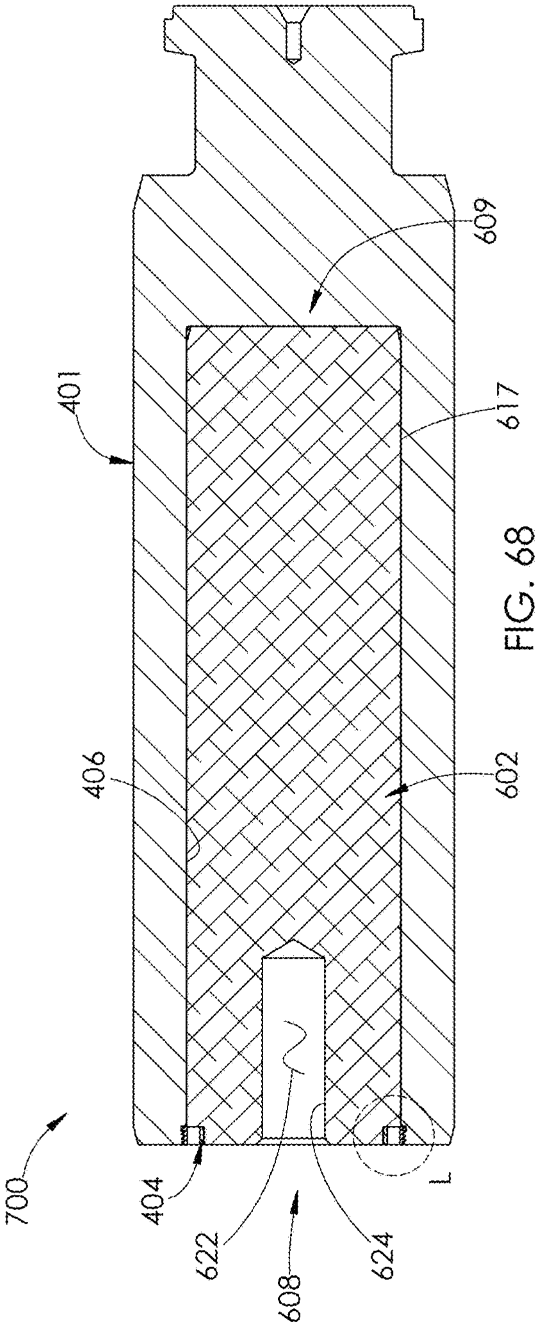
FIG. 68 is a cross-sectional view of the liquid cooled plunger system shown in FIGS. 66 and 67, taken along line B-B of FIG. 3.
Figure 69:
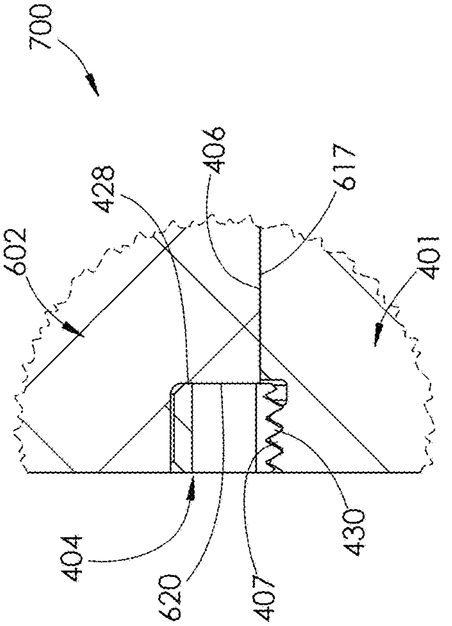
FIG. 69 is an enlarged view of area L of the liquid cooled plunger system shown in FIG. 68.
Figure 70:
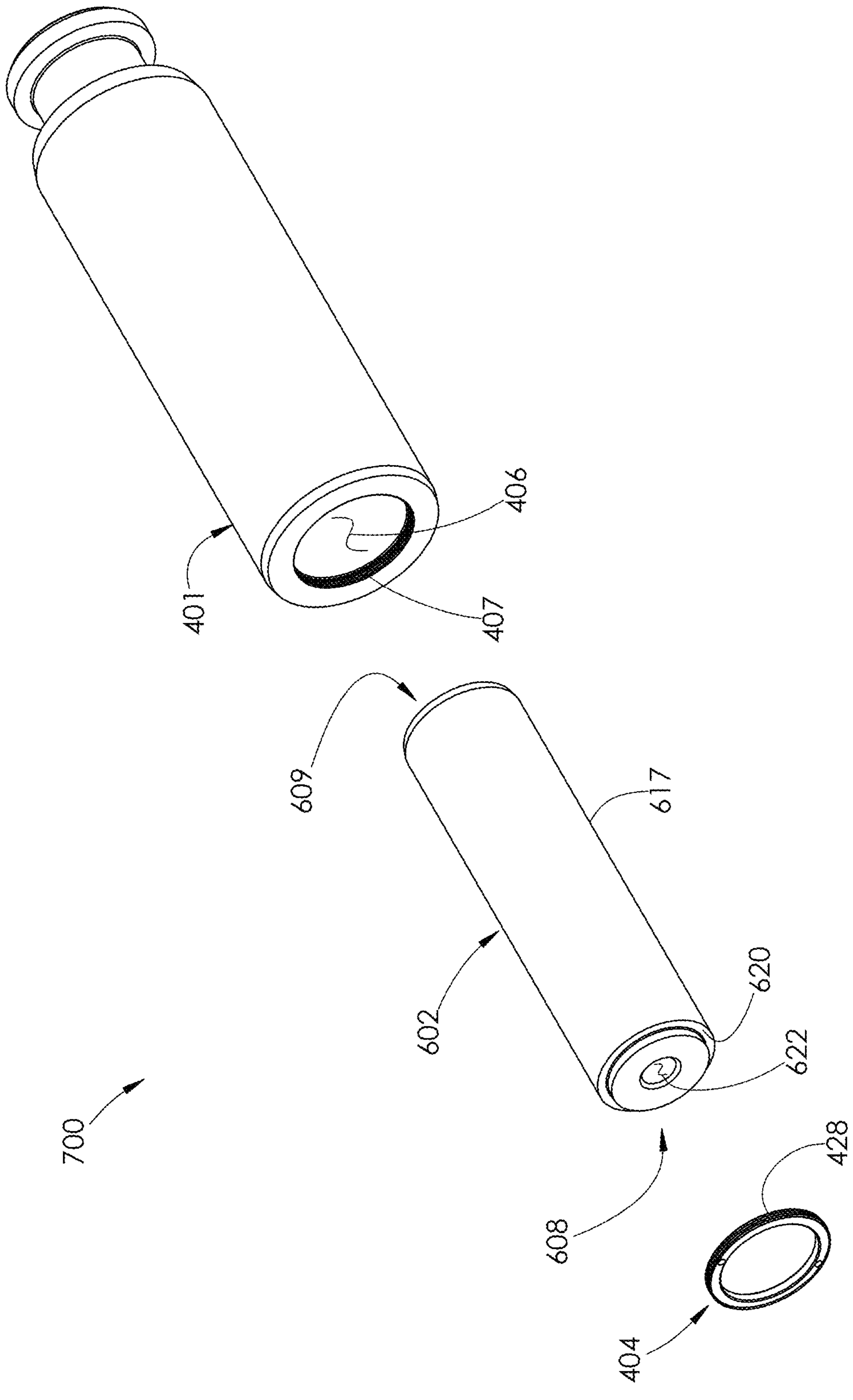
FIG. 70 is an exploded isometric view of the liquid cooled plunger system shown in FIG. 68.
Figure 71:
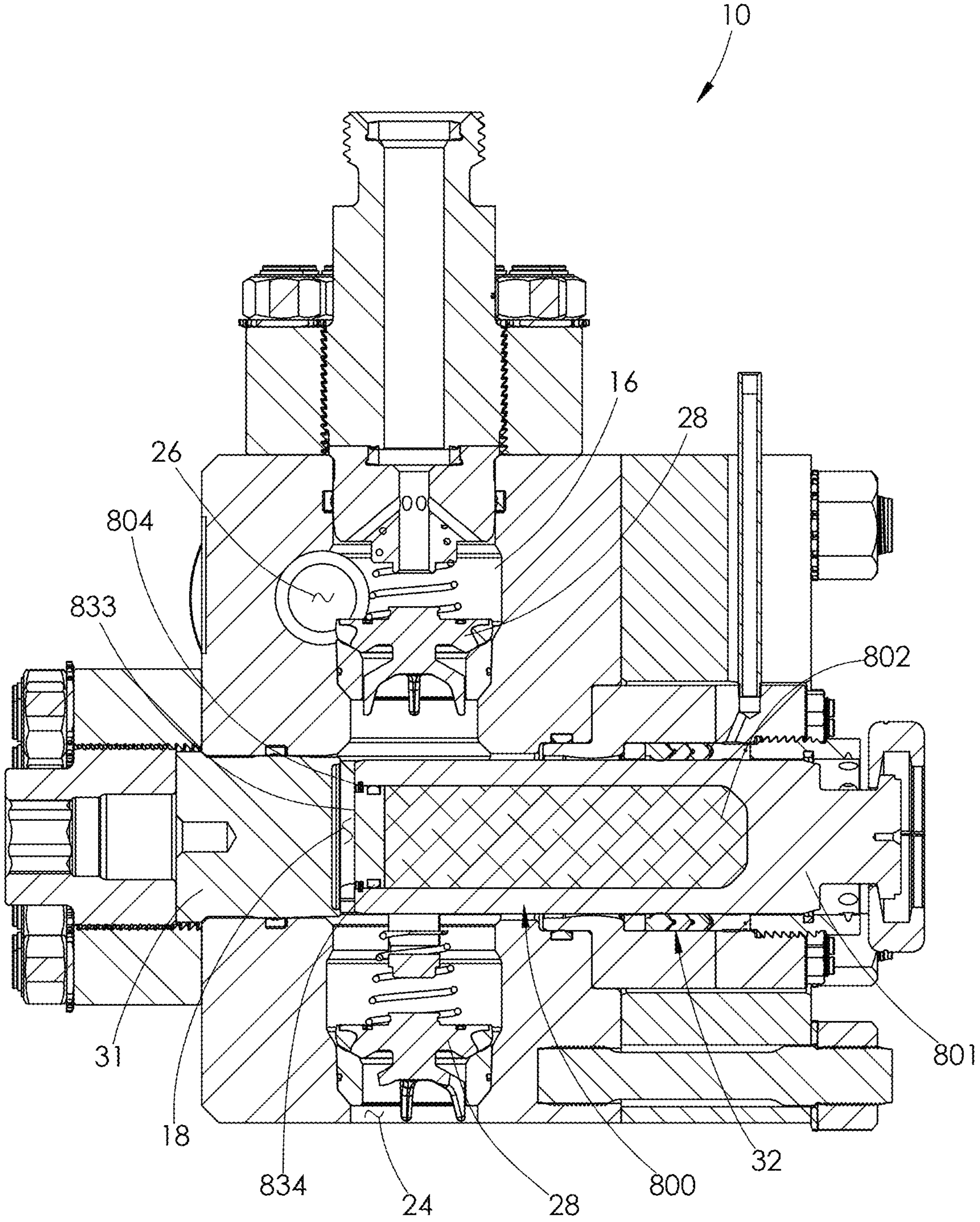
FIG. 71 is a cross-sectional view of the fluid end shown in FIG. 1, taken along line C-C, with another embodiment of a liquid cooled plunger system installed therein. The plunger of the liquid cooled plunger system is in the fully extended or maximally inserted position.
Figure 72:
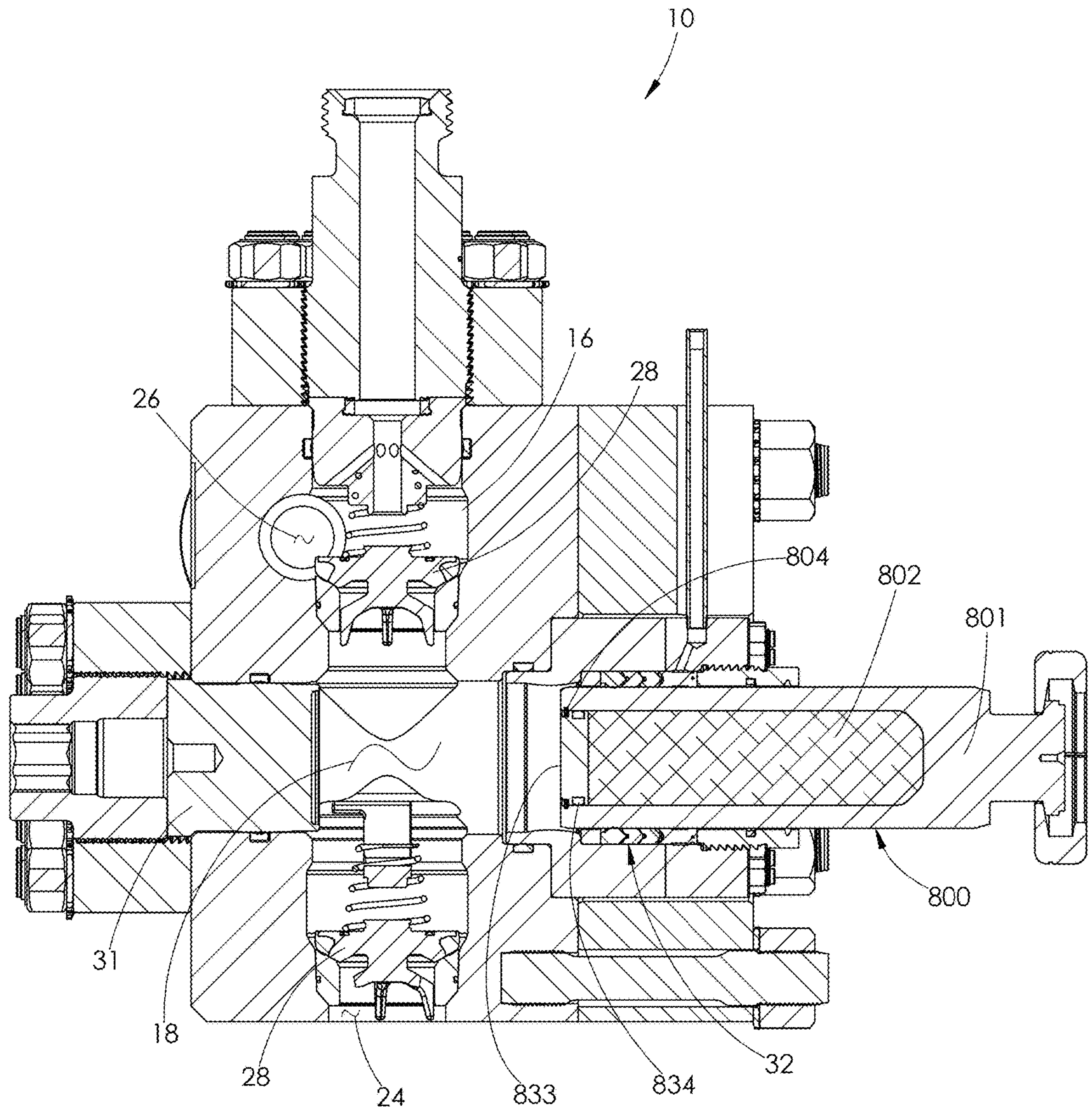
FIG. 72 is a cross-sectional view of the fluid end shown in FIG. 71, with the plunger of the liquid cooled plunger system in the fully retracted or minimally inserted position.
Figure 73:
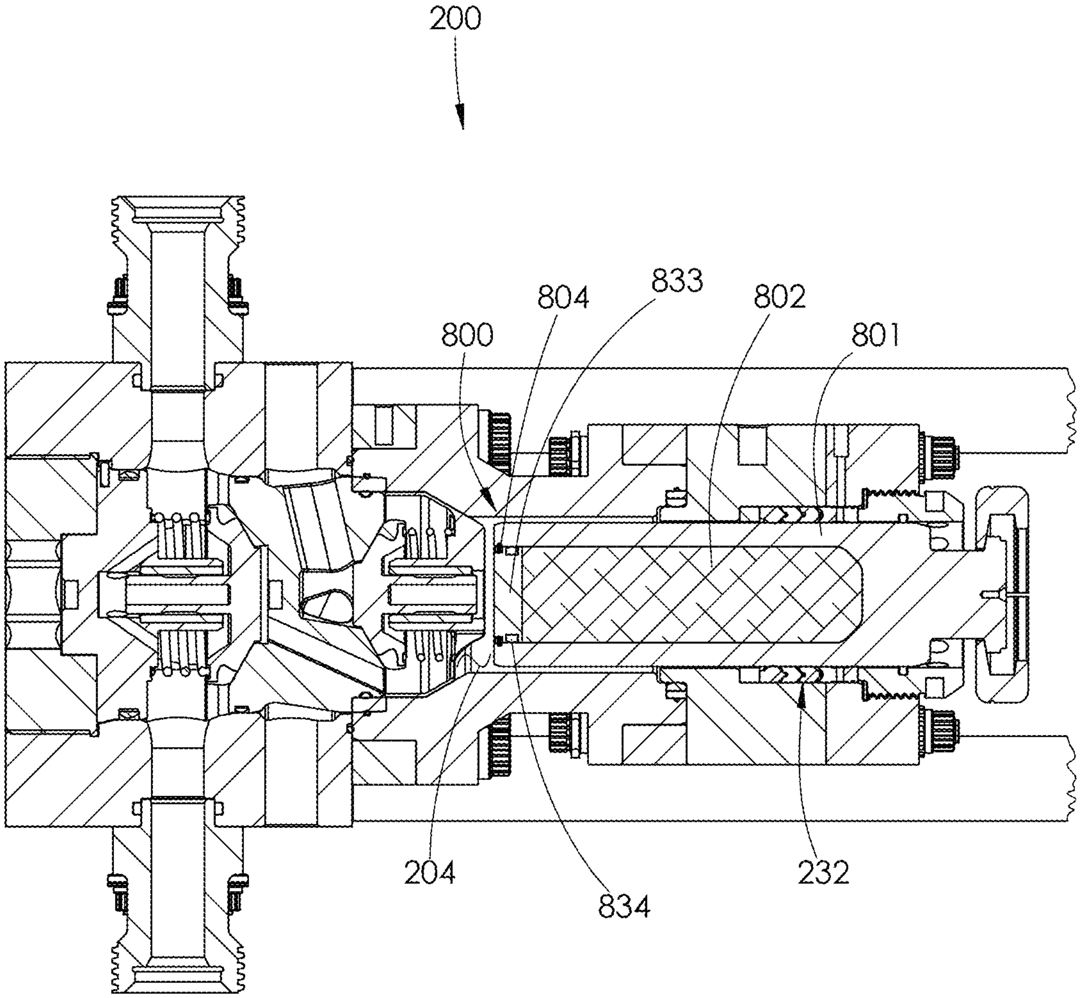
FIG. 73 is a cross-sectional view of the fluid end section shown in FIG. 3, taken along line B-B. The embodiment of the liquid cooled plunger system shown in FIG. 71 is installed therein. The plunger of the liquid cooled plunger system is in the fully extended or maximally inserted position.
Figure 74:
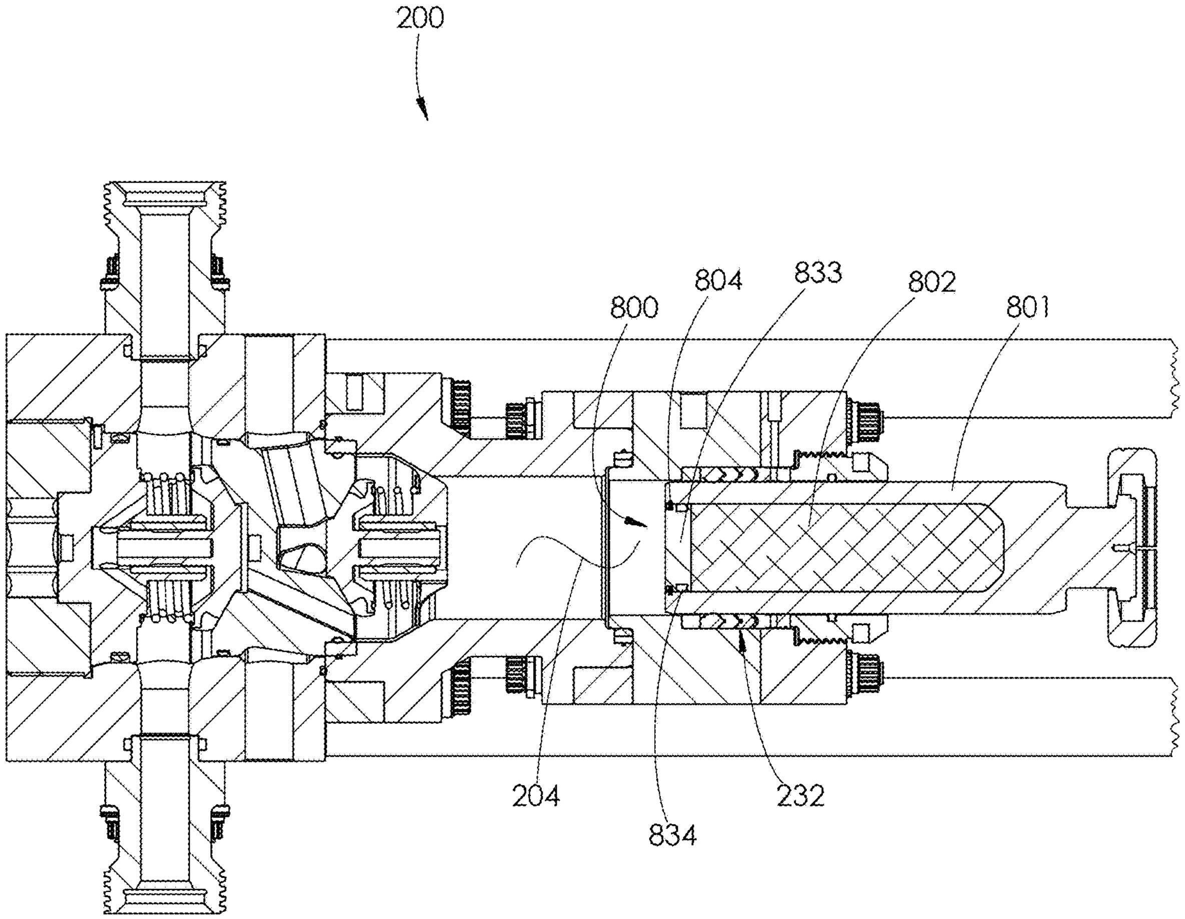
FIG. 74 is a cross-sectional view of the fluid end section shown in FIG. 73, with the plunger of the liquid cooled plunger system in the fully retracted or minimally inserted position.

Referring now to FIGS. 41-43, the heat exchanger 302 has a generally cylindrical shape and comprises a front surface 308 and an opposed rear surface 309, connected by an intermediate outer surface 310. The heat exchanger 302 further comprises a plurality of passages 311 and a central passage 312. In this embodiment the heat exchanger 302 is made of aluminum, however in alternative embodiments the heat exchanger 302 may be made of other materials. It is preferable that the material forming the heat exchanger 302 have a higher thermal conductivity than the material forming the plunger 301.

The front surface 308 of the heat exchanger 302 is perpendicular to the longitudinal axis of the heat exchanger 302. The rear surface 309 is perpendicular to the longitudinal axis of the heat exchanger 302 and comprises an outer lip 313 and a countersink 314. The countersink 314 comprises an angled side wall 315 and a base 316. The intermediate outer surface 310 comprises a body 317, a chamfer 318 adjacent the rear surface 309, a nose 319 adjacent the front surface 308 having a smaller diameter than the body 317, and a shoulder 320 adjacent the rear of the nose 319 formed by the diametral difference between the body 317 and nose 319.

Each passage 311 has a circular cross section with a longitudinal axis parallel to the longitudinal axis of the heat exchanger 302. Each passage 311 intersects the front surface 308 at one end and primarily the base 316 of the countersink 314 and partially the angled side wall 315 at the opposite end. The plurality of passages 311 are evenly spaced circumferentially proximate the intermediate outer surface 310. The passages 311 do not intersect the intermediate outer surface 310 of the nose 319. In this embodiment there are eight passages 311 spaced 44-46 degrees apart with 45 degrees preferred. In alternate embodiments there may be greater or fewer passages 311 which may be larger or smaller and have different circumferential spacing that is even or not. The cross section is circular but may have any shape.

The central passage 312 comprises a ball bore 321, a trap bore 322, and a shoulder 323. The longitudinal axes of the central passage 312, ball bore 321, and trap bore 322 are coincident with each other and with the longitudinal axis of the heat exchanger 302. The ball bore 321 has a circular cross section with a diameter that is larger than the diameter of the ball 303 and the diameter of the trap bore 322. The first end of the ball bore 321 intersects the base 316 of the countersink 314. The second end of the ball bore 321 terminates at the second end of the trap bore 322. The trap bore 322 comprises an internal thread 324 and countersink 325. The first end of the trap bore 322 intersects the front surface 308 and the second end of the trap bore 322 terminates at the second end of the ball bore 321. The internal thread 324 is formed in the wall of the trap bore 322. The countersink 325 is formed on the first end of the trap bore 322. The diameter of the trap bore 322 is smaller than the diameter of the ball 303. Shoulder 323 is formed at the intersection of the ball bore 321 and trap bore 322 due to the diametral difference between the ball bore 321 and trap bore 322. In this embodiment the length of the ball bore 321 is approximately ten times the length of the trap bore 322 and the internal thread 324 spans the entire length of the trap bore 322. In alternative embodiments the ratio of the length of the ball bore 321 to the trap bore 322 may be greater or smaller and the internal thread 324 may not span the entire length of the trap bore 322 or may be omitted. Also in alternative embodiments the diameters of the ball bore 321 and trap bore 322 may vary as long as the relationship between the diameters is such that the diameter of the ball bore 321 is always greater than the diameter of the ball 303 and the diameter of the ball 303 is always greater than the diameter of the trap bore 322.

The ball 303 is solid and generally shaped like a sphere. The ball 303 may be made of a relatively dense material such as a lead alloy or a tungsten alloy. The diameter of the ball 303 is smaller than the diameter of the ball bore 321 and larger than the diameter of the trap bore 322. In this embodiment the ball 303 is a sphere but in alternative embodiments may have any shape as long as the shape allows the ball 303 to be retained in the ball bore 321 by the trap bore 322.

The retainer 304 is a standard internal snap ring well known in the art. In this embodiment the retainer 304 is an internal snap ring but in alternative embodiments may not be an internal snap ring.

Continuing with FIGS. 34-40, the liquid cooled plunger system 300 is assembled by first inserting the ball 303 in the ball bore 321. Second, the heat exchanger 302 is inserted in the heat exchanger bore 306 of the plunger 301 until the rear surface 309 of the heat exchanger 302 abuts the base of the heat exchanger bore 306 forming a plenum 326. The fit between the body 317 of the heat exchanger 302 and the inside diameter of the heat exchanger bore 306 is preferably a clearance fit but may be an interference fit or transition fit. Insertion of the heat exchanger 302 may be facilitated by threading a bolt or other assembly aid (not shown) into the internal thread 324 of the trap bore 322. Disassembly will also be facilitated by the use of a bolt or other assembly aid (not shown) threaded in the internal thread 324 of the trap bore 322. Third, the retainer 304, or internal snap ring, is installed in the snap ring groove 307 of the heat exchanger bore 306.

Once the liquid cooled plunger system 300 is assembled it may be used in fluid end 10 (depicted in FIGS. 34 and 35), fluid end section 200 (depicted in FIGS. 36 and 37), or any other pump or portion of a pump using a plunger.

In operation the liquid cooled plunger system 300 reduces the surface temperature of the plunger 301. This reduction in temperature also reduces the temperature of the plunger packing 32/232 thus increasing the life of the plunger packing 32/232. The temperature reduction is accomplished by transferring the heat generated by the friction between the outer surface of the plunger 301 and the plunger packing 32/232 away from the surface of the plunger 301. The close contact of the heat exchanger 302 with the heat exchanger bore 306 and the higher thermal conductivity of the heat exchanger 302 as compared to that of the plunger 301 facilitates the heat flow from the plunger 301 to the heat exchanger 302. Once the heat is transferred to the heat exchanger 302 the heat is then transferred to the fluid being pumped by contact between the fluid and the surfaces of the passages 311, central passage 312, base of the heat exchanger bore 306, and the rear surface 309 of the heat exchanger 302.

The fluid within the passages 311 and central passage 312 is made to flow by the ball 303. Flow is caused by the relative movement of the ball 303 to the heat exchanger 302. Since the ball 303 has a higher density than the fluid, the ball 303 will have a tendency to not move, or not move as much as the heat exchanger 302 while the plunger 301 reciprocates. When the plunger 301 is on the retraction part of its stroke the ball 303 will cause fluid to be drawn into the passages 311. When the plunger 301 is on the insertion part of its stroke the ball 303 will cause fluid to be expelled out of the passages 311. The diameter of the ball 303 is small enough to allow flow around the ball 303 within the central passage 312 as needed. The smaller diameter of the trap bore 322 will keep the ball 303 trapped between the shoulder 320 and the base of the heat exchanger bore 306. The plenum 326 allows fluid to pass between the passages 311 and the central passage 312 as needed. During the time the fluid is drawn into the heat exchanger 302 and expelled out of the heat exchanger 302 the fluid is absorbing heat. Once the fluid is expelled the heat is carried with the fluid away from the pump. Thus each stroke of the plunger 301 carries heat away from the plunger packing 32/232, reducing its temperature and increasing the life of the plunger packing 32/232.

Referring now to FIGS. 44-50, another embodiment of a liquid cooled plunger system 400 is shown. The liquid cooled plunger system 400 comprises a plunger 401, a heat exchanger 302, a ball 303, and a retainer 404. The plunger 401 has a generally cylindrical shape and comprises a front surface 405 and a heat exchanger bore 406. The heat exchanger bore 406 is a blind bore with a bore axis coincident with the longitudinal axis of the plunger 401. The heat exchanger bore 406 comprises an internal thread 407. In this embodiment the plunger 401 is made of an alloy steel however in alternative embodiments the plunger 401 may be made of other materials. It is preferable that the material forming the plunger 401 have a lower thermal conductivity than the material forming the heat exchanger 302.

The retainer 404 may be a spanner nut 404 well known in the art. The spanner nut 404 comprises a front surface 427 and a rear surface 428 connected by an intermediate outer surface 429. The intermediate outer surface 429 comprises an external thread 430. The spanner nut 404 further comprises a plurality of spanner wrench holes 431 and a central passage 432. Each spanner wrench hole 431 is a through bore with a bore axis parallel to the longitudinal axis of the spanner nut 404. There are an even number of spanner wrench holes 431 which are diametrically opposed and evenly spaced circumferentially proximate the intermediate outer surface 429. The spanner wrench holes 431 do not intersect the intermediate outer surface 429 or the central passage 432. In this embodiment there are two spanner wrench holes 431 spaced 179-181 degrees apart with 180 degrees preferred. In alternate embodiments there may be greater or fewer spanner wrench holes 431, but only in even numbers, which may be larger or smaller and have different circumferential spacing that is even or not as long as there is always a pair of spanner wrench holes 431 diametrically opposite each other.

In this embodiment the retainer 404 is a spanner nut, but in alternative embodiments the retainer 404 may not be a spanner nut but still have external threads 430.

The liquid cooled plunger system 400 is assembled by first inserting the ball 303 in the ball bore 321. Second, the heat exchanger 302 is inserted in the heat exchanger bore 406 of the plunger 401 until the rear surface 309 of the heat exchanger 302 abuts the base of the heat exchanger bore 406 forming a plenum 426. The fit between the body 317 of the heat exchanger 302 and the inside diameter of the heat exchanger bore 406 is preferably a clearance fit but may be an interference fit or transition fit. Insertion of the heat exchanger 302 may be facilitated by threading a bolt or other assembly aid (not shown) into the internal thread 324 of the trap bore 322. Disassembly will also be facilitated by the use of a bolt or other assembly aid (not shown) threaded in the internal thread 324 of the trap bore 322. Third, the retainer 404, or spanner nut 404, is threaded into the internal thread 407 of the heat exchanger bore 406 until the rear surface 428 of the spanner nut 404 abuts the shoulder 320 of the heat exchanger 302.

Once the liquid cooled plunger system 400 is assembled it may be used in fluid end 10 (depicted in FIGS. 44 and 45), fluid end section 200 (depicted in FIGS. 46 and 47), or any other pump or portion of a pump using a plunger.

In operation the liquid cooled plunger system 400 operates exactly the same as liquid cooled plunger system 300.

Referring now to FIGS. 51-56, another embodiment of a liquid cooled plunger system 500 is shown. The liquid cooled plunger system 500 comprises a plunger 501 and heat exchanger 502. The plunger 501 comprises a heat exchanger bore 506. The heat exchanger 502 has a generally cylindrical shape and comprises a front surface 508 and opposing rear surface 509 connected by an intermediate outer surface 510. The front and rear surfaces 508 and 509 of the heat exchanger 502 are perpendicular to the longitudinal axis of the heat exchanger 502. The intermediate outer surface 510 comprises a body 517 and a chamfer 518 adjacent the rear surface 509.

In contrast to the other heat exchangers disclosed herein, the heat exchanger 502 does not include any fluid through-bores. Instead, the heat exchanger 502 is solid and made of a material having a higher thermal conductivity than the material forming the plunger 501. For example, if the plunger 501 is made of steel, the heat exchanger 502 may be made of aluminum. During operation, the aluminum heat exchanger 502 absorbs heat from the steel plunger 501, thereby cooling the plunger 501. In alternative embodiments, the heat exchanger 502 may be made of other materials known in the art to have a higher thermal conductivity than that making up the plunger 501.

The liquid cooled plunger system 500 is assembled by inserting the heat exchanger 502, rear surface 509 first, in the heat exchanger bore 506 of the plunger 501 until the rear surface 509 of the heat exchanger 502 abuts the base of the heat exchanger bore 506. The fit between the body 517 of the heat exchanger 502 and the inside diameter of the heat exchanger bore 506 is preferably an interference fit or transition fit. This embodiment is not intended to be disassembled but may be if desired.

Once the liquid cooled plunger system 500 is assembled it may be used in fluid end 10 (shown in FIGS. 51 and 52), fluid end section 200 (shown in FIGS. 53 and 54), or any other pump or portion of a pump using a plunger.

In operation the liquid cooled plunger system 500 reduces the surface temperature of the plunger 501. This reduction in temperature also reduces the temperature of the plunger packing 32/232 thus increasing the life of the plunger packing 32/232. The temperature reduction is accomplished by transferring the heat generated by the friction between the outer surface of the plunger 501 and the plunger packing 32/232 away from the surface of the plunger 501. The close contact of the heat exchanger 502 with the heat exchanger bore 506 and the higher thermal conductivity of the heat exchanger 502 as compared to that of the plunger 501 facilitates the heat flow from the plunger 501 to the heat exchanger 502. Once the heat is transferred to the heat exchanger 502 the heat is then transferred to the fluid being pumped by contact between the fluid and the front surface 508 of the heat exchanger 502.

Referring now to FIGS. 57-63, another embodiment of a liquid cooled plunger system 600 is shown. The liquid cooled plunger system 600 comprises a plunger 301, a heat exchanger 602, and a retainer 304. The heat exchanger 602 has a generally cylindrical shape and comprises a front surface 608 and opposing rear surface 609 connected by an intermediate outer surface 610. The heat exchanger 602 further comprises an installation bore 622. Like the heat exchanger 502, the heat exchanger 602 is solid, with the exception of the installation bore 622. The heat exchanger 602 is made of a material having a higher thermal conductivity than the material forming the plunger 301. For example, the heat exchanger 602 may be made of aluminum and the plunger 301 made of steel. In alternative embodiments, the heat exchanger 602 may be made of other materials known to have a higher thermal conductivity than the material forming the plunger 301.

The front and rear surfaces 608 and 609 of the heat exchanger 602 are perpendicular to the longitudinal axis of the heat exchanger 602. The intermediate outer surface 610 comprises a body 617, a chamfer 618 adjacent the rear surface 609, a nose 619 adjacent the front surface 608 having a smaller diameter than the body 617, and a shoulder 620 adjacent the rear of the nose 619 formed by the diametral difference between the body 617 and nose 619.

The longitudinal axis of the installation bore 622 is coincident with the longitudinal axis of the heat exchanger 602. The installation bore 622 is a blind bore that comprises an internal thread 624 and countersink 625. The installation bore 622 originates from the front surface 608. The internal thread 624 is formed in the wall of the installation bore 622. The countersink 625 is formed on the front surface 608.

Continuing with FIGS. 57-63, the liquid cooled plunger system 600 is assembled by first inserting the heat exchanger 602, rear surface 609 first, in the heat exchanger bore 306 of the plunger 301 until the rear surface 609 of the heat exchanger 602 abuts the base of the heat exchanger bore 306. The fit between the body 617 of the heat exchanger 602 and the inside diameter of the heat exchanger bore 306 is preferably a clearance fit but may be an interference fit or transition fit. Insertion of the heat exchanger 602 may be facilitated by threading a bolt or other assembly aid (not shown) into the internal thread 624 of the installation bore 622. Disassembly may also be facilitated by the use of a bolt or other assembly aid (not shown) threaded in the internal thread 624 of the installation bore 622. Next, the retainer 304, or internal snap ring 304, is installed in the snap ring groove 307 of the heat exchanger bore 306.

Once the liquid cooled plunger system 600 is assembled it may be used in fluid end 10 (shown in FIGS. 57 and 58), fluid end section 200 (shown in FIGS. 59 and 60), or any other pump or portion of a pump using a plunger.

In operation the liquid cooled plunger system 600 operates exactly the same as liquid cooled plunger system 500. The installation bore 622 provides more surface area for the fluid to contact than heat exchanger 502 which may increase the heat transfer rate from the heat exchanger 602 to the fluid.

Referring now to FIGS. 64-70, another embodiment of a liquid cooled plunger system 700 is shown. The liquid cooled plunger system 700 comprises plunger 401, heat exchanger 602, and retainer 404.

The liquid cooled plunger system 700 is assembled by first inserting the heat exchanger 602, rear surface 609 first, in the heat exchanger bore 406 of the plunger 401 until the rear surface 609 of the heat exchanger 602 abuts the base of the heat exchanger bore 406. The fit between the body 617 of the heat exchanger 602 and the inside diameter of the heat exchanger bore 406 is preferably a clearance fit but may be an interference fit or transition fit. Insertion of the heat exchanger 602 may be facilitated by threading a bolt or other assembly aid (not shown) into the internal thread 624 of the installation bore 622. Disassembly may also be facilitated by the use of a bolt or other assembly aid (not shown) threaded in the internal thread 624 of the installation bore 622. Next, the retainer 404, or spanner nut 404, is threaded into the internal thread 407 of the heat exchanger bore 406 until the rear surface 428 of the spanner nut 404 abuts the shoulder 620 of the heat exchanger 602.

Once the liquid cooled plunger system 700 is assembled it may be used in fluid end 10 (shown in FIGS. 64 and 65), fluid end section 200 (shown in FIGS. 66 and 67), or any other pump or portion of a pump using a plunger.

In operation the liquid cooled plunger system 700 operates exactly the same as liquid cooled plunger system 500. The installation bore 622 provides more surface area for the fluid to contact than heat exchanger 502 which may increase the heat transfer rate from the heat exchanger 602 to the fluid.

Referring now to FIGS. 71-82, another embodiment of a liquid cooled plunger system 800 is shown. The liquid cooled plunger system 800 comprises plunger 801, heat exchanger 802, a retainer 804, a plug 833, and a seal 834. The plunger 801 has a generally cylindrical shape and comprises a front surface 805 and a heat exchanger bore 806. The heat exchanger bore 806 is a blind bore with a bore axis coincident with the longitudinal axis of the plunger 801. The heat exchanger bore 806 comprises a retaining ring groove 807. In this embodiment the plunger 801 is made of an alloy steel however in alternative embodiments the plunger 801 may be made of other materials.

Figure 75:
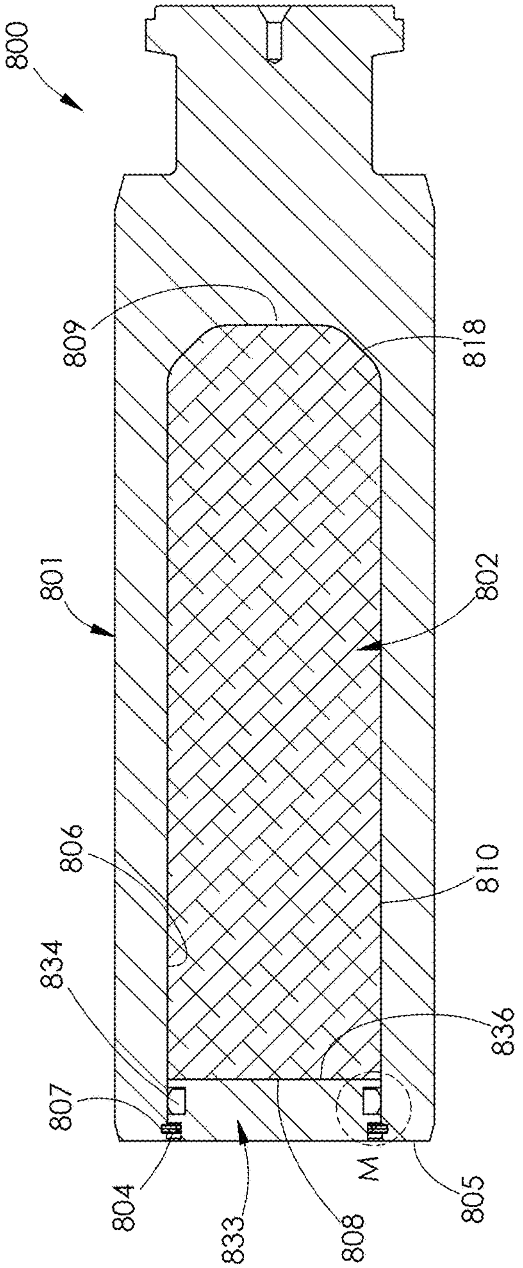
FIG. 75 is a cross-sectional view of the liquid cooled plunger system shown in FIGS. 73 and 74, taken along line B-B of FIG. 3.
Figure 76:
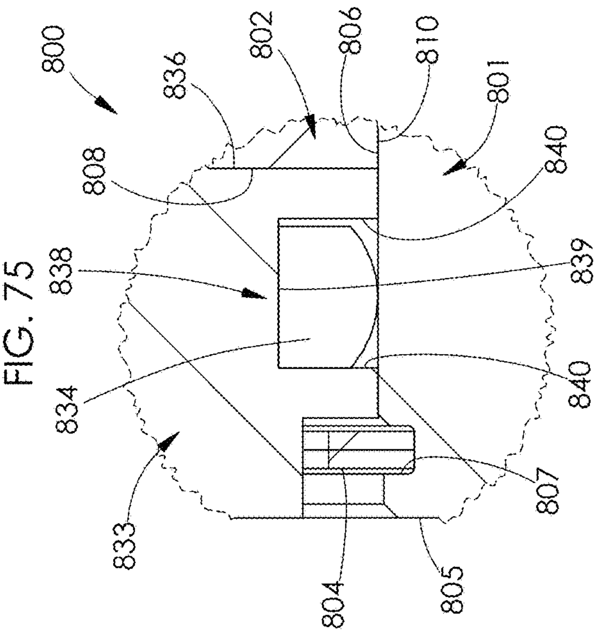
FIG. 76 is an enlarged view of area M of the liquid cooled plunger system shown in FIG. 75.
Figures 77, 78:
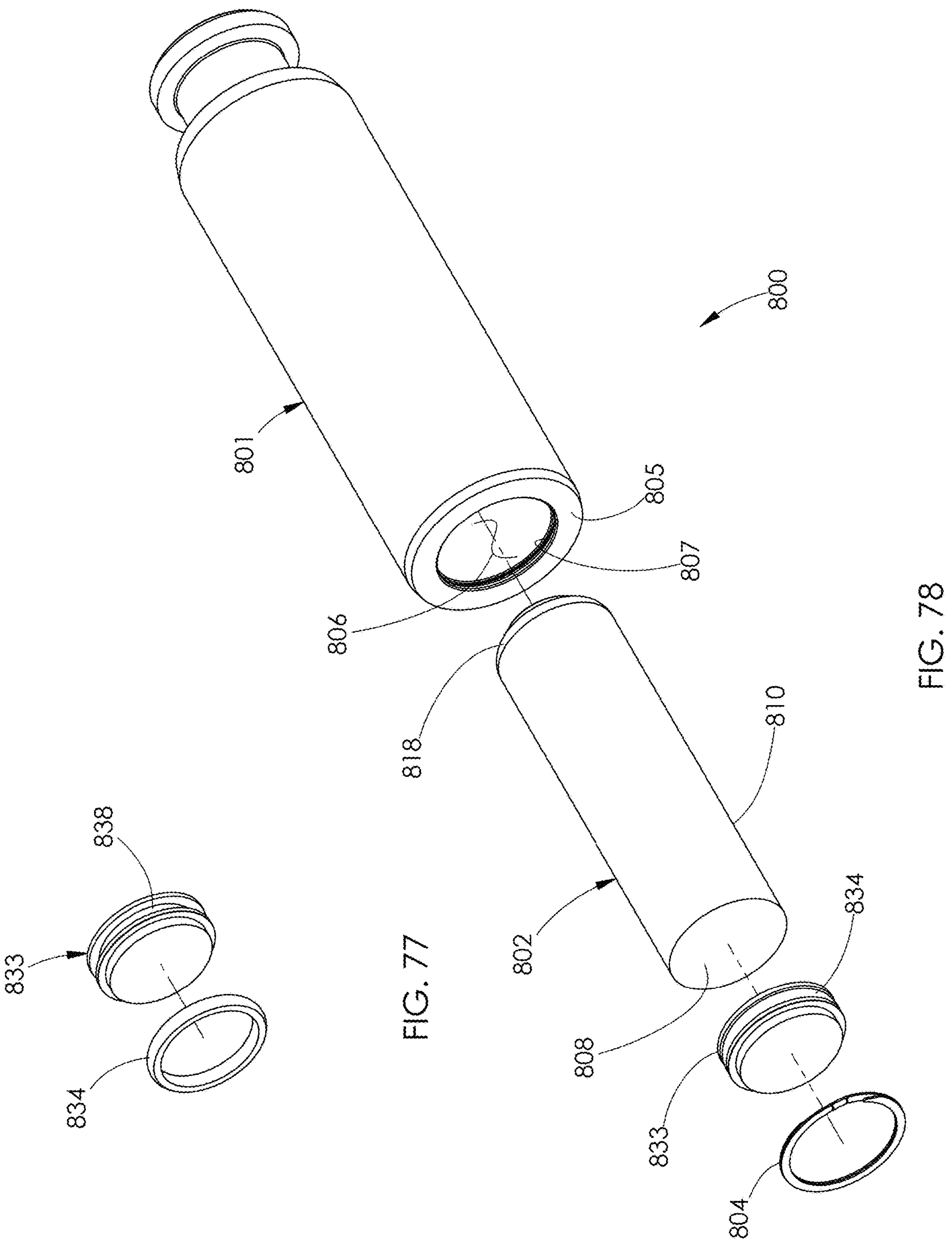
FIG. 77 is an exploded isometric view of the plug and seal used in the liquid cooled plunger system shown in FIG. 75.
FIG. 78 is an exploded isometric view of the liquid cooled plunger system shown in FIG. 75.
Figure 79:
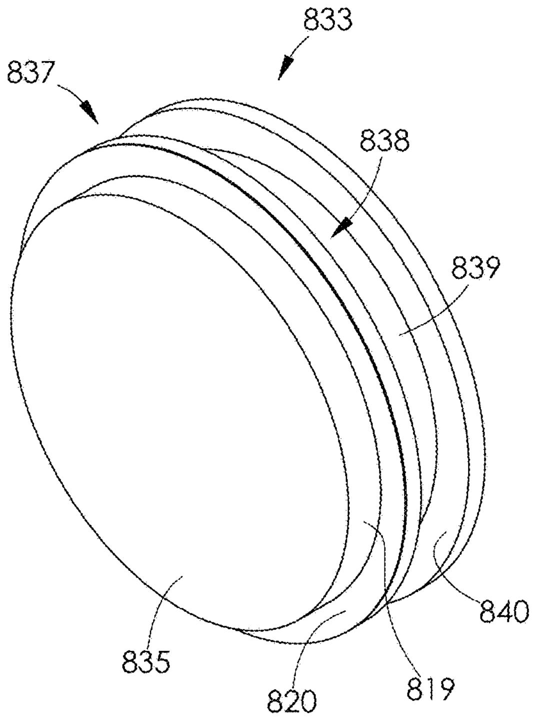
FIG. 79 is an isometric view of the plug used in the liquid cooled plunger system shown in FIG. 75.
Figure 80:
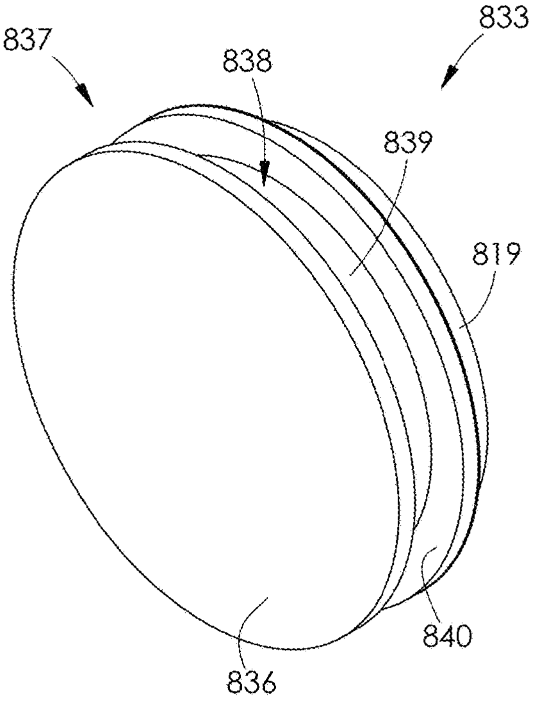
FIG. 80 is a rear isometric view of the plug shown in FIG. 79.
Figure 81:
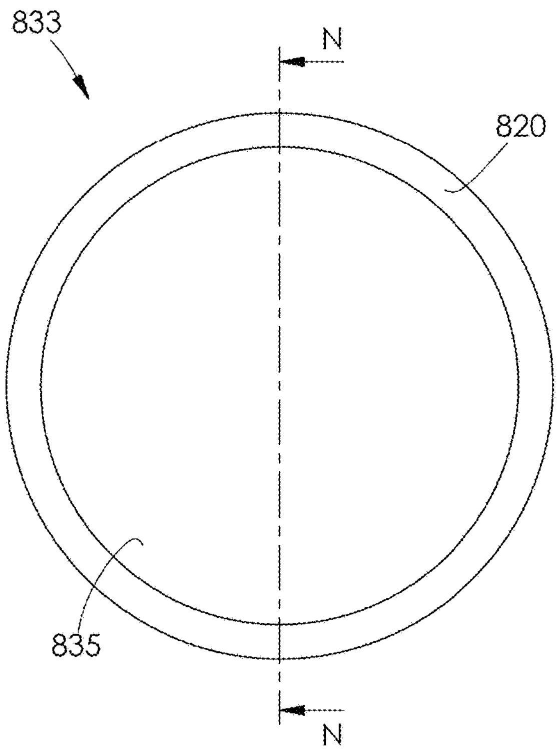
FIG. 81 is a front elevation view of the plug shown in FIG. 79.
Figure 82:
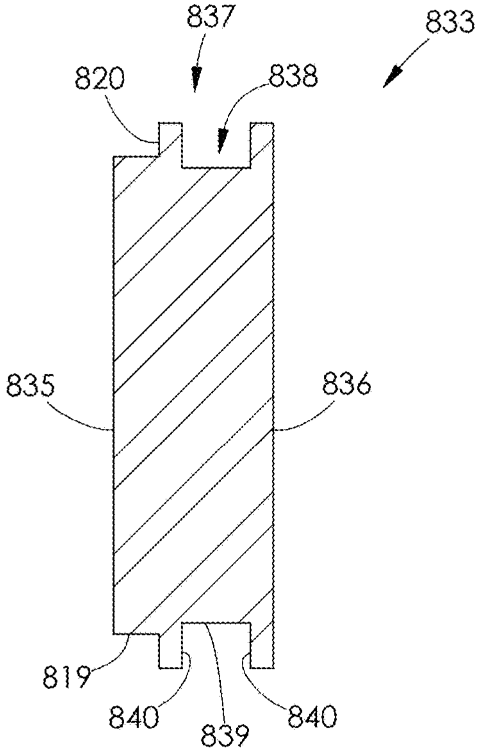
FIG. 82 is a cross-sectional view of the plug shown in FIG. 81, taken along line N-N.
Figure 83:
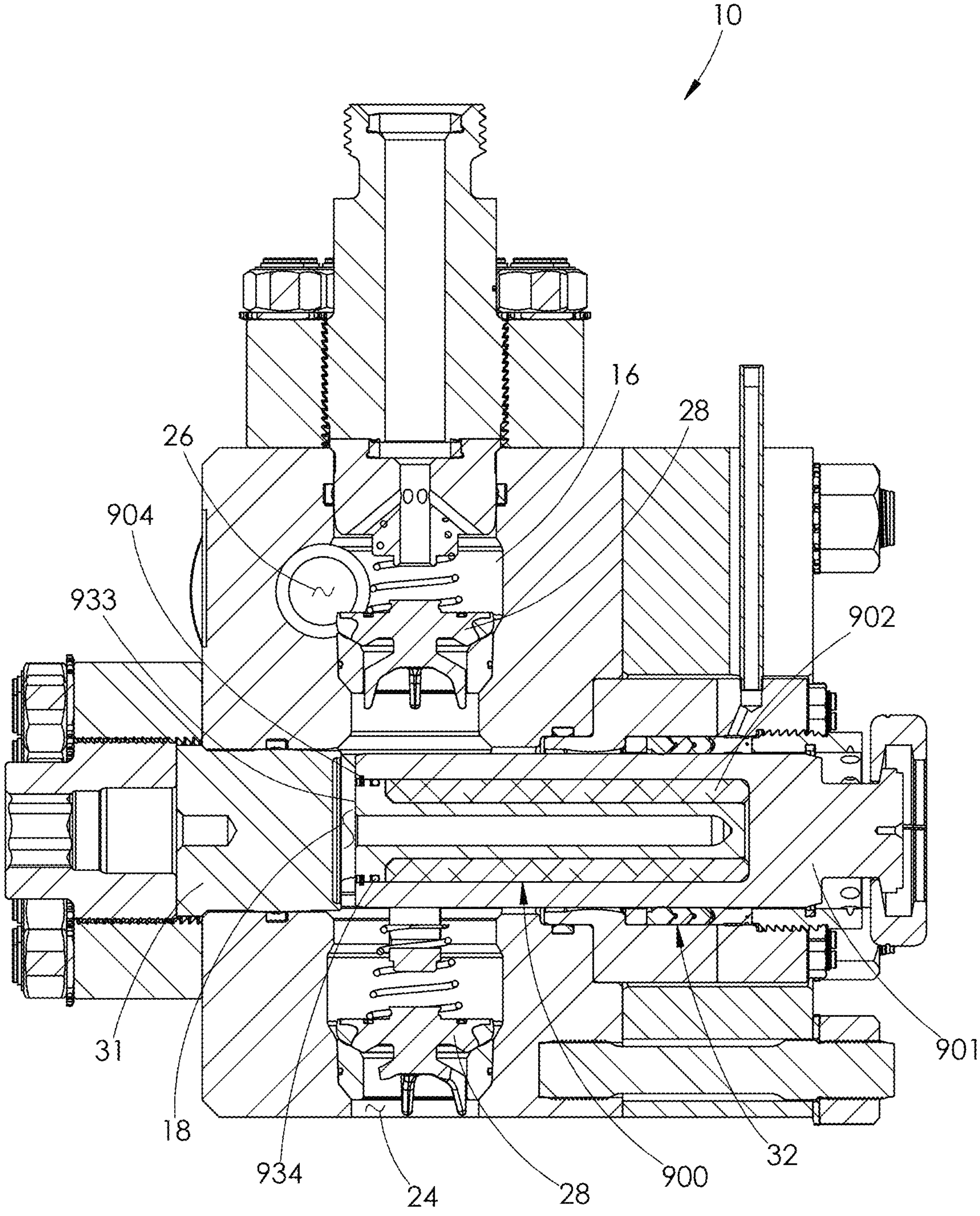
FIG. 83 is a cross-sectional view of the fluid end shown in FIG. 1, taken along line C-C, with another embodiment of a liquid cooled plunger system installed therein. The plunger of the liquid cooled plunger system is in the fully extended or maximally inserted position.
Figure 84:
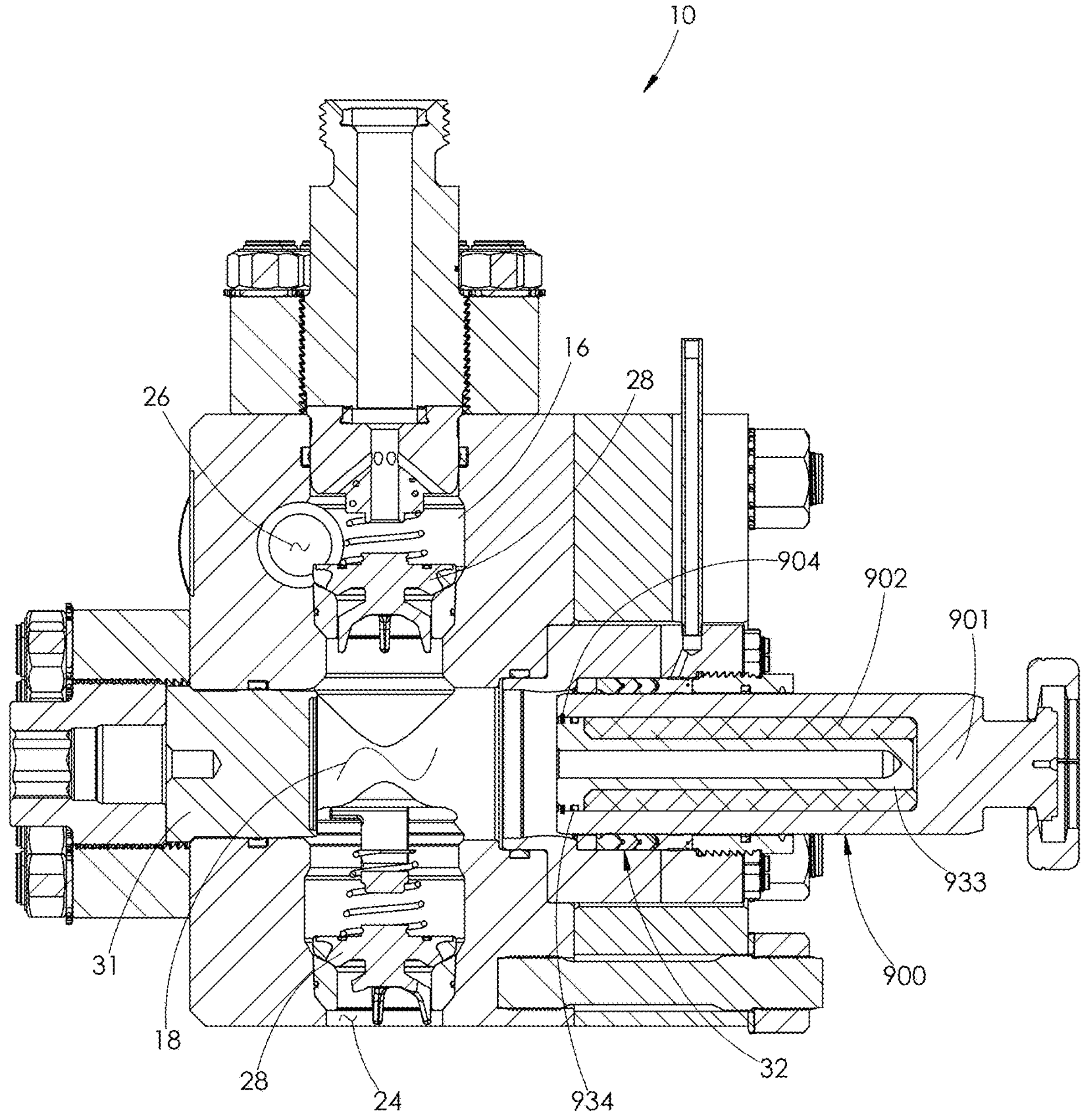
FIG. 84 is a cross-sectional view of the fluid end shown in FIG. 83 with the plunger of the liquid cooled plunger system in the fully retracted or minimally inserted position.
Figure 85:
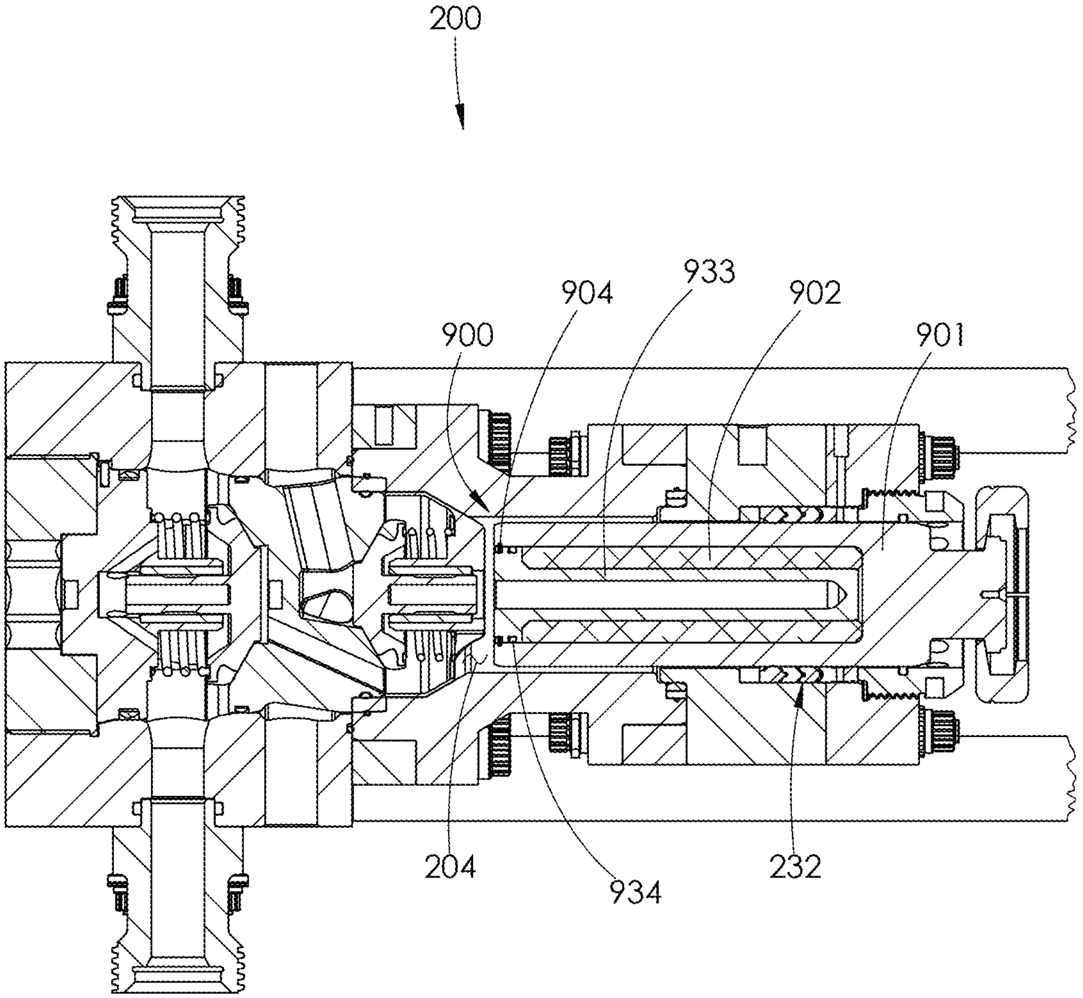
FIG. 85 is a cross-sectional view of the fluid end section shown in FIG. 3, taken along line B-B. The embodiment of the liquid cooled plunger system shown in FIG. 83 is installed therein. The plunger of the liquid cooled plunger system is in the fully extended or maximally inserted position.
Figure 86:
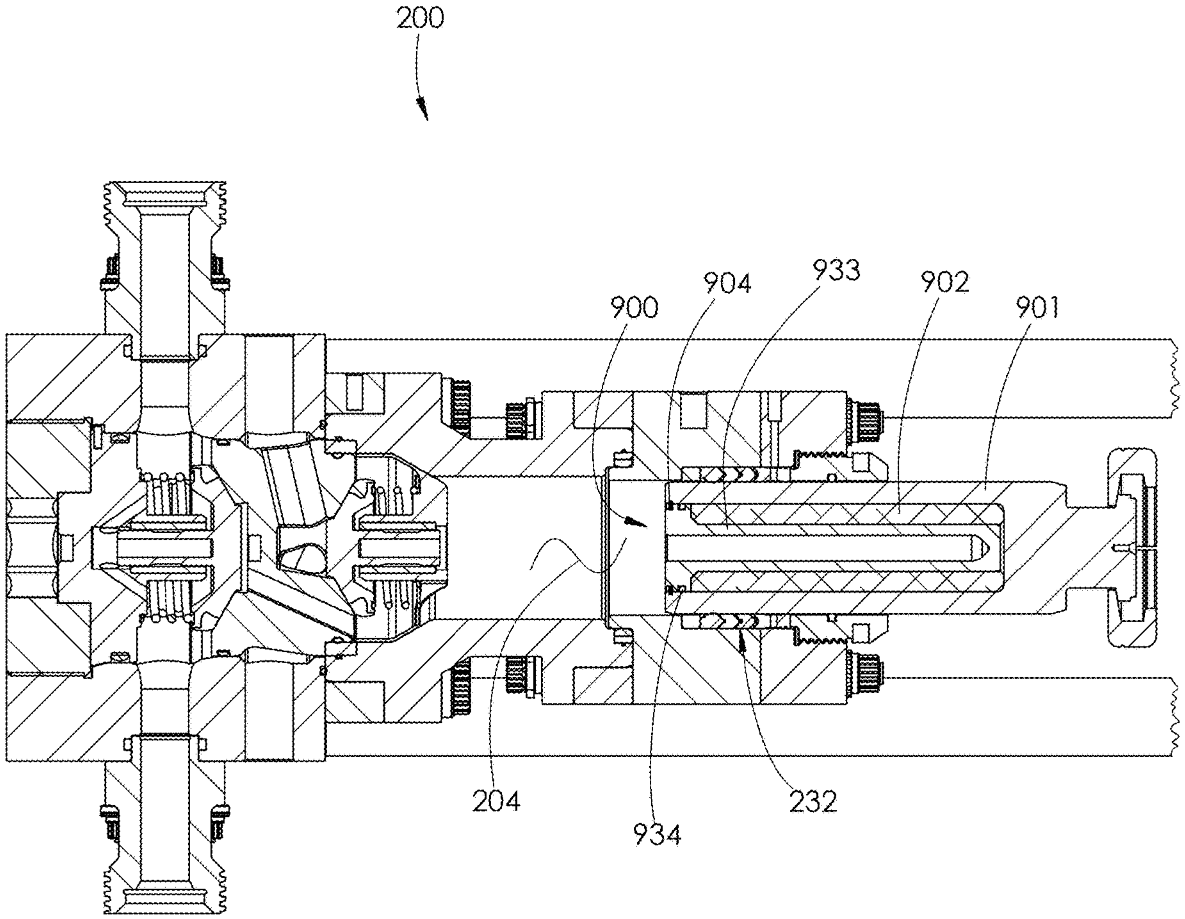
FIG. 86 is a cross-sectional view of the fluid end section shown in FIG. 85, with the plunger of the liquid cooled plunger system in the fully retracted or minimally inserted position.
Figure 87:
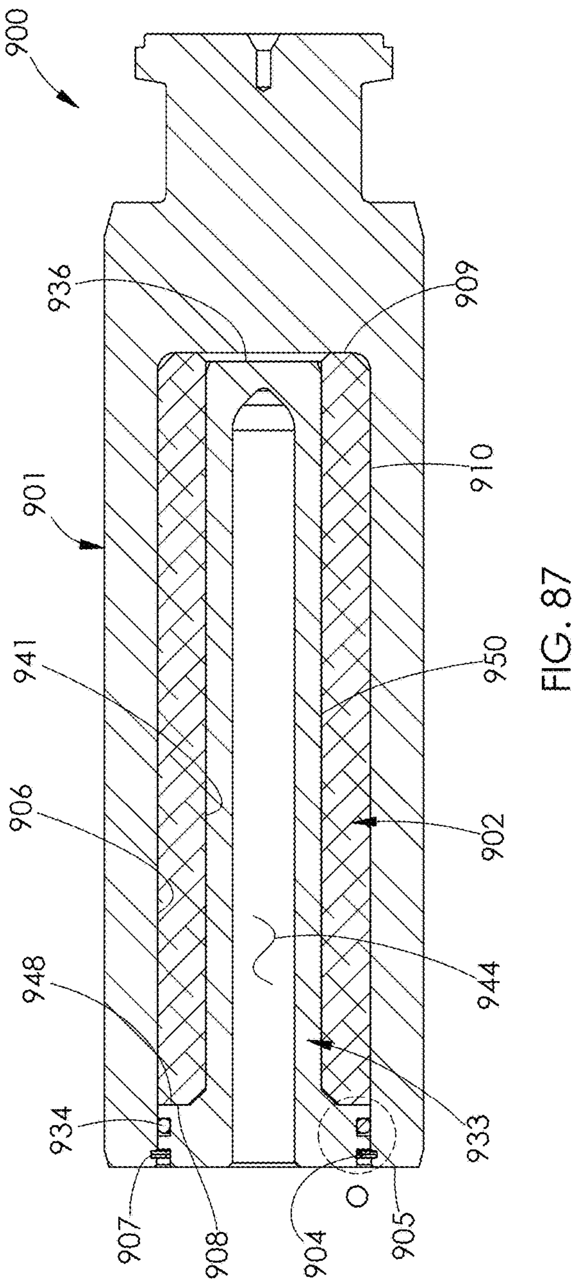
FIG. 87 is a cross-sectional view of the liquid cooled plunger system shown in FIGS. 85 and 86, taken along line B-B of FIG. 3.
Figure 88:
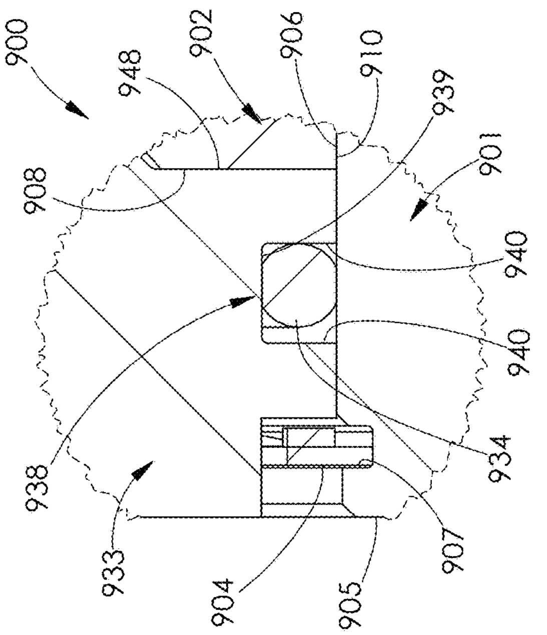
FIG. 88 is an enlarged view of area O of the liquid cooled plunger system shown in FIG. 87.

Referring now to FIGS. 75 and 78, the heat exchanger 802 has a generally cylindrical shape and comprises a front surface 808 and opposing rear surface 809 connected by an intermediate outer surface 810. In this embodiment the heat exchanger 802 is made of aluminum however in alternative embodiments the heat exchanger 802 may be made of other materials. It is preferable that the material forming the heat exchanger 802 have a higher thermal conductivity than the material forming the plunger 801.

The front surface 808 and rear surface 809 of the heat exchanger 802 are perpendicular to the longitudinal axis of the heat exchanger 802. The intermediate outer surface 810 comprises a chamfer 818 adjacent the rear surface 809.

The retainer 804 may be a standard spiral retaining ring well known in the art. In this embodiment the retainer 804 is a spiral retaining ring, but in alternative embodiments the retainer 804 may be an internal snap ring.

The plug 833, shown in FIGS. 79-82, comprises a front surface 835, a rear surface 836, and an intermediate outer surface 837. The intermediate outer surface 837 comprises a nose 819 adjacent the front surface 835, a shoulder 820 adjacent the rear of the nose 819 and a seal groove 838. The seal groove 838 may comprise a base 839 and side walls 840. The base 839 is parallel to the longitudinal axis of the plug 833 and the side walls 840 are perpendicular to the base 839. The largest diameter of the intermediate outer surface 837 is sized to have a tight transition to light interference fit with the heat exchanger bore 806. The diameter of the nose 819 is smaller than the largest diameter of the intermediate outer surface 837 and is sized to allow the compression and installation of the retainer 804. The seal groove 838 is configured to receive the seal 834.

The seal 834 is a standard D-ring seal well known in the art. In alternative embodiments the seal 834 may be an O-ring seal or other type of seal.

Continuing with FIGS. 75-78, the liquid cooled plunger system 800 is assembled by first inserting the heat exchanger 802, rear surface 809 first, in the heat exchanger bore 806 of the plunger 801 until the rear surface 809 of the heat exchanger 802 abuts the base of the heat exchanger bore 806. The fit between the intermediate outer surface 810 of the heat exchanger 802 and the inside diameter of the heat exchanger bore 806 is preferably a clearance fit but may be an interference fit or transition fit. Second, the seal 834 is inserted in the seal groove 838 of the intermediate outer surface 837 of the plug 833, as shown in FIG. 77. Third, the plug 833, with the inserted seal 834, is inserted, rear surface 836 first, in the heat exchanger bore 806 of the plunger 801 until the rear surface 836 of the plug 833 abuts the shoulder 820 of the heat exchanger 802. At this point in the assembly, the seal 834 is engaging the wall of the heat exchanger bore 806. Fourth, retainer 804, or spiral retaining ring 804, is installed in the retaining ring groove 807 of the heat exchanger bore 806.

Once the liquid cooled plunger system 800 is assembled it may be used in fluid end 10 (shown in FIGS. 71 and 72), fluid end section 200 (shown in FIGS. 73 and 74), or any other pump or portion of a pump using a plunger.

In operation the liquid cooled plunger system 800 reduces the surface temperature of the plunger 801. This reduction in temperature also reduces the temperature of the plunger packing 32/232 thus increasing the life of the plunger packing 32/232. The temperature reduction is accomplished by transferring the heat generated by the friction between the outer surface of the plunger 801 and the plunger packing 32/232 away from the surface of the plunger 801. The close contact of the heat exchanger 802 with the heat exchanger bore 806 and the higher thermal conductivity of the heat exchanger 802 as compared to that of the plunger 801 facilitates the heat flow from the plunger 801 to the heat exchanger 802. Once the heat is transferred to the heat exchanger 802 the heat is then transferred to the fluid being pumped by contact between the fluid and the surfaces of the plug 833, base of the heat exchanger bore 806, and the rear surface 809 of the heat exchanger 802. Alternatively, if the pump is only going to be used for a short while, the heat exchanger 802 may absorb the heat produced, cooling the plunger 801 for the period of operation.

Also in operation, the seal 834 prevents fluid from entering the heat exchanger bore 806. Eliminating fluid within the heat exchanger bore 806 also eliminates corrosion within the heat exchanger bore 806 specifically between contacting surfaces of the heat exchanger 802 and plunger 801. Absence of corrosion allows easier removal of the heat exchanger 802 if desired. Absence of corrosion also eliminates the opportunity for stress corrosion cracking of the plunger 801.

Also in operation, the heat exchanger 802, made of aluminum in this embodiment, results in an overall lighter weight of the liquid cooled plunger system 800 than a comparable plunger system made entirely of steel. This reduced weight results in easier field maintenance for operators. The reduced weight also results in less weight on the plunger packing 32/232 during operation. Since the friction force is a function of the normal force, in this case the weight of the liquid cooled plunger system 800, the friction force will be reduced thus reducing the heat caused by the friction force resulting in a longer packing life.

Referring now to FIGS. 83-98, another embodiment of a liquid cooled plunger system 900 is shown. The liquid cooled plunger system 900 comprises plunger 901, heat exchanger 902, a retainer 904, a plug 933, and a seal 934. The plunger 901 has a generally cylindrical shape and comprises a front surface 905 and a heat exchanger bore 906. The heat exchanger bore 906 is a blind bore with a bore axis coincident with the longitudinal axis of the plunger 901. The heat exchanger bore 906 comprises a retaining ring groove 907. In this embodiment the plunger 901 is made of an alloy steel however in alternative embodiments the plunger 901 may be made of other materials.

Referring now to FIGS. 91-94, the heat exchanger 902 has a generally cylindrical shape and comprises a front surface 908 and opposing rear surface 909 connected by a cylindrical intermediate outer surface 910 and plug bore 941. In this embodiment the heat exchanger 902 is made of aluminum however in alternative embodiments the heat exchanger 902 may be made of other materials. It is preferable that the material forming the heat exchanger 902 have a higher thermal conductivity than the material forming the plunger 901.

The front surface 908 and rear surface 909 of the heat exchanger 902 are perpendicular to the longitudinal axis of the heat exchanger 902. The intermediate outer surface 910 comprises a chamfer 918 adjacent the rear surface 909. The plug bore 941 is a through bore connecting the front surface 908 and rear surface 909. The plug bore 941 is concentric with the intermediate outer surface 910 and comprises a front chamfer 942, adjacent the front surface 908, and a rear chamfer 943, adjacent the rear surface 909.

The retainer 904 is a standard spiral retaining ring well known in the art. In this embodiment the retainer 904 is a spiral retaining ring but in alternative embodiments may be an internal snap ring.

The plug 933, shown in FIGS. 95-98, comprises a front surface 935, a rear surface 936, and an intermediate outer surface 937. The front surface 935 comprises a cooling bore 944. The cooling bore 944 is a blind bore that is concentric with the intermediate outer surface 937. The cooling bore 944 originates from the front surface 935 and extends proximate to, but not intersecting, the rear surface 936. The cooling bore 944 comprises a front chamfer 945 adjacent the front surface 935 and a conical base 946. The conical base 946 may vary in shape depending on the cutting tool used to create the cooling bore 944.

The intermediate outer surface 937 comprises a plurality of concentric sections, all of the sections are circular. Beginning at the front surface 908 of the heat exchanger 902 and continuing to the rear surface 909 the sections are a nose 919, a retaining ring shoulder 920, a plunger section 947, a heat exchanger shoulder 948, a transition chamfer 949, a heat exchanger section 950, and a rear chamfer 951. The plunger section 947 comprises a seal groove 938. The seal groove 938 may comprise a base 939 and side walls 940. The base 939 is parallel to the longitudinal axis of the plug 933 and the side walls 940 are perpendicular to the base 939.

The diameter of the plunger section 947 is sized to have a tight transition to light interference fit with the heat exchanger bore 906. The diameter of the nose 919 is smaller than the diameter of the plunger section 947 and is sized to allow the compression and installation of the retainer 904. The seal groove 938 is configured to receive the seal 934. The diameter of the heat exchanger section 950 is sized to have a tight transition to light interference fit with the plug bore 941 of the heat exchanger 902.

The seal 934 is a standard O-ring seal well known in the art. In alternative embodiments the seal 934 may be a D-ring seal or other type of seal.

Figures 89, 90:
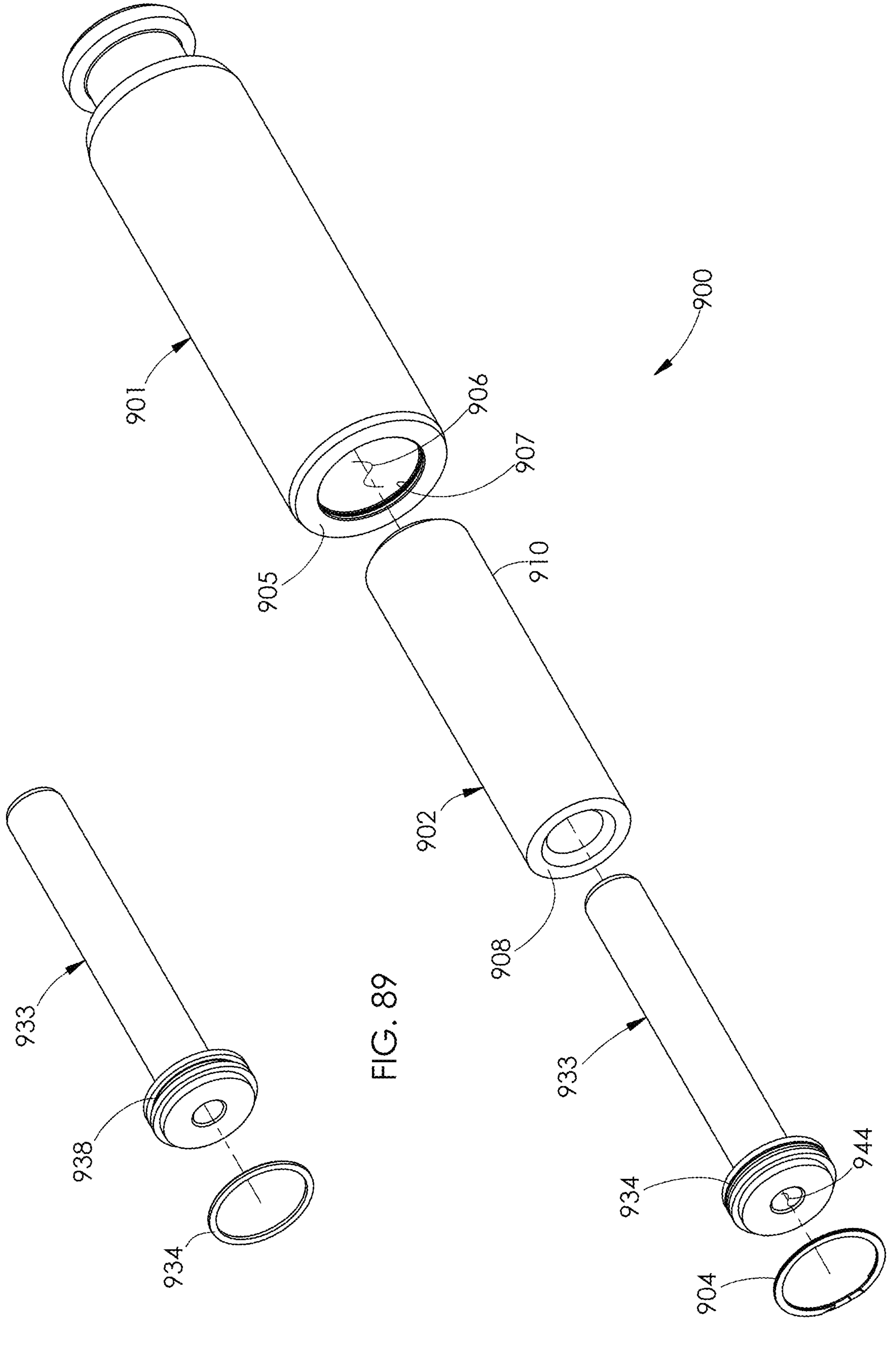
FIG. 89 is an exploded isometric view of the plug and seal used in the liquid cooled plunger system shown in FIG. 87.
FIG. 90 is an exploded isometric view of the liquid cooled plunger system shown in FIG. 87.
Figure 91:
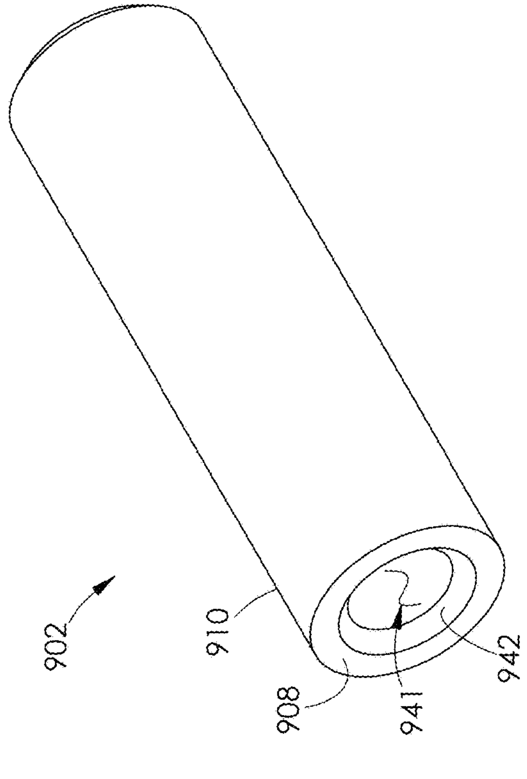
FIG. 91 is an isometric view of the heat exchanger used in the liquid cooled plunger system shown in FIG. 87.
Figure 92:
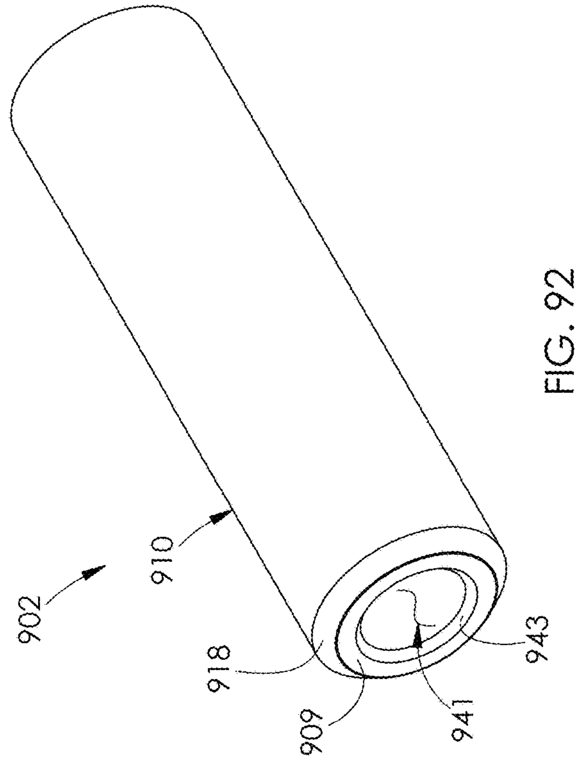
FIG. 92 is a rear isometric view of the heat exchanger shown in FIG. 91.
Figure 93:
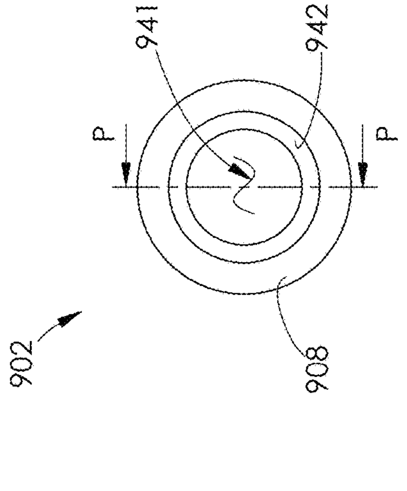
FIG. 93 is a front elevation view of the heat exchanger shown in FIG. 91.
Figure 94:
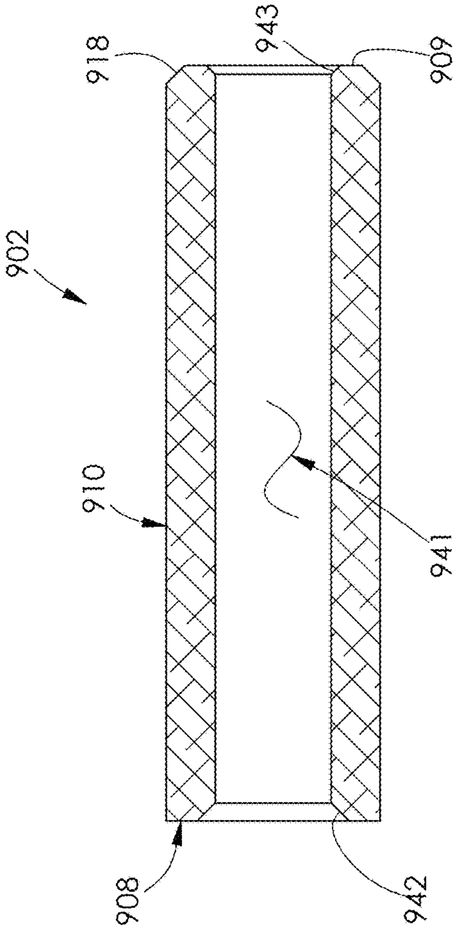
FIG. 94 is a cross-sectional view of the heat exchanger shown in FIG. 93, taken along line P-P.
Figure 96:
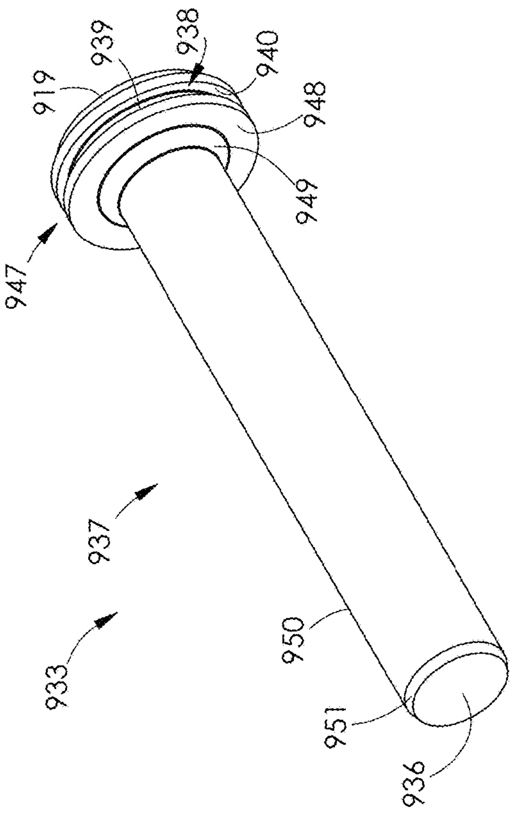
FIG. 96 is a rear isometric view of the plug shown in FIG. 95.
Figure 98:
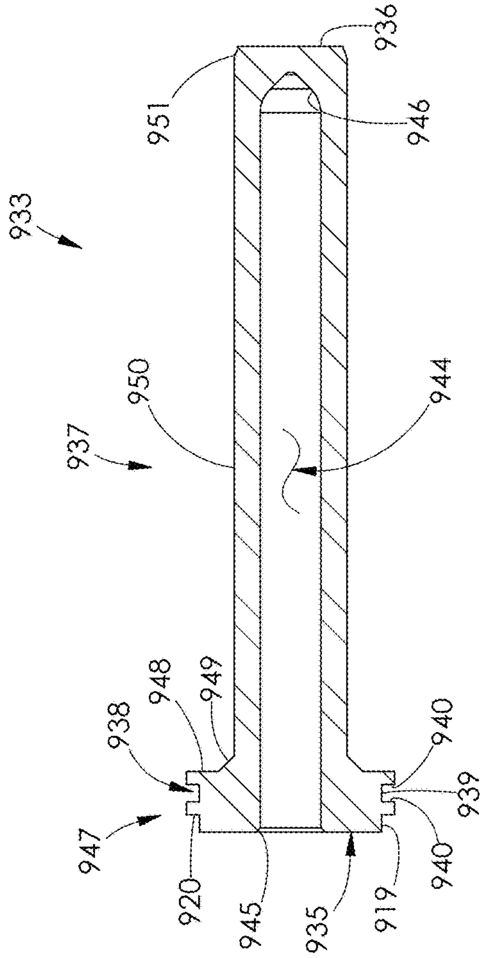
FIG. 98 is a cross-sectional view of the plug shown in FIG. 97, taken along line Q-Q.
Figure 95:
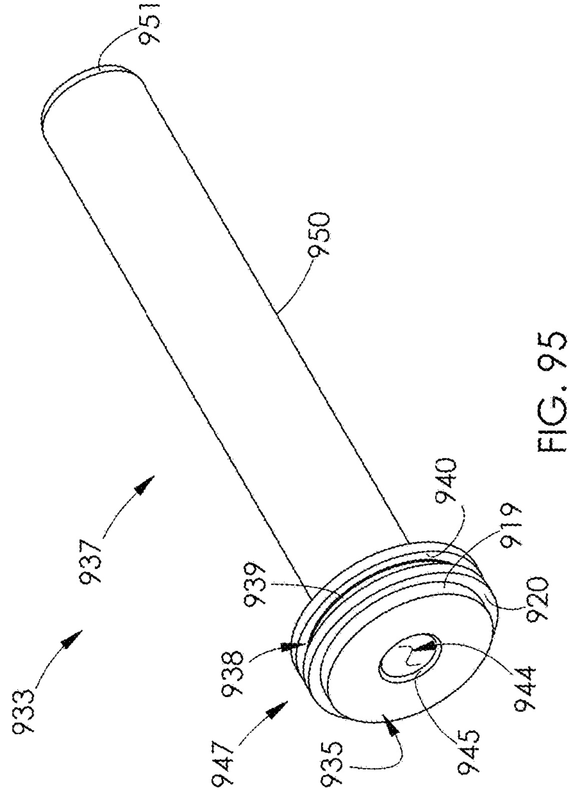
FIG. 95 is an isometric view of the plug used in the liquid cooled plunger system shown in FIG. 87.
Figure 97:
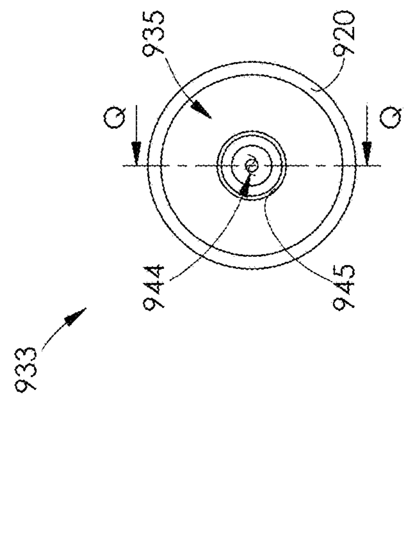
FIG. 97 is a front elevation view of the plug shown in FIG. 95.

Continuing with FIGS. 87-90, the liquid cooled plunger system 900 is assembled by first inserting the heat exchanger 902, rear surface 909 first, in the heat exchanger bore 906 of the plunger 901 until the rear surface 909 of the heat exchanger 902 abuts the base of the heat exchanger bore 906. The fit between the intermediate outer surface 910 of the heat exchanger 902 and the inside diameter of the heat exchanger bore 906 is preferably a clearance fit but may be an interference fit or transition fit. Second, the seal 934 is inserted in the seal groove 938 of the plunger section 947 of the intermediate outer surface 910 of the plug 933, as shown in FIG. 89. Third, the plug 933, with the inserted seal 934, is inserted, rear surface 936 first, in the plug bore 941 of the heat exchanger 902 until the heat exchanger shoulder 948 abuts the front surface 908 of the heat exchanger 902. At this point in the assembly, the seal 934 is engaged with the wall of the heat exchanger bore 906. Fourth, retainer 904, or spiral retaining ring 904, is installed in the retaining ring groove 907 of the heat exchanger bore 906.

Once the liquid cooled plunger system 900 is assembled it may be used in fluid end 10 (shown in FIGS. 83 and 84), fluid end section 200 (shown in FIGS. 85 and 86), or any other pump or portion of a pump using a plunger.

In operation the liquid cooled plunger system 900 reduces the surface temperature of the plunger 901. This reduction in temperature also reduces the temperature of the plunger packing 32/232 thus increasing the life of the plunger packing 32/232. The temperature reduction is accomplished by transferring the heat generated by the friction between the outer surface of the plunger 901 and the plunger packing 32/232 away from the surface of the plunger 901. The close contact of the heat exchanger 902 with the heat exchanger bore 906 and the higher thermal conductivity of the heat exchanger 902 as compared to that of the plunger 901 facilitates the heat flow from the plunger 901 to the heat exchanger 902. Once the heat is transferred to the heat exchanger 902 the heat is then primarily transferred to the plug 933, specifically the heat exchanger section 950 of the intermediate outer surface 937. The heat is then transferred to the fluid being pumped by contact between the fluid and the surfaces of the cooling bore 944 of the plug 933. The heat is carried away by the fluid as it flows in and out of the cooling bore 944 during the operation of the plunger 901.

Also in operation the seal 934 prevents fluid from entering the heat exchanger bore 906. Eliminating fluid within the heat exchanger bore 906 also eliminates corrosion within the heat exchanger bore 906 specifically between contacting surfaces of the heat exchanger 902 and plunger 901 and plug 933. Absence of corrosion allows easier removal of the plug 933 and/or heat exchanger 902 if desired. Absence of corrosion also eliminates the opportunity for stress corrosion cracking of the plunger 901.

Also in operation, the heat exchanger 902, made of aluminum in this embodiment, and removal of material from the plug bore 941 and cooling bore 944 result in an overall lighter weight of the liquid cooled plunger system 900 than a comparable plunger system made entirely of steel. This reduced weight results in easier field maintenance for operators. The reduced weight also results in less weight on the plunger packing 32/232 during operation. Since the friction force is a function of the normal force, in this case the weight of the liquid cooled plunger system 900, the friction force will be reduced thus reducing the heat caused by the friction force resulting in a longer packing life.

In all liquid cooled plunger systems comprising the blind bore 42, the blind bore 42 of the plunger 20 extends across the entire length of the plunger packing 32/232 at all times during operation. In other words, during operation, the plunger 20 reciprocates between fully inserted and fully retracted positions. At both the fully inserted and fully retracted positions, as well as all positions between the two, the blind bore 42 of the plunger 20 extends longitudinally across the length of the plunger packing 32/232.

In like manner, in liquid cooled plunger systems 300 and 600 used in fluid end 10, the heat exchanger bore 306 of the plunger 301 extends across the entire length of the plunger packing 32 at all times during operation. If liquid cooled plunger systems 300 and 600 are used in fluid end section 200, the heat exchanger bore 306 of the plunger 301 extends across the entire length of the plunger packing 232 at all times during operation.

Also in like manner, in liquid cooled plunger systems 400 and 700 used in fluid end 10 the heat exchanger bore 406 of the plunger 401 extends across the entire length of the plunger packing 32 at all times during operation. If liquid cooled plunger systems 400 and 700 are used in fluid end section 200, the heat exchanger bore 406 of the plunger 401 extends across the entire length of the plunger packing 232 at all times during operation.

Also in like manner, in liquid cooled plunger system 500 used in fluid end 10, the heat exchanger bore 506 of the plunger 501 extends across the entire length of the plunger packing 32 at all times during operation. If liquid cooled plunger system 500 is used in fluid end section 200, the heat exchanger bore 506 of the plunger 501 extends across the entire length of the plunger packing 232 at all times during operation.

Also in like manner, in liquid cooled plunger systems 800 and 900 used in fluid end 10, the heat exchanger bores 806 and 906 of the plungers 801 and 901 extend across the entire length of the plunger packing 32 at all times during operation. If liquid cooled plunger system 800 or 900 is used in fluid end section 200, the heat exchanger bore 806 or 906 of the plungers 801 or 901 extend across the entire length of the plunger packing 232 at all times during operation.

Similar to blind bore 42, the heat exchanger bores 306, 406, 506, 806, and 906 of the plungers 301, 401, 501, 801, and 901 originate on the front surfaces 305, 405, 505, 805, and 905 of the plungers 301, 401, 501, 801, and 901. The heat exchanger bores 306, 406, 506, 806, and 906 do not intersect any other surface of the plungers 301, 401, 501, 801, and 901.

In certain embodiments disclosed herein containing a ball, the ball may be mechanically uncoupled from the blind bore or heat exchanger bore. In certain embodiments disclosed herein containing a stem, the stem may be mechanically uncoupled from the blind bore or heat exchanger bore, as well as the plunger.

In all embodiments, the plunger comprises a first surface configured to remain within the fluid end or fluid end section. This surface may also be referred to as a front surface or first end. The first surface may also be said to be exposed to the cavity, chamber, or horizontal bore formed within the applicable fluid end or fluid end section. All plungers may also comprise a second surface which is opposed from the first surface, and configured to not remain within the applicable fluid end or fluid end section during operation. This second surface is configured to be attached to a power end. The second surface may also be referred to as a rear surface or second end of the plunger.

In liquid cooled plunger system 40 the fluid enters and exits only through the opening in the front surface 88 of the plunger 20 formed by the blind bore 42.

In liquid cooled plunger system 60 the fluid enters and exits only through the openings adjacent the front surface 88 of the plunger 20 formed by central passage 70 and passages 72 of the heat exchanger 62. If heat exchanger 110 is used in liquid cooled plunger system 60, fluid enters and exits only through the openings adjacent the front surface 88 formed by the central passage 112 and splines 114 of the heat exchanger 110, and blind bore 42 of the plunger 20.

In liquid cooled plunger system 80 the fluid enters and exits only through the opening adjacent the front surface 88 of the plunger 20 formed by the central opening 89 of the seat 86.

In liquid cooled plunger system 90 the fluid enters and exits only through the openings adjacent the front surface 88 of the plunger 20 formed by the central opening 98 and openings 100 of the seat 96. If heat exchanger 110 is used in liquid cooled plunger system 90 and seat 96 is modified to match the splines 114 and channels 120 of the heat exchanger 110, the fluid enters and exits only through the openings adjacent the front surface 88 formed by the central opening 98 and splines 114 of the seat 96, and blind bore 42 of the plunger 20.

In liquid cooled plunger systems 300 and 400 the fluid enters and exits only through the openings adjacent the front surfaces 305 and 405 of the plungers 301 and 401 formed by the trap bore 322 and passages 311 of the heat exchanger 302.

In liquid cooled plunger system 900 the fluid enters and exits only through the opening adjacent the front surface 905 of the plunger 901 formed by the cooling bore 944.

In all embodiments, the fluid referenced is fluid being pumped by the fluid end 10, fluid end section 200, any other pump using a plunger, or any other portion of a pump using a plunger. The fluid is only that fluid within the internal chamber 18 of the fluid end 10, or the horizontal bore 204 of fluid end section 200, or the chamber or reservoir of the pump using a plunger that is always exposed to the instantaneous pressure produced by the pump, or the chamber or reservoir of the portion of a pump using a plunger that is always exposed to the instantaneous pressure produced by the pump.

In no case is fluid flow ever diverted from the above-mentioned internal chamber 18, horizontal bore 204, chamber, or reservoir to cool the plunger. For clarification, while various blind bores, central passages, central openings, installation bores, and openings described herein are not themselves part of the internal chambers 18, horizontal bores 204, chambers, or reservoirs, the combined volume that they encompass shall be considered as a single entity for the purposes of fluid flow and system function. Fluid flow in, through, and/or around these features is not considered diverted.

Additional benefits to the liquid cooled plunger systems disclosed herein include but are not limited to: reduction of weight, reduction of corrosion between parts, and reduction of heat related expansion of parts. The reduced weight leads to easier and quicker installation and repair processes. The reduced weight also leads to less weight riding on the plunger packing and related parts, which in turn extends the lifetime of those components. Finally, the reduced weight leads to less heat being generated due to friction between parts, such as plunger packing and plungers. By introducing plugs made of steel and other materials, corrosion of inserts or heat exchangers may be reduced. Notably, the use of aluminum or like materials having high heat transfer coefficients can result in the plunger being cooler than it would be if it were solid or hollow.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. An apparatus, comprising:
- a plunger configured to reciprocate within a fluid end, the plunger comprising:
  - a first end and an opposed second end;
  - a plurality of bores formed therein; and
  - a plurality of openings formed on the first end;
  - in which the second end is configured to be attached to a power end assembly;
  - in which the plunger is reciprocable between a first position and a second position;
  - in which, when the plunger is in the first position, the first end of the plunger is situated within the fluid end by a distance, D1, defined from the first end of the plunger to an exterior surface of the fluid end which faces the power end assembly;
  - in which, when the plunger is in the second position, the first end of the plunger is situated within the fluid end by a distance, D2, defined from the first end of the plunger to the exterior surface of the fluid end which faces the power end assembly;
  - in which D1 is greater than D2;
  - in which each of the plurality of openings aligns with a corresponding one of the plurality of bores formed in the plunger;
  - in which each bore is at least partially surrounded by the fluid end when the plunger is in the first position and when the plunger is in the second position; and
- a plunger packing;
- in which the plunger packing surrounds each bore when the plunger is in the first position and when the plunger is in the second position.

2. The apparatus of claim 1, further comprising:
- a fluid end that is the fluid end of claim 1, in which the fluid end comprises:

an internal chamber;

in which the internal chamber is in fluid communication with each of the plurality of openings formed in the plunger.

3. The apparatus of claim 2, in which the first end of the plunger is configured to reciprocate within the fluid end.

4. The apparatus of claim 1, in which each of the plurality of bores opens on the first end of the plunger.

5. The apparatus of claim 1, further comprising:

a fluid end that is the fluid end of claim 1, the fluid end having an internal chamber formed therein;

in which the plunger further comprises an intermediate outer surface bound between the first end and the second end; and in which the plunger packing is configured to surround at least a portion of the intermediate outer surface of the plunger.

6. An apparatus, comprising:

a fluid end comprising a chamber formed therein;

a plunger configured to reciprocate within the fluid end, the plunger comprising:

a body having an intermediate outer surface bound between a first end and an opposed second end; and a plurality of blind bores formed on the first end of the body; and a plunger packing situated within the fluid end;

in which the plunger is reciprocable between a first position and a second position;

in which, when in the first position, the first end of the plunger is situated within the fluid end by a distance, D1, defined from the first end of the plunger to an exterior surface of the fluid end which faces a power end;

in which, when in the second position, the first end of the plunger is situated within the fluid end by a distance, D2, defined from the first end of the plunger to the exterior surface of the fluid end which faces the power end;

in which D1 is greater than D2; and in which each of the plurality of blind bores is surrounded by the plunger packing when the plunger is in the first position and when the plunger is in the second position.

7. The apparatus of claim 6, in which each of the plurality of blind bores is in fluid communication with the chamber.

8. The apparatus of claim 6, further comprising:

a fluid routing plug;

in which the fluid end further comprises a plunger bore formed therein; and in which the plunger bore is configured to receive at least a portion of the plunger.

9. The apparatus of claim 6, further comprising:

a fluid routing plug situated within the fluid end;

in which the fluid end further comprises:

a longitudinal axis; and a linear bore extending along the longitudinal axis;

in which the linear bore is configured to receive at least a portion of the plunger; and in which the fluid routing plug is situated in the linear bore.

10. The apparatus of claim 9, further comprising a valve pair situated in the linear bore.

11. The apparatus of claim 10, in which the valve pair comprises a first valve and a second valve; in which the fluid routing plug is situated intermediate the first valve and the second valve.

12. The apparatus of claim 11, in which the first valve is a suction valve; and in which the second valve is a discharge valve.

13. The apparatus of claim 12, in which the first valve is situated intermediate the fluid routing plug and the plunger.

* * * * *